(12) United States Patent
Pica et al.

(10) Patent No.: US 9,538,439 B2
(45) Date of Patent: Jan. 3, 2017

(54) METHOD AND APPARATUS FOR ESTIMATING AN ACHIEVABLE LINK THROUGHPUT BASED ON ASSISTANCE INFORMATION

(71) Applicant: QUALCOMM Incorporated, San Diego, CA (US)

(72) Inventors: Francesco Pica, San Diego, CA (US); Sharad Deepak Sambhwani, San Diego, CA (US); Rohit Kapoor, San Diego, CA (US); Gavin Bernard Horn, La Jolla, CA (US); Madhavan Srinivasan Vajapeyam, San Diego, CA (US); Arnaud Meylan, San Diego, CA (US); Stefano Faccin, Hayward, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 14/262,451

(22) Filed: Apr. 25, 2014

(65) Prior Publication Data

US 2014/0334318 A1 Nov. 13, 2014

Related U.S. Application Data

(60) Provisional application No. 61/822,179, filed on May 10, 2013.

(51) Int. Cl.
*H04W 36/14* (2009.01)
*H04W 24/02* (2009.01)
*H04W 36/08* (2009.01)

(52) U.S. Cl.
CPC ............. *H04W 36/14* (2013.01); *H04W 24/02* (2013.01); *H04W 36/08* (2013.01)

(58) Field of Classification Search
CPC .. H04W 72/0413; H04W 36/14; H04W 36/08; H04W 24/02; H04W 88/00; H04W 74/006; H04W 72/1289; H04W 28/0289; H04W 36/00; H04W 36/30; H04W 88/02; H04W 72/02; H04W 72/042; H04W 92/10; H04W 72/1268; H04W 72/1284; H04W 74/004; H04W 52/365; H04W 48/18; H04W 28/08; H04W 48/20; H04W 68/12; H04W 36/0083; H04W 52/26; H04W 84/12
See application file for complete search history.

(56) References Cited

U.S. PATENT DOCUMENTS

| 5,276,907 A | 1/1994 | Meidan |
| 6,363,252 B1 * | 3/2002 | Hamalainen .......... H04W 36/30 |
| | | 455/436 |

(Continued)

FOREIGN PATENT DOCUMENTS

| EP | 1 798 874 A1 | 6/2007 |
| WO | WO-01/24568 A1 | 4/2001 |

(Continued)

OTHER PUBLICATIONS

Sarr et al. "Bandwidth Estimation for IEEE 802.11-Based Ad Hoc Networks", Oct. 2008, IEEE Transactions on Mobile Computing, vol. 7, No. 10, pp. 1228-1241.*

(Continued)

*Primary Examiner* — Pao Sinkantarakorn
*Assistant Examiner* — Michael Phillips
(74) *Attorney, Agent, or Firm* — Arent Fox LLP

(57) ABSTRACT

Methods and apparatuses are provided for determining available uplink bandwidth as an achievable throughput for a link. An available link capacity of a link with a cell for a user equipment is estimated based on a communication quality measured in the cell. An available fraction of cell (Continued)

resources for the user equipment over the link is also estimated based at least in part on received assistance information. An available bandwidth of the cell is then estimated as an achievable throughput for the user equipment over the link as a function of the estimated available link capacity and the estimated available fraction of cell resources. Moreover, a network procedure can be performed based at least in part on comparing the achievable throughput to one or more thresholds.

28 Claims, 28 Drawing Sheets

(56) References Cited

U.S. PATENT DOCUMENTS

| | | | | |
|---|---|---|---|---|
| 6,668,159 | B1* | 12/2003 | Olofsson | H04L 1/20 455/226.1 |
| 7,142,562 | B2 | 11/2006 | Yavuz et al. | |
| 2004/0053630 | A1* | 3/2004 | Ramos | H04W 16/14 455/500 |
| 2004/0252658 | A1 | 12/2004 | Hosein et al. | |
| 2005/0107135 | A1* | 5/2005 | Deeds | H04W 88/02 455/575.1 |
| 2006/0003703 | A1* | 1/2006 | Yahagi | H04W 28/22 455/69 |
| 2006/0067229 | A1* | 3/2006 | Frederiksen | H04L 1/0068 370/235 |
| 2007/0011550 | A1* | 1/2007 | Agrawal | H04B 7/0697 714/746 |
| 2007/0025336 | A1 | 2/2007 | Zhang et al. | |
| 2008/0254804 | A1* | 10/2008 | Lohr | H04W 72/14 455/442 |
| 2009/0086691 | A1* | 4/2009 | Balasubramanian | H04W 60/00 370/338 |
| 2009/0161613 | A1* | 6/2009 | Kent | H04L 1/0016 370/329 |
| 2009/0185492 | A1* | 7/2009 | Senarath | H04B 7/155 370/238 |
| 2009/0213819 | A1 | 8/2009 | Kalhan | |
| 2010/0034108 | A1* | 2/2010 | Ode | H04W 72/085 370/252 |
| 2010/0118731 | A1 | 5/2010 | Koyanagi | |
| 2010/0135253 | A1* | 6/2010 | Lee | H04W 36/005 370/331 |
| 2010/0157826 | A1* | 6/2010 | Yu | H04B 7/155 370/252 |
| 2010/0188984 | A1* | 7/2010 | Futagi | H04L 1/0004 370/252 |
| 2010/0248738 | A1* | 9/2010 | Chayat | H04W 48/16 455/453 |
| 2010/0303030 | A1* | 12/2010 | Andersson | H04W 52/12 370/329 |
| 2010/0304742 | A1 | 12/2010 | Tsuda | |
| 2011/0206098 | A1* | 8/2011 | Lindoff | H04L 1/0003 375/219 |
| 2011/0261779 | A1* | 10/2011 | Liu | H04L 1/0007 370/329 |
| 2012/0120824 | A1* | 5/2012 | Meylan | H04W 48/10 370/252 |
| 2012/0188989 | A1* | 7/2012 | Yokota | H04L 1/0002 370/336 |
| 2012/0208581 | A1* | 8/2012 | Ishida | H04B 7/0691 455/509 |
| 2012/0263060 | A1* | 10/2012 | Suzuki | H04W 52/365 370/252 |
| 2012/0269143 | A1* | 10/2012 | Bertrand | H04W 72/1231 370/329 |
| 2012/0275403 | A1 | 11/2012 | Zhang et al. | |
| 2012/0314751 | A1 | 12/2012 | Suzuki et al. | |
| 2013/0053040 | A1* | 2/2013 | Ebara | H04W 36/02 455/436 |
| 2013/0128856 | A1* | 5/2013 | Iwai | H04L 5/001 370/329 |
| 2013/0229989 | A1* | 9/2013 | Natarajan | H04W 72/042 370/329 |
| 2013/0258877 | A1* | 10/2013 | Ji | H04B 7/0632 370/252 |
| 2013/0288624 | A1* | 10/2013 | Mujtaba | H04B 7/0817 455/140 |
| 2013/0308504 | A1* | 11/2013 | Nimbalker | H04L 5/003 370/281 |
| 2014/0003260 | A1* | 1/2014 | Tabet | H04W 76/028 370/252 |
| 2014/0029455 | A1 | 1/2014 | Vitthaladevuni et al. | |
| 2014/0113630 | A1* | 4/2014 | Vangala | H04W 36/26 455/436 |
| 2014/0140313 | A1* | 5/2014 | Liu | H04W 52/346 370/329 |
| 2014/0301306 | A1* | 10/2014 | Kim | H04L 5/0046 370/329 |
| 2014/0321304 | A1* | 10/2014 | Yu | H04L 5/00 370/252 |
| 2014/0329516 | A1* | 11/2014 | Falconetti | H04W 48/20 455/418 |
| 2015/0139189 | A1* | 5/2015 | Li | H04W 36/0055 370/331 |
| 2015/0249992 | A1* | 9/2015 | Takaoka | H04L 5/001 370/329 |
| 2015/0318954 | A1* | 11/2015 | Park | H04W 24/10 370/252 |
| 2015/0319776 | A1* | 11/2015 | Seo | H04L 1/18 370/329 |
| 2015/0365873 | A1* | 12/2015 | Hoehne | H04W 24/10 455/436 |
| 2016/0007357 | A1* | 1/2016 | Yano | H04W 72/0453 370/329 |

FOREIGN PATENT DOCUMENTS

| | | |
|---|---|---|
| WO | WO-02/32157 A2 | 4/2002 |
| WO | WO 02/41509 A2 | 5/2002 |
| WO | WO-02/062094 A2 | 8/2002 |
| WO | WO-03/101044 A1 | 12/2003 |
| WO | WO 2004/114704 A2 | 12/2004 |
| WO | WO 2011/144538 A1 | 11/2011 |

OTHER PUBLICATIONS

Qun Hou et al, "Channel Quality Indication (CQI) Application in HSDPA Simulation," Wireless Communications, Networking and Mobile Computing 2007, WICOM 2007, Sep. 21, 2007, pp. 1200-1203, Piscataway, NJ.

3GPP, "3$^{rd}$ Generation Partnership Project: Technical Specification Group Radio Access Network; Evolved Universal Terrestrial Radio Access (E-UTRA); Physical Layer Procedures (Release 10)," Jun. 26, 2012, 3GPP Mobile Competence Centre, Sophia-Antipolis Cedex, France.

International Searching Authority for PCT Application No. PCT/US2012/052036, "International Search Report and Written Opinion," Dec. 16, 2013.

Lucent Technologies Inc., "Downlink and Uplink Channel Structures for HSDPA" TSGR1#17(00)1381, Nov. 21-24, 2000, pp. 1-7, XP002206395.

Partial International Search Report—PCT/US2014/035669—ISA/EPO—Nov. 17, 2014. (8 total pages).

Samsung: "Details of CQI definition for LTE-A", 3GPP Draft; R1-106034, 3rd Generation Partnership Project (3GPP), Mobile Competence Centre ; 650, Route Des Lucioles ; F-06921 Sophia-Antipolis Cedex ; France, vol. RAN WG1, no. Jacksonville, USA; Nov. 15, 2010, Nov. 19, 2010 (Nov. 19, 2010),XP050489530 [retrieved on Nov. 19, 2010].

International Search Report and Written Opinion—PCT/US2014/035669—ISA/EPO—Jan. 22, 2015. (19 total pages).

* cited by examiner

METHOD AND APPARATUS FOR ESTIMATING AN ACHIEVABLE LINK THROUGHPUT BASED ON ASSISTANCE INFORMATION

CROSS-REFERENCE TO RELATED APPLICATIONS

The present application for patent claims priority to Provisional Application No. 61/822,179, entitled "METHOD AND APPARATUS FOR UE BASED RAN-WLAN TRAFFIC STEERING USING RAN BROADCAST ASSISTANCE," filed May 10, 2013, and relates to co-pending application Ser. No. 13/871,242, entitled "METHOD AND APPARATUS FOR AVAILABLE BANDWIDTH ESTIMATION BY A USER EQUIPMENT IN IDLE AND/OR CONNECTED MODE," filed Apr. 26, 2013, the entireties of which are assigned to the assignee hereof and are hereby expressly incorporated by reference herein.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level.

An example of a telecommunication standard is Universal Mobile Telecommunications System (UMTS). UMTS is a third generation mobile cellular system for networks based on the Global System for Mobile Communications (GSM) standard. UMTS was developed and maintained by the 3rd Generation Partnership Project (3GPP), and is a component of the International Telecommunications Union IMT-2000 standard set and compares with the CDMA2000 standard set for networks based on the competing cdmaOne technology. UMTS uses wideband code division multiple access (W-CDMA) radio access technology to offer greater spectral efficiency and bandwidth to mobile network operators. UMTS specifies a complete network system which uses, covering the radio access network (UMTS Terrestrial Radio Access Network, or UTRAN), the core network (Mobile Application Part, or MAP) and the authentication of users via SIM (subscriber identity module cards).

Another example of a telecommunication standard is Long Term Evolution (LTE). LTE is a set of enhancements to the UMTS mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Mobile terminals, or user equipment (UE), can communicate with one or more base stations in an active communication mode, or a more conservative communication mode, such as idle mode where the UE powers down its transceiver during some time intervals to save power. In idle mode, for example, the UE can power up its transceiver during defined paging intervals to receive paging signals from the base station(s), or to establish an active communication mode connection with the base station(s). The UE can switch communications among base stations when in an active mode, e.g., via a handover process, or when in an idle mode, e.g., via a cell reselection procedure. Selection or reselection of base stations or related cells is typically based on a signal strength in a candidate cell; however, with the addition of user-deployable base stations (e.g., femto nodes, pico nodes, or the like), there can be multiple cells with sufficient signal strength to adequately serve a UE. In addition, a UE may obtain wireless services by communicating with a network (e.g., UMTS or LTE) or a nearby wireless local area network (WLAN) (e.g., WiFi). In some instances, LTE and/or UMTS may prove to be a better network (e.g., it may provide service to a UE that is faster, with greater bandwidth, providing greater throughput, or some other quality measurement), while in other instances, or at other times, WiFi may prove to be the better network.

As such, it is desirable to determine metrics that may allow a UE to select the better network as between LTE and/or UMTS and WiFi at a given point in time for estimating available bandwidth in a wireless network during uplink and downlink.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for determining available bandwidth of a cell is provided. The method includes estimating an available link capacity of a link with a cell for a user equipment based on a communication quality measured in the cell, estimating an available fraction of cell resources for the user equipment over the link based at least in part on received assistance information, estimating available bandwidth of the cell as an achievable throughput for the user equipment over the link as a function of the estimated available link capacity and the estimated available fraction of cell resources, and performing a network procedure based at least in part on comparing the achievable throughput to one or more thresholds.

In another example, an apparatus for determining available bandwidth of a cell is provided. The apparatus includes a link capacity estimating component operable for estimating an available link capacity of a link with a cell for a user equipment based on a communication quality measured in the cell, a cell resources estimating component operable for estimating an available fraction of cell resources for the user equipment over the link based at least in part on received assistance information, a bandwidth estimating component operable for estimating available bandwidth of the cell as an achievable throughput for the user equipment over the link as a function of the estimated available link capacity and the estimated available fraction of cell resources, and a network communications component operable for performing a network procedure based at least in part on comparing the achievable throughput to one or more thresholds.

In yet another example, an apparatus for determining available bandwidth of a cell is provided. The apparatus includes means for estimating an available link capacity of a link with a cell for a user equipment based on a communication quality measured in the cell, means for estimating an available fraction of cell resources for the user equipment over the link based at least in part on received assistance information, means for estimating available bandwidth of the cell as an achievable throughput for the user equipment over the link as a function of the estimated available link capacity and the estimated available fraction of cell resources, and means for performing a network procedure based at least in part on comparing the achievable throughput to one or more thresholds.

In a further example, a computer program product, stored on a non-transitory computer readable medium, is provided for determining available bandwidth of a cell. The computer program product includes code for causing at least one computer to estimate an available link capacity of a link with a cell for a user equipment based on a communication quality measured in the cell, estimate an available fraction of cell resources for the user equipment over the link based at least in part on received assistance information, estimate available bandwidth of the cell as an achievable throughput for the user equipment over the link as a function of the estimated available link capacity and the estimated available fraction of cell resources, and perform a network procedure based at least in part on comparing the achievable throughput to one or more thresholds.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
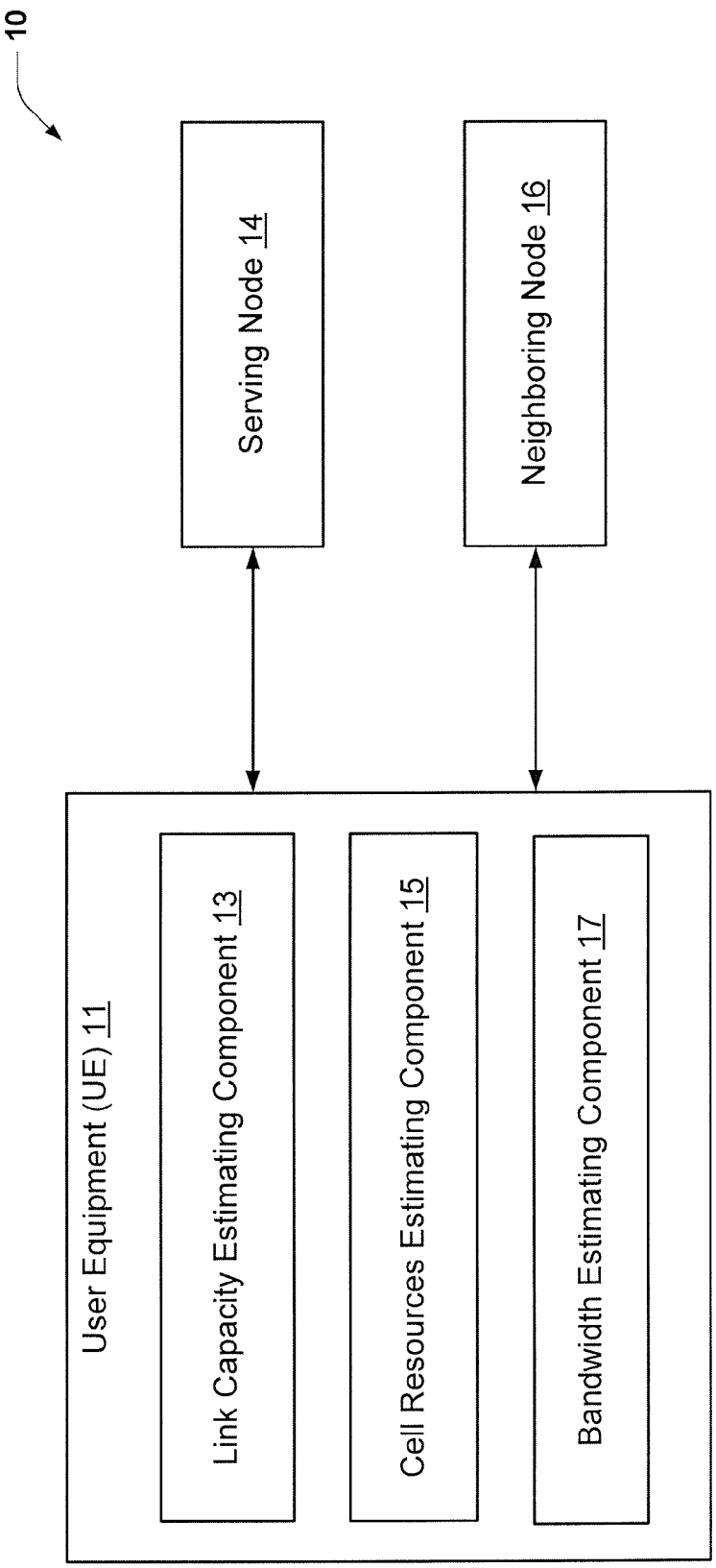
FIG. 1 is a block diagram of an aspect of a system, including a user equipment (UE) in communication with cells, for determining available downlink bandwidth of a cell.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present apparatus and methods include various aspects related to determining available downlink bandwidth of a cell. In an aspect, the cell may be operating according to a Universal Mobile Telecommunications System (UMTS) communication standard. In another aspect, the cell may be operating according to a Long Term Evolution (LTE) communication standard.

The apparatus and methods described herein may be used, for example, at a time when the UE has a packet to transmit, or at a time when a new traffic flow starts at the UE, or as a result of a periodic evaluation or in response to some conditions changing (for instance backhaul or radio conditions) in an initial network registration or call establishment process, a reselection procedure of the UE, or in a handover procedure of the UE in connected mode with an active call. An available downlink bandwidth may be determined by the UE while it is in idle mode and/or while it is in a connected mode.

In an aspect, a UE may be connected to a cell operating according to a Universal Mobile Telecommunications System (UMTS) communication standard. In such an aspect, the available downlink bandwidth of the cell can be estimated as a function of an estimated available link capacity and an estimated fraction of available cell resources while the UE is in the idle mode. The estimated available link capacity of the cell may be based on a signal-to-noise ratio (SNR) of a signal from the cell. For example, an SNR-related parameter may be determined and, based on the SNR-related parameter, a corresponding link capacity (or supported rate) may be determined based on accessing a rate look-up table, or executing an algorithm or function. In another example, the available link capacity can be estimated as a function of a determined path loss to the cell. In any case, the available link capacity can be an estimation of a communication quality at a cell determined based on one or more measurements of one or more signals received in the cell (e.g., SNR, path loss, etc.).

Further, the estimated available fraction of cell resources may relate to cell resources available as indicated by the cell, such as a transport block size (TBS), power headroom offset, etc., and can be determined based on received assistance information. For example, the received assistance information can include one or more parameters that can be indicative of the available fraction of cell resources, which may be used along with an estimated link capacity in estimating an available bandwidth. For example, the received assistance information can include a TBS, a channel quality indicator (CQI)-to-TBS mapping table, a CQI offset, a power headroom offset, etc. Thus, available bandwidth or an achievable throughput over an uplink or downlink at the cell can be determined based at least in part on using the assistance information along with the estimated link capacity, as described further herein.

In an aspect, a UE may be connected to a cell operating according to a Long Term Evolution (LTE) standard. In such an aspect, the estimated available fraction of cell resources may be based on an available number of codes for the cell. Optionally, the available downlink bandwidth of a cell can be further estimated as a function of an available traffic-to-pilot (T2P) ratio (also referred to herein as T2Pavailable) for the cell, and/or as a function of a measurement power offset (MPO) for the cell. For example, in various aspects, one or both of the available T2P ratio and MPO may be used to determine one or both of the estimated available link capacity and the estimated available fraction of cell resources. Further, in an aspect, a time-domain multiplexing (TDM) fraction also may be used to estimate the available downlink bandwidth of the cell. Still further, the available number of codes, the ratio of T2Pavailable/MPO, and/or the TDM fraction may be combined as a Channel quality indicator (CQI) offset which may be utilized to estimate the available downlink bandwidth of the cell. Thus, the present apparatus and methods can allow for evaluation of the cell for a variety of purposes relating to network communications.

Additionally, and in an aspect, a UE may determine available downlink traffic-to-pilot (T2P) ratio of the cell, which may allow for evaluating the cell for network communications. In one example, the UE can determine whether to handover communications from a cell based on an available T2P ratio. For example, the available T2P ratio can be estimated based on signal energy measured over a period of time. The signal energy can include that of a serving cell, neighboring cells, a total received energy, or the like. Over a period of time, such measurements can be used to determine a T2P used and a T2P maximum over the period of time. In one example, the available T2P can then be estimated by subtracting a current T2P from the maximum T2P.

In an aspect, the estimated available link capacity of a cell may be calculated as: Ec/Nt=Ecp/Nt+T2Pavailable. In another aspect, the estimated available link capacity of a cell may be calculated as: Ec/Nt=Ecp/Nt+MPO.

A supported rate corresponding to the calculated Ec/Nt may be determined based on an accessing a rate look-up table, or executing an algorithm or function. As such, the total bandwidth may be determined corresponding to a total number of codes used by the cell for the supportable rate. The total bandwidth may be scaled based on the available number of codes, the ratio of T2Pavailable/MPO, and/or the TDM fraction to determine the estimated available bandwidth. Additionally, the total bandwidth may be scaled down based on CQI offset, represented by the available number of codes, the ratio of T2Pavailable/MPO, and/or the TDM fraction.

In another aspect, the available downlink bandwidth of a cell can be estimated as a function of an estimated available link capacity and an estimated fraction of available cell resources while the UE is in the connected mode. For example, the UE may estimate an available fraction of cell resources for the UE based on an available number of codes for the cell. For example, a UE may estimate an available link capacity of a cell for a UE based on a channel quality index generated at the UE. More particularly, and in an aspect, the UE may estimate available link capacity by determining a supportable rate based on the channel quality index. The UE may determine a partial bandwidth corresponding to a total number of codes used by the cell for the supportable rate. The UE may scale the partial bandwidth based on at least one of an average served number of codes, a time-division multiplexing (TDM) fraction, and a ratio of T2Pavailable to MPO. In an aspect, the UE may estimate available bandwidth of the cell as a function of the estimated available link capacity, the estimated available fraction of cell resources (and/or the scaled partial bandwidth), and the connected mode throughput observed over the one or more past scheduling events.

In an additional aspect, the UE may be configured to determine an available T2P ratio, MPO, and TDM fraction for the cell. As such, the UE may be configured to estimate the available link capacity and/or the available fraction of cell resources based on the T2P ratio, the MPO, TDM fraction, and/or the channel quality index.

In an aspect, the available link capacity may be estimated by determining a supportable rate based on the channel quality index, determining a partial bandwidth corresponding to a total number of codes used by the cell for the supportable rate, scaling the partial bandwidth based on at least one of an average served number of codes, a time-division multiplexing (TDM) fraction, and a ratio of T2Pavailable/MPO to determine the partial available bandwidth, and combining the partial bandwidth to an observed connected mode throughput over one or more past scheduling events to determine the total available bandwidth.

When a UE is in an idle mode, an available downlink (DL) bandwidth of a communication link with a base station operating according to an LTE standard (also referred to as an eNodeB) may be estimated as a function of an estimated available link capacity (link_capacity) and an estimated fraction of available cell resources (alpha or $\alpha$), for example.

In accordance with this exemplary aspect, an estimated available link capacity (link_capacity), which may be similar to a Channel Quality Indicator (CQI) generated at the UE in connected mode, may be derived from information available at the UE in the idle mode. In an aspect, estimated available link capacity may be determined based on pilot energy (Ep/Nt) and a nominal Physical Downlink Shared Channel (PDSCH)-to-Energy Per Resource Element (EPRE) offset. For example, the sum of Ep/Nt (in the decibel domain) and PDSCH-to-EPRE offset (in the decibel domain) may provide a pilot tone signal-to-noise ratio (SNR) (PDSCH_SNR). The PDSCH_SNR may be converted to link capacity (e.g., a rate), in an aspect, using a CQI index-to-rate lookup table. In another aspect, the PDSCH_SNR may be converted to link capacity based on the Shannon capacity equation. In yet another aspect, a UE may be configured to map PDSCH_SNR with CQI indices while in the connected mode, which mapping could then be used by the UE in idle mode to convert the measured Reference Signal (RS) SNR to a CQI index in the idle mode. The UE may then use a CQI index-to-rate lookup table to determine an estimated link capacity (e.g., rate) based on the CQI index. In an aspect, the terms link capacity and rate may be used interchangeably to relate to an amount of data that may be supported during UE communications.

In this example as well, the estimated fraction of available cell resources can be determined from assistance information related to the cell, and an available bandwidth/achievable throughput can be estimated based on the assistance information and determined link capacity.

In another example, an estimated fraction of available cell resources (a) may be derived based on a function of a resource block fraction (RB) (alpha_RB) and a TDM fraction (alpha_TDM). In an aspect, the number of resource blocks (alpha_RB) may be determined based on historical data: resource blocks that were allocated to the UE in the connected mode in the recent past (e.g., over a configurable time window of T seconds) when the traffic volume was above a configurable threshold (e.g., traffic volume was at least X bits during time window T). In another aspect, and in the absence of enough history to determine the number of resource blocks, a default value may be used. For example, if the selected amount of time (e.g., the window of time T seconds) has not yet elapsed and/or if the traffic volume was not above a configurable threshold (e.g., was not at least X bits) during the window of time, the UE 11 may determine that there is not enough historical data to determine a number of resource blocks. As such, a default value may be used for the number of resource blocks. In yet another aspect, the number of resource blocks may be determined based on a total traffic-to-pilot (T2P) power transmitted from the eNodeB during a configurable window of time when traffic volume was above a configurable threshold. The resource block fraction (alpha_RB) may be determined based on available resource blocks divided by total resource blocks (assuming no traffic from other users).

The TDM fraction (alpha_TDM), which provides information related to resource blocks provided to the UE from the eNodeB for every one out of a configurable number N of time transmission intervals (TTI), may be determined based on historical data: a number of resource blocks provided for every 1/N TTIs over a configurable time window when traffic volume was above a configurable threshold. The TDM fraction (alpha_TDM) may be an average of the historical data.

As such, and in an aspect, the estimated fraction of available cell resources (a) may be determined by alpha_RB*alpha_TDM.

In another aspect, a fraction of available cell resources may be provided to the UE by at least one network entity. For example, the estimated fraction of available cell resources may be provided to the UE by a serving eNodeB, a network node, a server, one or more other UEs (e.g., the value may be crowd-sourced), or any combination thereof. In such an aspect, the UE may not have to perform an estimation but, rather, may use the provided value. In yet another aspect, the at least one network entity may provide alpha_RB and alpha_TDM to the UE, such that the UE may estimate a fraction of available cell resources (a) as a function of alpha_RB and alpha_TDM as described herein.

To ensure the estimate of available downlink (DL) bandwidth is conservative (e.g., the estimate may be a lower bound), a configurable backoff_factor, or offset, may be applied to the function link_capacity (or rate)*$\alpha$.

In another aspect, when a UE is in the connected mode, the available DL bandwidth may be estimated based on a rate (or link capacity) estimate in connected mode (R_calculated) and a measured throughput in connected mode (R_measured). R_calculated may be determined based on $\alpha$*link_capacity (or rate). An estimated fraction of available cell resources (a) may be determined in a manner similar to that described herein for a UE in idle mode; however, CQI may be used instead of a derived ratio of pilot energy (Ep) to noise-plus-interference ratio (Nt) and the rate may be adjusted based on an available traffic-to-pilot (T2P) ratio and the TDM fraction. The link_capacity may be determined based on the CQI, which is available to the UE in connected mode. R_measured may be determined based on historical data: throughput measured at the UE in connected mode during a configurable time window.

When an offered load for the UE is small, the connected mode estimate of available DL bandwidth may be based more heavily on R_calculated. When an offered load is large, the connected mode estimate of available DL bandwidth may be based more heavily on R_measured.

Referring to FIG. 1, in one aspect, a wireless communication system 10 includes a UE 11 for communicating with one or more nodes, such as serving node 14, to receive wireless network access. For example, the serving node 14 and a neighboring node 16 can each be substantially any access point, such as a Node B (e.g., a macro node, pico node, or femto node), a mobile base station, a relay node, a UE (e.g., communicating in peer-to-peer or ad-hoc mode with UE 11), a portion thereof, and/or the like. Moreover, serving node 14 and neighboring node 16 can represent different cells provided by a single base station. In an aspect, serving node 14 and neighboring node 16 may be operating according to a Long Term Evolution (LTE) communication standard. In another aspect, serving node 14 and neighboring node 16 may be operating according to a Universal Mobile Telecommunications System (UMTS) communication standard.

In addition, UE 11 can be a mobile or stationary terminal, a modem (or other tethered device), a portion thereof, or the like. The UE 11 can function in one of an idle mode or a connected mode at any given time.

In an aspect, UE 11 includes a link capacity estimating component 13 for estimating an available link capacity of a cell, such as serving node 14 or neighboring node 16. Further, UE 11 includes a cell resources estimating component 15 for estimating an available fraction of cell resources that may be used by UE 11. Additionally, UE 11 includes a bandwidth estimating component 17 for estimating an available bandwidth of the cell as a function of the estimated available link capacity and the estimated fraction of available cell resources.

Figure 2:
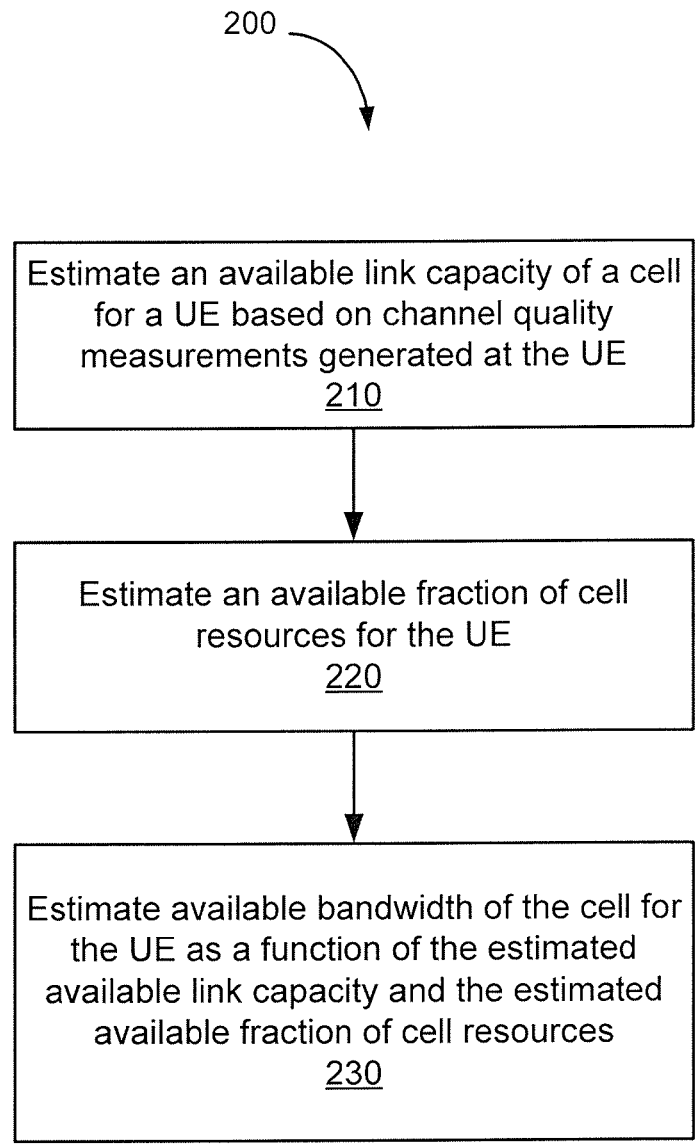
FIG. 2 is a flow chart of a method for determining available downlink bandwidth of a cell.

Referring to FIG. 2, a method 200 may be used to estimate an available bandwidth of a cell (e.g., serving node 14) for UE 11. UE 11 and/or bandwidth estimating component 17, in communication with link capacity estimating component 13 and cell resources estimating component 15, may perform aspects of method 200 while in an idle mode or in a connected mode.

At 210, the method 200 includes estimating an available link capacity of a cell for a user equipment. For example, link capacity estimating component 13 may be configured to estimate an available link capacity for UE 11. As noted above, UE 11 may use various mechanisms for estimating available link capacity while UE 11 is in an idle mode and/or connected mode, and when UE 11 is associated with a UMTS or LTE system.

For example, UE 11 may determine a signal-to-noise ratio (SNR), or SNR-related parameter, of a signal from the serving node 14 and then may estimate the available link capacity by, for example, determining a corresponding link capacity (or supported rate) for the SNR and/or SNR-related parameter based on accessing a rate look-up table, or executing an algorithm or function. In addition or alternatively, as noted above, UE 11 may determine a traffic-to-pilot (T2P) ratio and/or a measurement power offset (MPO) for the serving node 14 and use these determined value(s) to estimate the link capacity, such as discussed above. For example, UE 11 may estimate the available link capacity based on Ep/Nt and a nominal PDSCH-to-EPRE, such as discussed above.

It should be noted that these are but some exemplary mechanisms that UE 11 may use to estimate the available link capacity, and in other implementations other mechanisms may be used.

At 220, the method 200 includes estimating an available fraction of cell resources for the user equipment. For example, cell resources estimating component 15 may be configured to estimate an available fraction of cell resources for UE 11. For example, UE 11 may be configured to estimate an available fraction of cell resources based on an available T2P ratio, TDM fraction, channel quality index (CQI) and/or MPO. Additionally, or alternatively, UE 11 may be configured to estimate an available fraction of cell resources based on a resource block fraction (alpha_RB) and a Time-Domain Multiplexing (TDM) fraction (alpha_TDM).

In an aspect, an estimate of available fraction of cell resources may be provided to the UE 11 by a network entity.

At 230, the method 200 includes estimating available bandwidth of the cell for the user equipment as a function of the estimated available link capacity and the estimated available fraction of cell resources. For example, bandwidth estimating component 17 may be configured to estimate available bandwidth of the cell for UE 11.

In an aspect, serving node 14 and neighboring node 16 may be operating according to a Universal Mobile Telecommunications System (UMTS) communication standard. Such aspect may now be described with respect to FIGS. 3-13. UE 11 may be in an idle mode or a connected mode at any given time.

Figure 3:
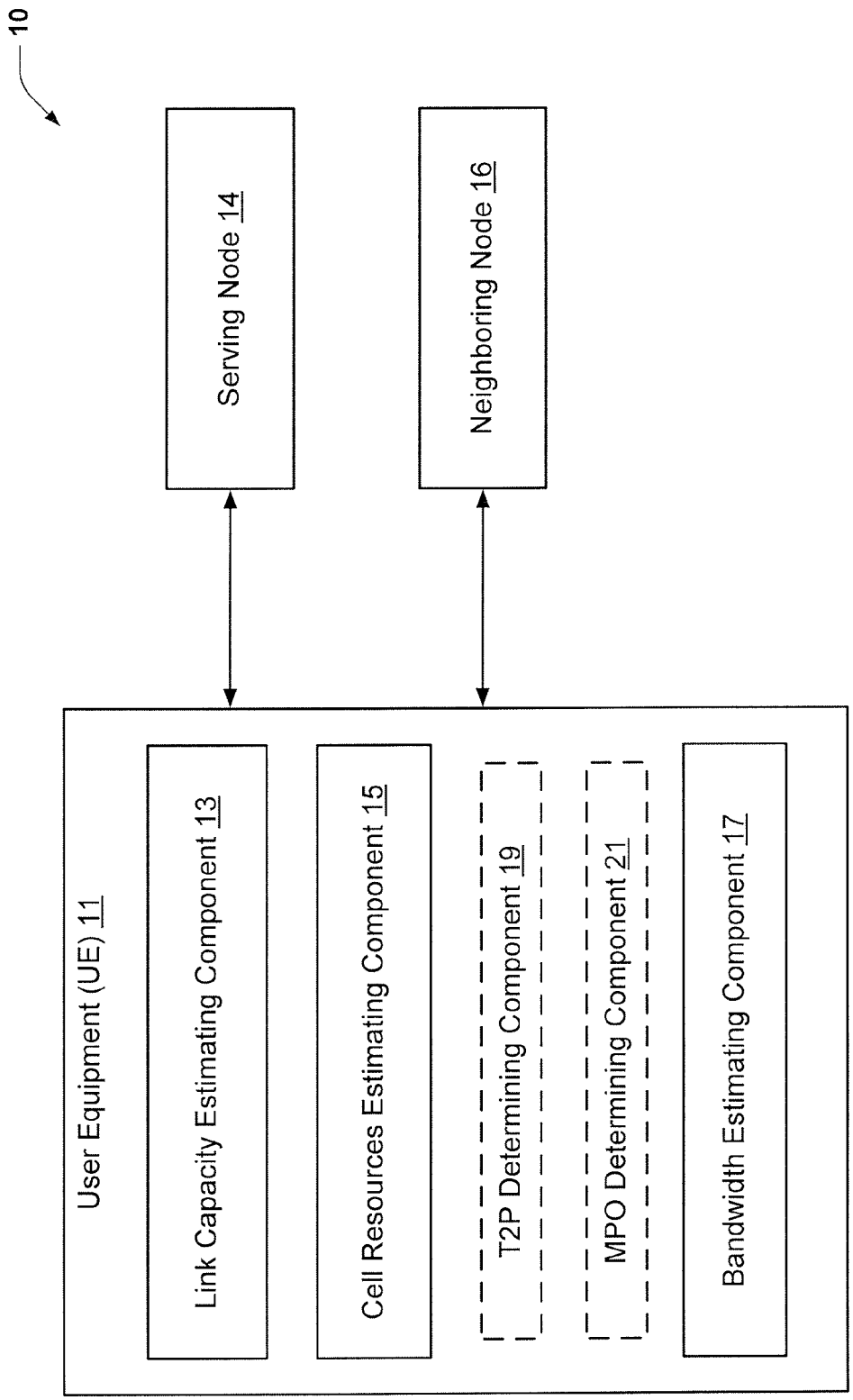
FIG. 3 is a block diagram of aspects of a UE in an idle mode for determining available downlink bandwidth at a cell operating according to a Universal Mobile Telecommunications System (UMTS) standard.

Referring to FIG. 3, additional aspects of UE 11, which may be used when UE 11 is in an idle mode and operating according to UMTS, are shown. UE 11 may include link capacity estimating component 13, cell resources estimating component 15, and bandwidth estimating component 17, as described herein with respect to FIG. 1. In an aspect, and optionally, UE 11 also may include a traffic-to-pilot (T2P) ratio determining component 19 for estimating a T2P ratio of a cell, and/or a measurement power offset (MPO) determining component 21 for estimating an MPO for a cell, where the available bandwidth of the cell may further be a function of the T2P ratio and/or the MPO. The additional, optional, components, which are not shown as part of UE 11 in FIG. 1, may optionally be used by UE 11 when operating in an idle mode and according to UMTS.

Figure 4:
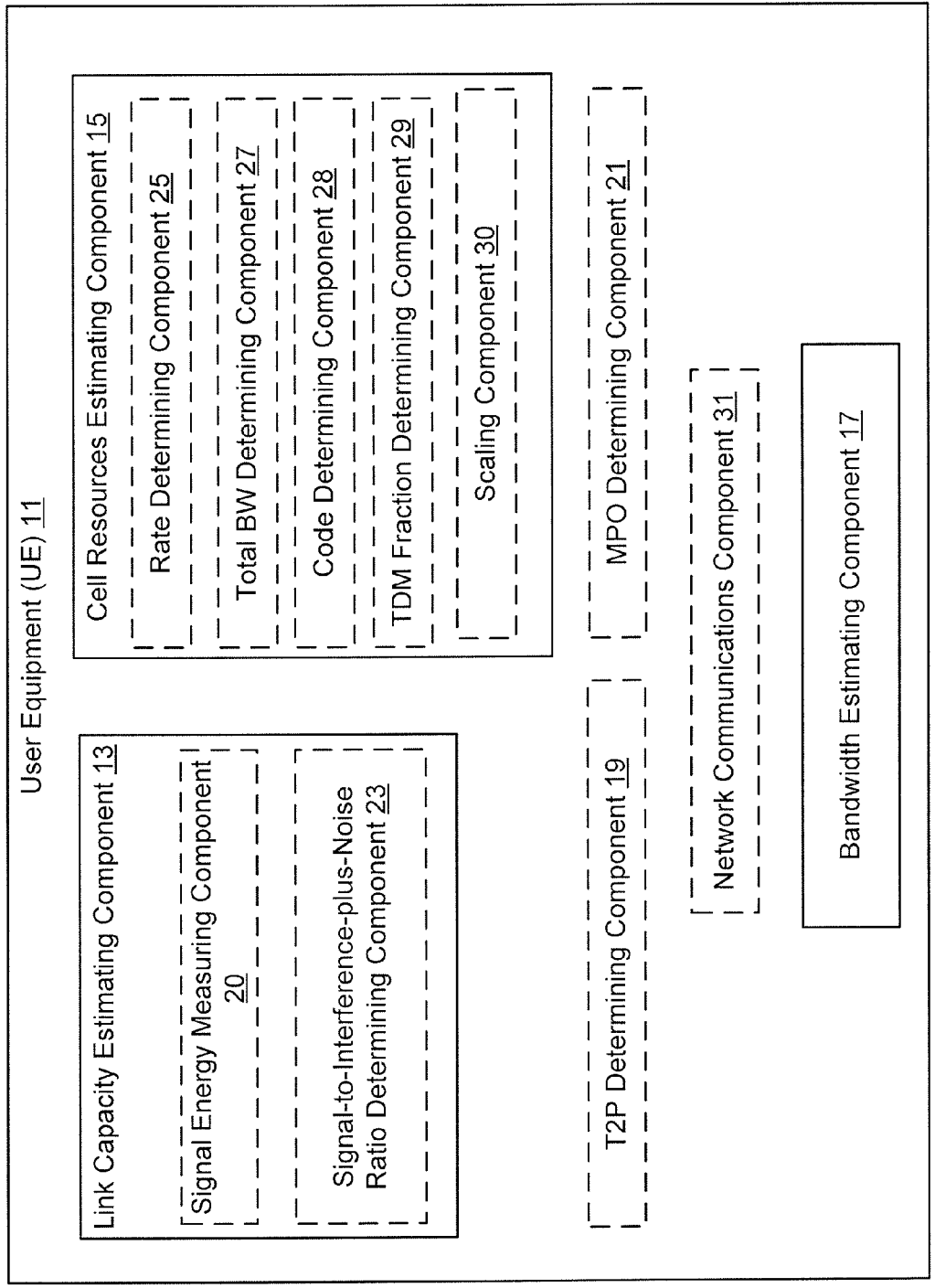
FIG. 4 is a block diagram of additional aspects of a UE in an idle mode for determining available downlink bandwidth at a cell operating according to UMTS.

Referring to FIG. 4, additional aspects of UE 11, which may be used when UE 11 is in an idle mode and operating according to LTE, are shown. More particularly, FIG. 4 shows additional, detailed aspects of UE 11 as shown in, and described with respect to, FIG. 3.

In an aspect, and optionally, UE 11 and/or link capacity estimating component 13 may include a signal energy measuring component 20 for measuring signal energy associated with one or more cells. Also, UE 11 and/or link capacity estimating component 13 may include a signal-to-interference-plus-noise (SIR) ratio determining component 23 for calculating one or more signal relative to interference ratios, such as a SIR, from the measured signal energy associated with one or more cells. The additional, optional, components shown within link capacity estimating component 13 and cell resources estimating component 15, which are not shown as part of UE 11 in FIG. 1 or FIG. 2, may optionally be used by UE 11 when operating in an idle mode and according to UMTS.

Further, in another optional aspect, UE 11 and/or cell resources estimating component 15 may include a rate determining component 25 for determining a supportable rate based on an SNR-related parameter. For example, cell resources estimating component 15 and/or rate determining component 25 may access a stored or remotely available rate look-up table, or execute an algorithm or function, to estimate a supported rate corresponding to the calculated SNR-related parameter, where the supported rate may be further based on a category value associated with UE 11. For instance, the category may be one of a High-Speed Packet Access (HSPA) UE category, which may describe different characteristics, such as, for example, different High-Speed Downlink Packet Access (HSDPA) data rates for UE 11. These HSPA categories may be used to cater to a particular one of a number of implementations of the HSDPA standard for UE 11, which may allow for different levels of performance to be used, including a maximum HSDPA data rate. The characteristics of UE 11 can be easily communicated to the network, based on the HSPA category, allowing the network to communicate with UE 11 in a suitable manner.

Also, in this aspect, UE 11 and/or cell resources estimating component 15 may include a total bandwidth determining component 27 for determining a total bandwidth corresponding to a total number of codes used by the cell for the supportable rate. For example, cell resources estimating component 15 and/or total bandwidth determining component 27 may access a stored or remotely available rate look-up table, or execute an algorithm or function, to determine the total bandwidth that is correlated with the total number of codes used by the cell for the supportable rate.

Further, in this aspect, UE 11 and/or cell resources estimating component 15 may include a code determining component 28 for determining one or more available number of code-related metrics. For example, code determining component 28 may include an algorithm configured to determine and store the available number of codes for the cell according to one or more of: averaging a served number of codes per past scheduling event based on one or more past scheduling events; averaging a served number of codes per past scheduling event for the one or more past scheduling events over a time period when an amount of data received satisfied at least a minimum amount of data threshold; a fixed amount of codes when the one or more past scheduling events do not meet a freshness threshold; and a given amount of codes received from at least one network entity.

In this aspect, UE 11 and/or cell resources estimating component 15 may include Time-Division Multiplexing (TDM) fraction determining component 29, which may be configured to determine a TDM fraction according to one or more of: averaging TDM fractions per past scheduling event based on one or more past scheduling events; averaging TDM fractions per past scheduling event for the one or more past scheduling events over a time period when an amount of data received satisfied at least a minimum amount of data threshold; determining a fixed TDM fraction when the one or more past scheduling events do not meet a freshness threshold; and receiving TDM fraction information from at least one network entity.

Additionally, in this aspect, UE 11 and/or cell resources estimating component 15 may include a scaling component 30 for scaling the total bandwidth based on one or more factors, such as one or any combination of the available number of codes, an average served number of codes, T2Pavailable, MPO, the ratio of T2Pavailable/MPO, and/or the TDM fraction, thereby defining the estimated available bandwidth.

Additionally, in a further optional aspect, UE 11 may additionally include a network communications component 31 for performing one or more network communications procedures based on the estimated available bandwidth for a cell, as determined by bandwidth estimating component 17. For example, the network communication procedures performed by network communications component 31 may include, but are not limited to, a cell reselection procedure, a handover procedure, and/or switching from UMTS to WLAN/WiFi.

According to an example, link capacity estimating component 13 and/or signal energy measuring component 20 can obtain or determine signal energy measurements of a serving cell, neighboring cells, total received energy, or the like, over one or more time periods. For example, link capacity estimating component 13 and/or signal energy measuring component 20 can obtain or measure one or more of: pilot energy of a pilot channel received from the serving node 14, such as Ecp, which is a chip level energy of a Common Pilot Channel (CPICH); Ec, which is a chip level energy for a data channel, such as a High-Speed Physical Download Shared Channel (HS-PDSCH); Io, which is a total energy received from all cells, which can include cells of serving node 14 or neighboring node 16; Nt, which is a total energy received from non-serving, and hence interfering, cells such as neighboring node 16. In one example, the measurements (or combinations thereof) for one or more of the time periods can be logged by the signal energy measuring component 20. The time periods can be fixed lengths of time, a subframe defined in the network, or the like.

Additionally, link capacity estimating component 13 and/or SIR ratio determining component 23 can compute and store Ecp/Nt, based on the measured chip level energy of the CPICH and the measured total energy received from non-serving/interfering cells for one or more time periods.

Further, T2P ratio determining component 19 may determine and store an available T2P ratio for the cell for one or more time periods based on the measured Ecp, Nt, and Io at one time period or over multiple time periods, based on the measured signal energies as described in more detail below. Alternatively, in an aspect, T2P ratio determining component 19 may determine and store an available T2P ratio based on receiving a given available T2P ratio from at least one network entity.

Also, MPO determining component 21 may determine and store an MPO. For example, MPO determining component 21 may access a memory location where a last received MPO is saved, and MPO determining component 21 may use the last received MPO as the MPO for use in the current available bandwidth calculations. Alternatively, MPO determining component 21 may store a given MPO to use as the MPO, such as when the last received MPO is not available or exceeds an age threshold corresponding to a time period in which the last received MPO may no longer represent a valid MPO for use in current calculations. In an aspect, the given MPO may be received from at least one network entity.

Accordingly, in one aspect, estimated available bandwidth may be a function of the estimated available link capacity plus the available T2P ratio, and factored according to the estimated available fraction of cell resources. Specifically, in this aspect, link capacity estimating component 13 may calculate the estimated available link capacity of a cell as: $Ec/Nt=Ecp/Nt+T2Pavailable$, and cell resources estimating component 15 and/or rate determining component 25 may access a rate look-up table, or execute an algorithm or function, to estimate a supported rate corresponding to the calculated Ec/Nt. TDM fraction determining component 29 determines a TDM fraction. Further, cell resources estimating component 15 and/or total bandwidth determining component 27 determines a total bandwidth corresponding to a total number of codes used by the cell for the supportable rate. Finally, cell resources estimating component 15 and/or scaling component 30 scales the total bandwidth based on the available number of codes and/or the TDM fraction to determine the estimated available bandwidth.

In another aspect, estimated available bandwidth may be a function of the estimated available link capacity plus MPO, and factored according to the estimated available fraction of cell resources. Specifically, in this aspect, link capacity estimating component 13 may calculate the estimated available link capacity of a cell as: Ec/Nt=Ecp/Nt+MPO, and cell resources estimating component 15 and/or rate determining component 25 may estimate a supported rate corresponding to the calculated Ec/Nt. TDM fraction determining component 29 determines a TDM fraction. Further, cell resources estimating component 15 and/or total bandwidth determining component 27 determines a total bandwidth corresponding to a total number of codes used by the cell for the supportable rate. Finally, cell resources estimating component 15 and/or scaling component 30 scales the total bandwidth based on the available number of codes and/or the TDM fraction to determine the estimated available bandwidth.

In a further aspect, estimated available bandwidth may be a function of the estimated available link capacity plus MPO and the available T2P ratio, and factored according to the estimated available fraction of cell resources, which also may be a function of a ratio of the available T2P ratio and the MPO. Specifically, in this aspect, link capacity estimating component 13 may calculate the estimated available link capacity of a cell as: Ec/Nt=Ecp/Nt+MPO, and cell resources estimating component 15 and/or rate determining component 25 may estimate a supported rate corresponding to the calculated Ec/Nt. TDM fraction determining component 29 determines a TDM fraction. Further, cell resources estimating component 15 and/or total bandwidth determining component 27 determines a total bandwidth corresponding to a total number of codes used by the cell for the supportable rate. Finally, cell resources estimating component 15 and/or scaling component 30 scales the total bandwidth based on the available number of codes, the ratio of T2Pavailable/MPO, and/or the TDM fraction to determine the estimated available bandwidth.

In yet another aspect, estimated available bandwidth may be a function of the estimated available link capacity plus the available T2P ratio, and factored according to the estimated available fraction of cell resources, which also may be a function of an average of the served number of codes. Specifically, in this aspect, link capacity estimating component 13 may calculate the estimated available link capacity of a cell as: Ec/Nt=Ecp/Nt+T2Pavailable, and cell resources estimating component 15 and/or rate determining component 25 may estimate a supported rate corresponding to the calculated Ec/Nt. TDM fraction determining component 29 determines a TDM fraction. Further, cell resources estimating component 15 and/or total bandwidth determining component 27 determines a total bandwidth corresponding to a total number of codes used by the cell for the supportable rate. Finally, cell resources estimating component 15 and/or scaling component 30 scales the total bandwidth based on an average of a served number of codes and/or the TDM fraction to determine the estimated available bandwidth.

In an additional aspect, estimated available bandwidth may be a function of the estimated available link capacity plus the MPO, and factored according to the estimated available fraction of cell resources, which also may be a function of an average of the served number of codes. Specifically, in this aspect, link capacity estimating component 13 may calculate the estimated available link capacity of a cell as: Ec/Nt=Ecp/Nt+MPO, and cell resources estimating component 15 and/or rate determining component 25 may estimate a supported rate corresponding to the calculated Ec/Nt. TDM fraction determining component 29 determines a TDM fraction. Further, cell resources estimating component 15 and/or total bandwidth determining component 27 determines a total bandwidth corresponding to a total number of codes used by the cell for the supportable rate. Finally, cell resources estimating component 15 and/or scaling component 30 scales the total bandwidth based on an average of a served number of codes and/or the TDM fraction to determine the estimated available bandwidth.

In another aspect, estimated available bandwidth may be a function of the estimated available link capacity plus the MPO, and factored according to the estimated available fraction of cell resources, which may be a function of an average of the served number of codes and a ratio of the available T2P ratio and the MPO. Specifically, in this aspect, link capacity estimating component 13 may calculate the estimated available link capacity of a cell as: Ec/Nt=Ecp/Nt+MPO, and cell resources estimating component 15 and/or rate determining component 25 may estimate a supported rate corresponding to the calculated Ec/Nt. TDM fraction determining component 29 determines a TDM fraction. Further, cell resources estimating component 15 and/or total bandwidth determining component 27 determines a total bandwidth corresponding to a total number of codes used by the cell for the supportable rate. Finally, cell resources estimating component 15 and/or scaling component 30 scales the total bandwidth based on an average of a served number of codes, the ratio of T2Pavailable/MPO, and/or the TDM fraction to determine the estimated available bandwidth.

Figure 5:
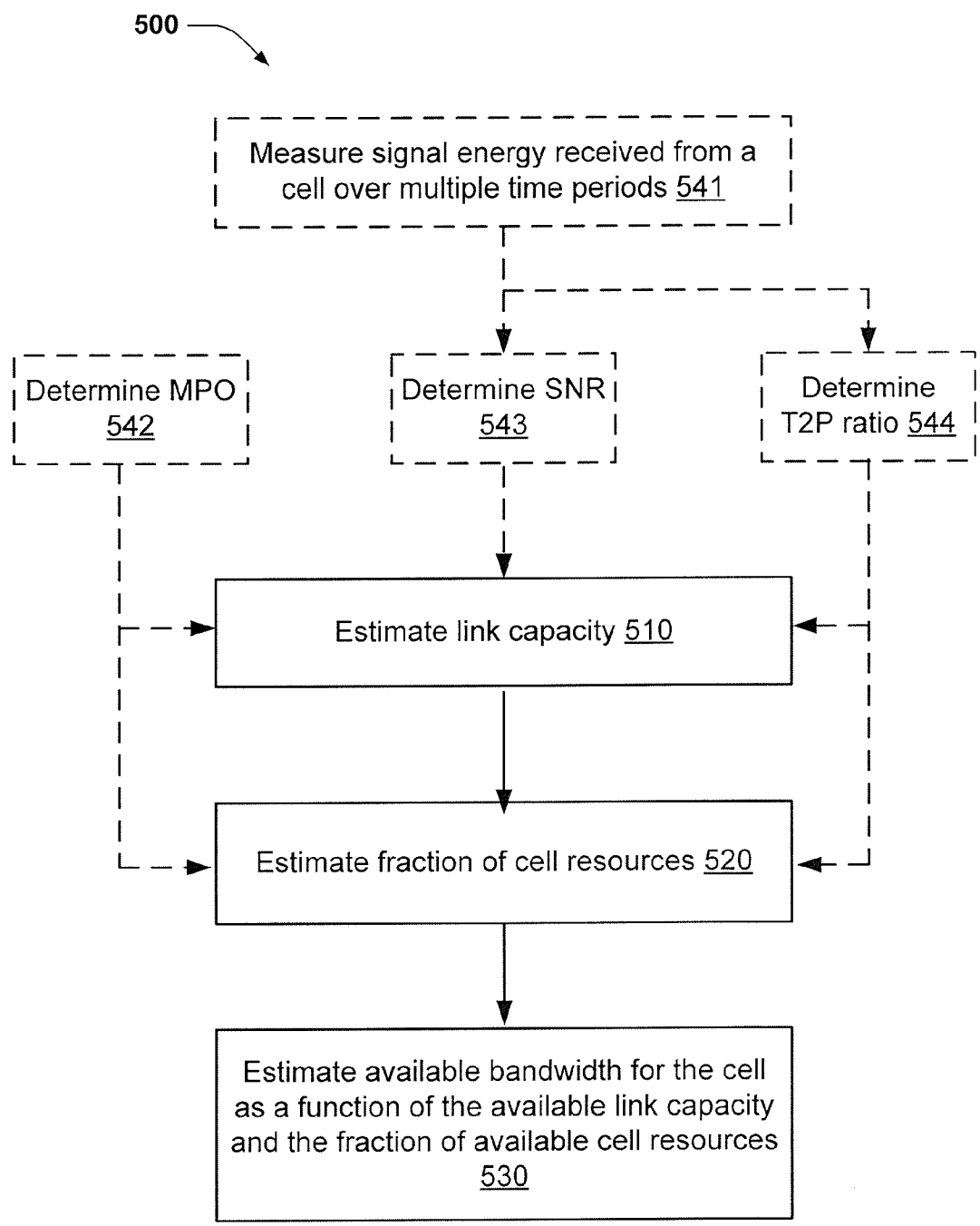
FIG. 5 is a flowchart showing a method for determining available downlink bandwidth of a cell operating according to UMTS by a UE in an idle mode.

Referring to FIG. 5, in an aspect, a method 500 may be used for determining available downlink bandwidth while UE 11 is in an idle mode. Aspects of method 500 may be performed by link capacity estimating component 13, cell resources estimating component 15, bandwidth estimating component 17, T2P determining component 19, and/or MPO determining component 21, as shown in various levels of detail in FIGS. 1, 3, and 4.

At 510, the method 500 includes estimating an available link capacity of a cell. In an aspect, the available link capacity of a cell may be estimated based on a signal-to-noise ratio (SNR) of a signal from the cell. For example, in an aspect, link capacity estimating component 13 may be configured to determine an estimated available link capacity based, at least in part, on measured signal energy and/or one or more determined SNR-related parameters, and optionally further based on T2Pavailable and/or MPO, as described herein.

Optionally, at 541, the method 500 includes measuring signal energy received from a cell over multiple time periods. For example, in an aspect, link capacity estimating component 13 and/or signal energy measuring component 20 may be configured to perform or obtain these measurements, as described herein.

Optionally, at 543, the method 500 includes determining a SNR for the cell. For example, in an aspect, link capacity estimating component 13 and/or signal-to-interference-plus-noise ratio determining component 23 may be configured to compute this ratio from the measured signal energy, as described herein.

Optionally, at 544, the method 500 includes determining an available T2P ratio for the cell. For example, in an aspect, UE 11 may include T2P estimating component 19 configured to compute this ratio, at least in part, from the measured signal energy, as described herein.

Optionally, at 542, the method 500 includes determining an MPO for the cell. For example, in an aspect, UE 11 may include MPO determining component 21 configured to determine the MPO based on prior used MPOs or a fixed MPO, as described herein.

At 520, the method 500 includes estimating an available fraction of cell resources. In an aspect, the available fraction of cell resources may be estimated based on an available number of codes for the cell. For example, in an aspect, cell resources estimating component 15 may be configured to determine an estimated fraction of available cell resources based, at least in part, on an available number of codes (determined by code determining component 28), and optionally further based on T2Pavailable, MPO, and/or a TDM fraction, as described herein.

At 530, the method 500 includes estimating available bandwidth of the cell as a function of the available link capacity and the fraction of available cell resources. For example, in an aspect, bandwidth estimating component 17 may be configured to communicate with link capacity estimating component 13 and cell resources estimating component 15 to determine an available bandwidth for a cell, based at least in part on an SNR and an available number of codes, and optionally further based on T2Pavailable, MPO, and/or a TDM fraction as described herein.

Figure 6:
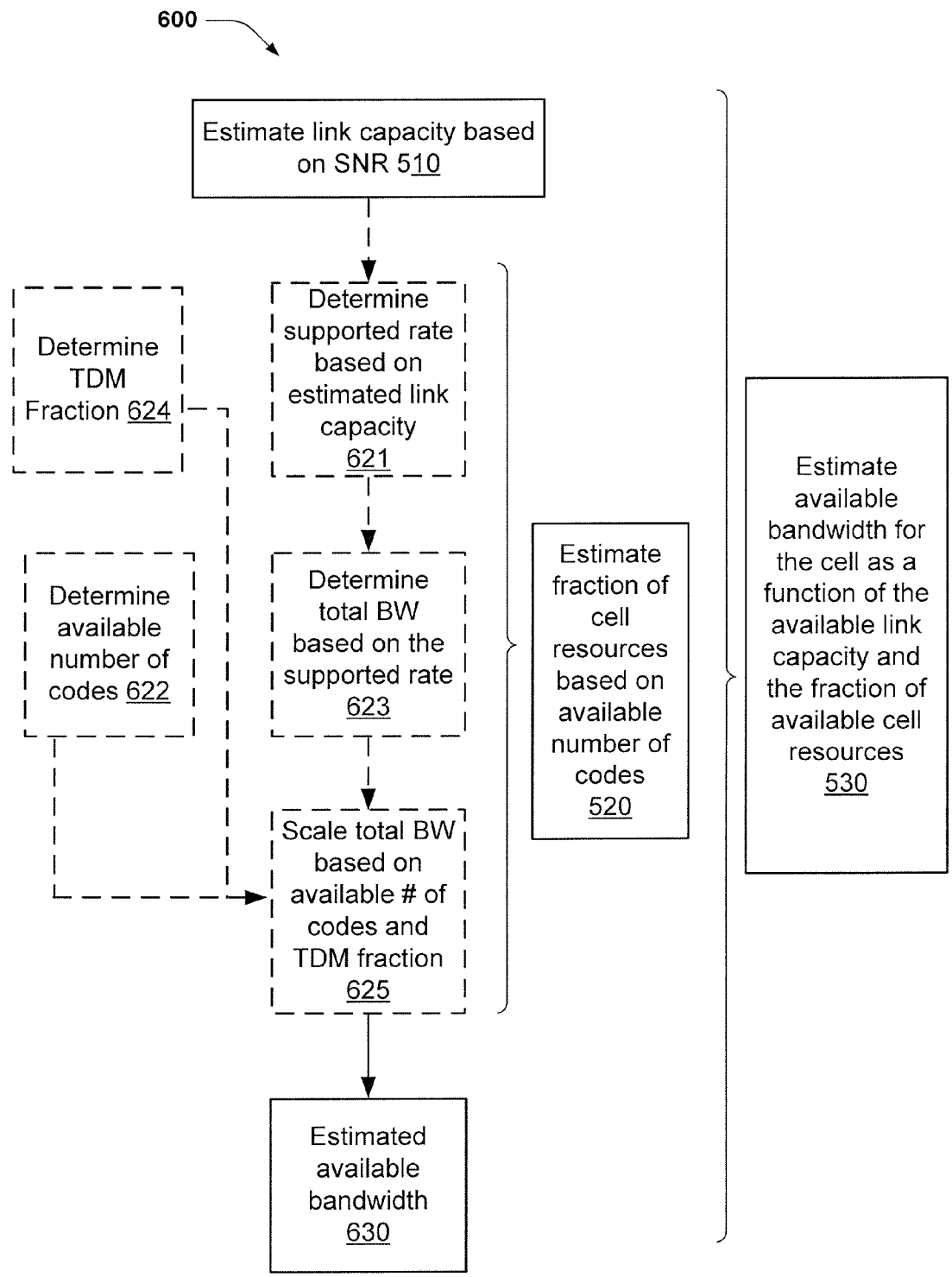
FIG. 6 is a flowchart of additional aspects of the method of FIG. 5.

Referring to FIG. 6, in an aspect, a method 600 may be used for determining available downlink bandwidth while UE 11 is in an idle mode. Method 600 may include additional aspects of method 500. Aspects of method 600 may be performed by link capacity estimating component 13, cell resources estimating component 15, bandwidth estimating component 17, T2P determining component 19, and/or MPO determining component 21, as shown in various levels of detail in FIGS. 1, 3, and 4.

At 510, as described herein with respect to FIG. 5, the method 600 includes estimating link capacity. The link capacity estimate may be based on SNR.

At 621, the method 600 includes determining a supported rate based on the estimated link capacity. For example, in an aspect, rate determining component 25 may be configured to determine the supportable rate based on a calculated SNR-related parameter (determined by signal-to-interference-plus-noise ratio determining component 23), as described herein.

At 623, the method 600 includes determining a total bandwidth based on the supported rate. For example, in an aspect, total bandwidth determining component 27 may be configured to estimate a total bandwidth based on the supportable rate (determined by rate determining component 25), as described herein.

At 622, the method 600 includes determining an available number of codes. For example, in an aspect, code determining component 28 may be configured to estimate an available number of code parameter based on the supportable rate, as described herein.

At 624, the method 600 includes determining a TDM fraction. For example, in an aspect, TDM fraction determining component 29 may be configured to determine a TDM fraction, as described herein.

At 625, the method 600 includes scaling the total bandwidth based at least on an available number of codes and/or, optionally, the TDM fraction. For example, in an aspect, scaling component 30 may be configured to scale the total bandwidth based on the available number of codes and/or, optionally, a TDM fraction.

In an aspect, actions 621-625 may comprise estimating a fraction of cell resources, which is shown at 520 of method 500. The fraction of cell resources may be estimated based on an available number of codes.

At 630, the method 600 includes estimating an available bandwidth based on 510, 621-625.

As a result, at 530 of method 500, the operation at 630 of estimating available bandwidth of the cell as a function of the available link capacity and the fraction of available cell resources, according to actions 510, 621-625, generates the estimated available bandwidth.

Figure 7:
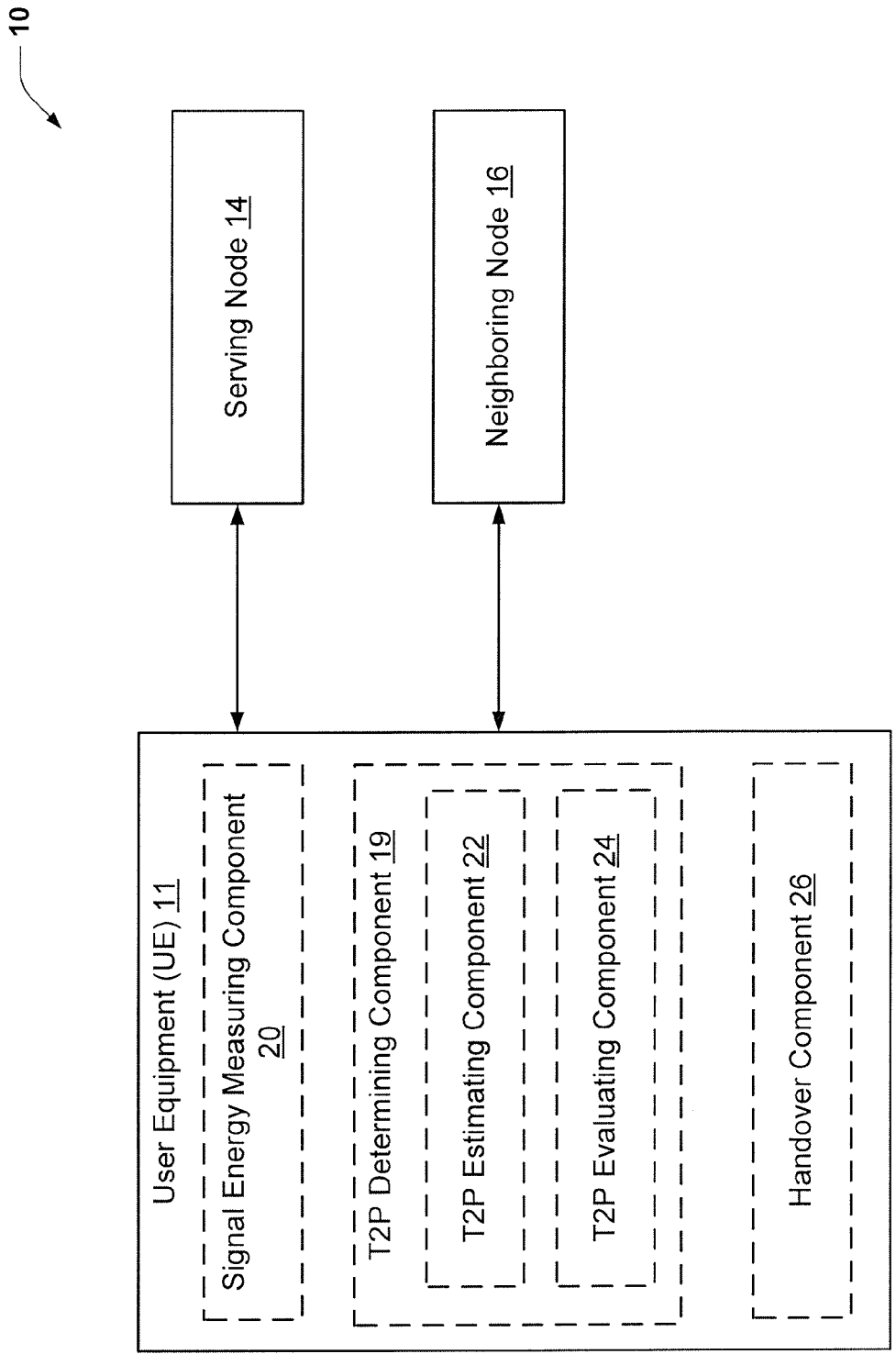
FIG. 7 is a block diagram of one aspect of a system, including a UE in communication with cells, for determining available traffic-to-pilot (T2P) ratio at a cell operating according to UMTS when the UE is in an idle mode.

Referring to FIG. 7, additional aspects of UE 11, which may be used when UE 11 is in an idle mode and operating according to UMTS, are shown. UE 11 may include additional, optional, components within UE 11 and T2P determining component 19, as shown having various levels of detail in FIGS. 1, 3, and 4, for determining an available T2P ratio for a cell (e.g., performing action 544 of method 500, described herein with respect to FIG. 5). UE 11 optionally includes a signal energy measuring component 20, which may be included within link capacity estimating component 13, as shown in FIG. 4, for measuring signal energy of a serving cell, neighboring cells, total received energy, or the like. UE 11 optionally may include a T2P determining component 19 (also shown in FIGS. 3 and 4), which itself may include a T2P estimating component 22 for estimating a T2P ratio (e.g., an available T2P) at a cell based on one or more signal energy measurements and a T2P evaluating component 24 for evaluating a cell for communication based on the estimated T2P ratio. UE 11 can optionally include a handover component 26 for determining whether to handover communications from the cell based on the estimated T2P. The additional, optional, components shown within UE 11 and T2P determining component 19, which are not shown as part of UE 11 in FIGS. 1, 3, and 4, may optionally be used by UE 11 when operating in an idle mode and according to UMTS.

According to an example, signal energy measuring component 20 can obtain signal energy measurements in one or more time periods. For example, signal energy measuring component 20 can obtain measurements of total energy received from all cells (Io), which can include cells of serving node 14 or neighboring node 16, or cells represented as nodes 14 and 16. Moreover, for example, signal energy measuring component 20 can obtain measurements of energy received from non-serving cells (Nt), which can include neighboring node 16, and/or measurements of pilot energy (Ec) received from the serving node 14. In one example, the measurements (or combinations thereof) for one or more of the time periods can be logged by the signal energy measuring component 20. The time periods can be fixed lengths of time, a subframe defined in the network, or the like.

T2P estimating component 22 can estimate a T2P ratio for serving node 14 during a given time period based on at least some of the signal measurements. For example, signal energy measuring component 20 can compute the T2P ratio for serving node 14 based on the formula $$\frac{Io - Nt}{Ec},$$

where Io, Nt, Ec are obtained by signal energy measuring component 20. In another example, signal energy measuring component 20 can obtain or otherwise derive signal measurements related to serving node 14 as $$\frac{Ec}{Io}$$

and $$\frac{Ec}{Nt}.$$

In this example, T2P estimating component 22 can estimate T2P of the serving node 14 based on the formula $$\left(\frac{Ec}{Io}\right)^{-1} - \left(\frac{Ec}{Nt}\right)^{-1}.$$

T2P estimating component 22 can further determine an available T2P based on the computed T2P ratio for a given time period and a maximum T2P ratio (e.g., by subtracting the computed T2P ratio for the given time period from the maximum T2P ratio).

For example, T2P estimating component 22 can determine the maximum T2P ratio of estimated T2P ratios for serving node 14 over a number of previous time periods. Thus, in this regard, T2P estimating component 22 can store the T2P measurements for a certain number of time periods, until an event occurs, and/or the like, and the T2P estimating component 22 can determine available T2P based in part on the maximum T2P ratio, as described herein. Moreover, in an example, T2P estimating component 22 can provide the determined maximum T2P ratio of the serving node 14 to a network component (not shown) for provisioning to one or more other UEs. In another example, T2P estimating component 22 can obtain the maximum T2P ratio for the serving node 14 from the network component, and can use the received maximum T2P ratio to determine available T2P at serving node 14, as described. In addition, in one example, T2P estimating component 22 can apply a backoff_factor to the computed maximum T2P (e.g., for determining available T2P and/or for providing to the network component) to account for desired headroom at the serving node 14. The backoff_factor or headroom can be received from a network component, serving node 14, or the like. In another example, the backoff_factor or headroom can be provided to a network component by T2P estimating component 22 (e.g., where determined or otherwise received from serving node 14).

Furthermore, in an example, T2P evaluating component 24 can evaluate the serving node 14 for communication based on the available T2P as computed. In one example, T2P evaluating component 24 can compute a Ec/Nt available at serving node 14 by multiplying the available T2P by Ec/Nt. In another example, T2P evaluating component 24 can apply a resource assignment factor to the available T2P to determine an amount of the available T2P that the serving node 14 indicates can be provided to a single UE 11. The resource assignment factor, for example, can be received from a network component, from serving node 14, or the like. In another example, the resource assignment factor can be provided to a network component by T2P evaluating component 24 (e.g., where determined or otherwise received from serving node 14).

In any case, handover component 26, in one example, can determine whether to handover from serving node 14 based on the available T2P (e.g., as modified by one or more factors, or otherwise). For example, this can include determining whether to recommend handover of UE 11 to serving node 14, increasing a signal strength of one or more neighboring nodes reported in a measurement report for handover, such as neighboring node 16, and/or the like.

In an alternative example, T2P estimating component 22 can determine the available T2P based on other calculations. For example, a UMTS cell, such as serving node 14, transmits power over several orthogonal variable spreading factor (OVSF) codes. At spreading factor 16, for example, there are 16 such codes. Given the primary scrambling code (PSC) of serving node 14, T2P estimating component 22 can compute the power received (–RxIor) by UE 11 over the 16 codes:

$$RxIor(t) = \sum_{i=0}^{15} RxPwr(OVSF \text{ code } i \text{ at time } t)$$

T2P estimating component 22 can then compute the maximum RxIor over time t:

MaxRxIor=max(RcIor(t)), over t for the particular serving node

Pilot Rx power at UE 11 can be the received signal code power (RSCP) measured by signal energy measuring component 20. T2P estimating component 22 then determines the available T2P at serving node 14 as:

$$\frac{MaxRxIor - RxIor(t)}{RSCP}.$$

Figure 8:
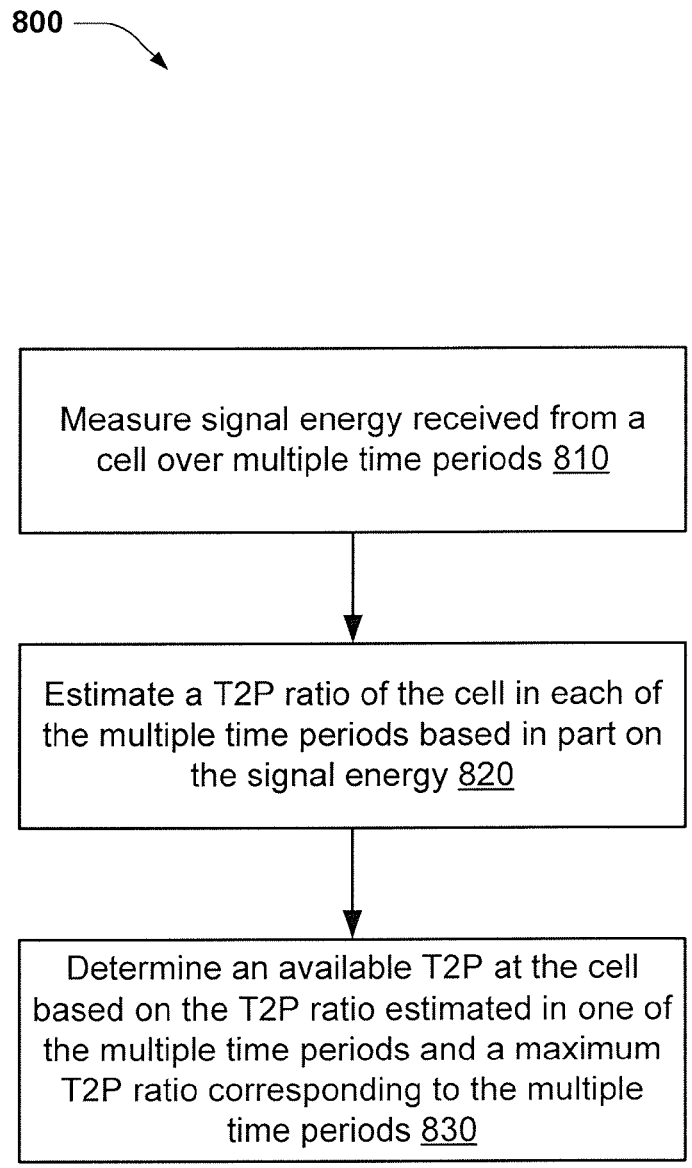
FIG. 8 is a flowchart of a method for determining available T2P ratio at a cell operating according to UMTS when the UE is in an idle mode.

Referring to FIG. 8, in one aspect, a method 800 may be for determining available downlink T2P at a cell. Aspects of method 800 may be performed by UE 11, signal energy measuring component 20, T2P determining component 19, T2P estimating component 22, T2P evaluating component 24, and/or handover component 26. In an aspect, UE 11 may perform aspects of method 800 while in an idle mode.

At 810, the method 800 includes measuring signal energy received from a cell over multiple time periods. UE 11 and/or signal energy measuring component 20 may be configured to measure signal energy received from a cell over multiple time periods. For example, UE 11 and/or signal energy measuring component 20 may be configured to measure Ec of a serving cell or related node, Nt of neighboring cells or related nodes, Io of all received signals or other noise, or the like.

At 820, the method 800 includes estimating a T2P ratio of the cell in each of the multiple time periods based in part on the signal energy. UE 11 and/or T2p determining component 19 may be configured to estimate a T2P ratio of the cell in each of the multiple time periods based in part on the signal energy measured by UE 11 and/or signal energy measuring component 20.

As described, UE 11 and/or T2P determining component 19 may be configured to compute the T2P ratio based on the signal energy measurements—e.g., as $$\frac{Io - Nt}{Ec},$$

$$\left(\frac{Ec}{Io}\right)^{-1} - \left(\frac{Ec}{Nt}\right)^{-1},$$

or the like. UE 11 and/or T2P determining component 19 may be configured to do so in multiple time periods, as described, and stored for computing a maximum T2P, in one example.

At 830, the method 800 includes determining an available T2P at the cell based on the T2P ratio estimated in one of the multiple time periods and a maximum T2P ratio corresponding to the multiple time periods. UE 11 and/or T2P determining component 19 may be configured to determine an available T2P at the cell based on the T2P ratio estimated in one of the multiple time periods, and determine a maximum T2P ratio corresponding to the multiple time periods. As described, the UE 11 and/or T2P determining component 19 may be configured to determine available T2P by subtracting the T2P ratio in a latest or current time period from the maximum T2P ratio. UE 11 and/or T2P determining component 19 may be configured to determine the maximum T2P ratio, as described herein, received from a network component, and/or the like. Moreover, UE 11 may be configured to apply a backoff_factor to the maximum T2P ratio, in one example. In a further example, UE 11 may be configured to apply a resource assignment factor to the available T2P. Additionally, UE 11 and/or handover component 26 may be configured to use the available T2P to evaluate the cell for communication (e.g., to determine whether to handover from the cell).

Figure 9:
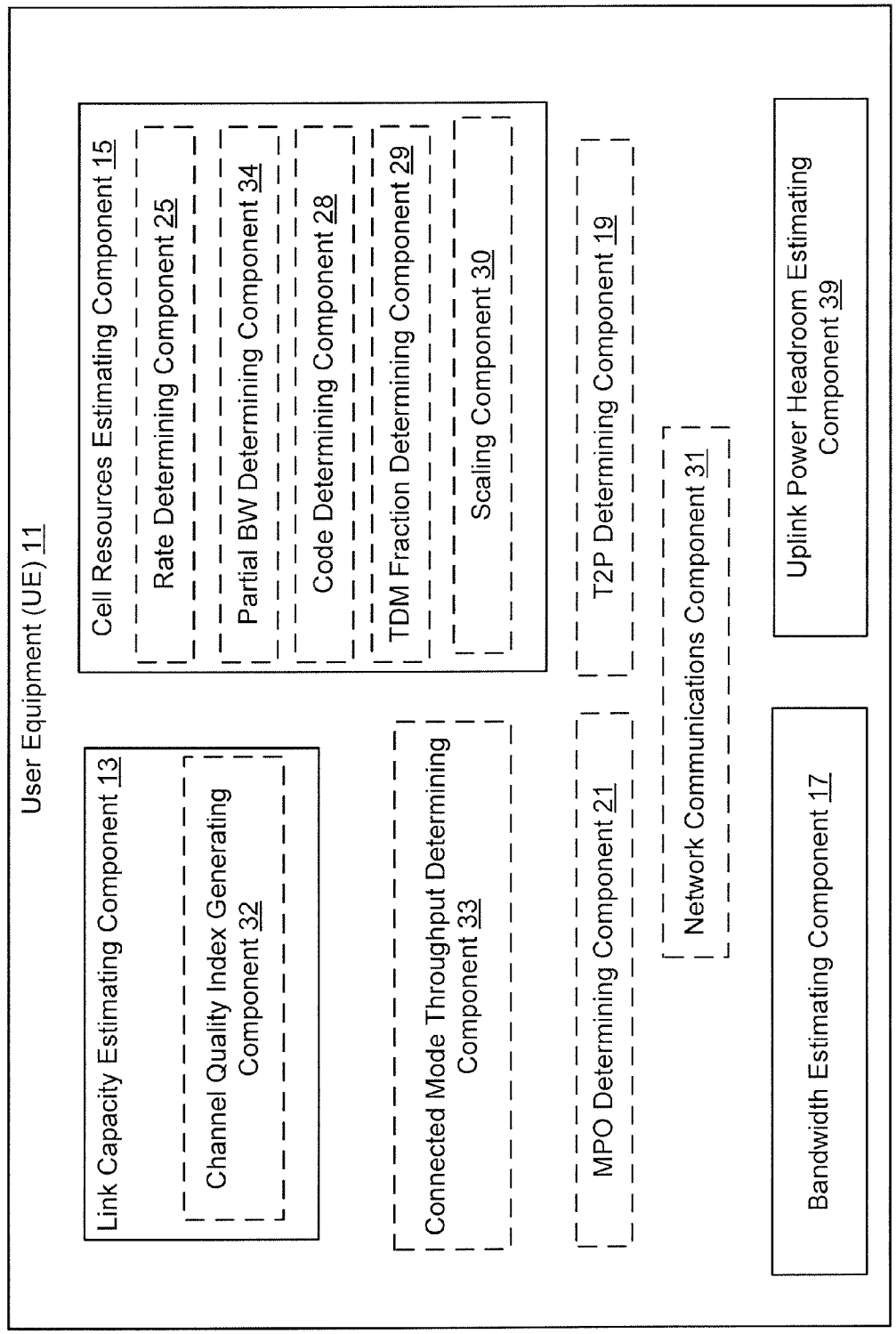
FIG. 9 is a block diagram of aspects of a UE in a connected mode for determining available downlink bandwidth at a cell operating according to UMTS.

Referring to FIG. 9, additional aspects of UE 11, which may be used when UE 11 is in a connected mode and operating according to UMTS, are shown. UE 11 may include link capacity estimating component 13, cell resources estimating component 15, and bandwidth estimating component 17, as described herein with respect to FIG. 1. In an aspect, and optionally, UE 11 also may include a traffic-to-pilot (T2P) ratio determining component 19 for estimating a T2P ratio of a cell, and/or a measurement power offset (MPO) determining component 21 for estimating an MPO for a cell, where the available bandwidth of the cell may further be a function of the T2P ratio and/or the MPO. The additional, optional, components shown within UE 11, link capacity estimating component 13, and cell resources estimating component 15, which are not shown as part of UE 11 in FIG. 1, may optionally be used by UE 11 when operating in a connected mode and according to UMTS.

UE 11 and/or link capacity estimating component 13 may optionally include, in an aspect, channel quality index generating component 32 configured to generate a channel quality index at UE 11. Channel quality index measures a channel quality and gives it a number, which can be map the supportable rate for a given number of codes using a standardized table. In another aspect, a more sophisticated approach may utilize different mapping tables based on the UE category/capability and/or different RAN capabilities (e.g. multicarrier, MIMO). For example the RAN could signal an index/pointer to specific mapping rules/tables. In yet another example, the RAN may broadcast information on how the CQI may be computed by the UE (e.g., when the transmission mode (TM) to be assumed).

UE 11 and/or cell resources estimating component 15 may optionally include, in an aspect, rate determining component 25 configured to determine a supportable rate based on the channel quality index generated by channel quality index generating component 32. UE 11 and/or cell resources estimating component 15 may include code determining component 28 configured to function as described herein. UE 11 and/or cell resources estimating component 15 may include partial bandwidth determining component 34 configured to determine a particular bandwidth corresponding to a total number of codes (determined by code determining component 28) used by the cell for the supportable rate (determined by rate determining component 25). UE 11 and/or cell resources estimating component 15 may include TDM fraction determining component 29 configured to function as described herein. UE 11 and/or cell resources estimating component 15 may include scaling component 30 configured to scale the partial bandwidth based on at least one of an average served number of codes, a TDM fraction, and a ratio of T2Pavailable/MPO to determine the partial available bandwidth.

UE 11 also may optionally include, in an aspect, connected mode throughput determining component 33 configured to observe throughput for UE 11 per scheduled event over one or more past scheduling events. The throughput may be an average rate of successful message delivery from the UE 11 to the network. Thus, as such, UE 11 and/or bandwidth estimating component 17 may be configured to add the partial bandwidth determined by partial bandwidth determining component 34 to an observed connected mode throughput over one or more past scheduling events (determined by connected mode throughput determining component 33) to determine the total available bandwidth.

UE 11 may also include a UE Power Headroom (UPH) Estimating Component 39 for estimating uplink throughput based on the current radio conditions and configurable parameters of UE 11. For example, the radio parameter utilized for estimating uplink throughput may be the path loss of signal from UE 11 to serving node 14. Indeed, estimating the uplink throughput may be accomplished by converting the current radio conditions and configurable parameters of UE 11 into achievable and acceptable throughput via standard mapping tables.

In another aspect, UE 11 may also be configured for determining available uplink bandwidth via measuring a Reference Signal Received Power (RSRP), estimating a UL path Loss (PL) based on a difference between RSRP and a RS Tx power, computing a UE Power Headroom (UPH) for transmission over n Physical Resource Blocks (PRB), where n is greater or equal to 1, calculating the estimated maximum throughput R(n) for transmission over n RBs, determining the max UL throughput over all R(n). Additionally, the RAN may provide information such as the UL interference over thermal (IoT) level to enable the UE to account for interference in the UPH.

Figure 10:
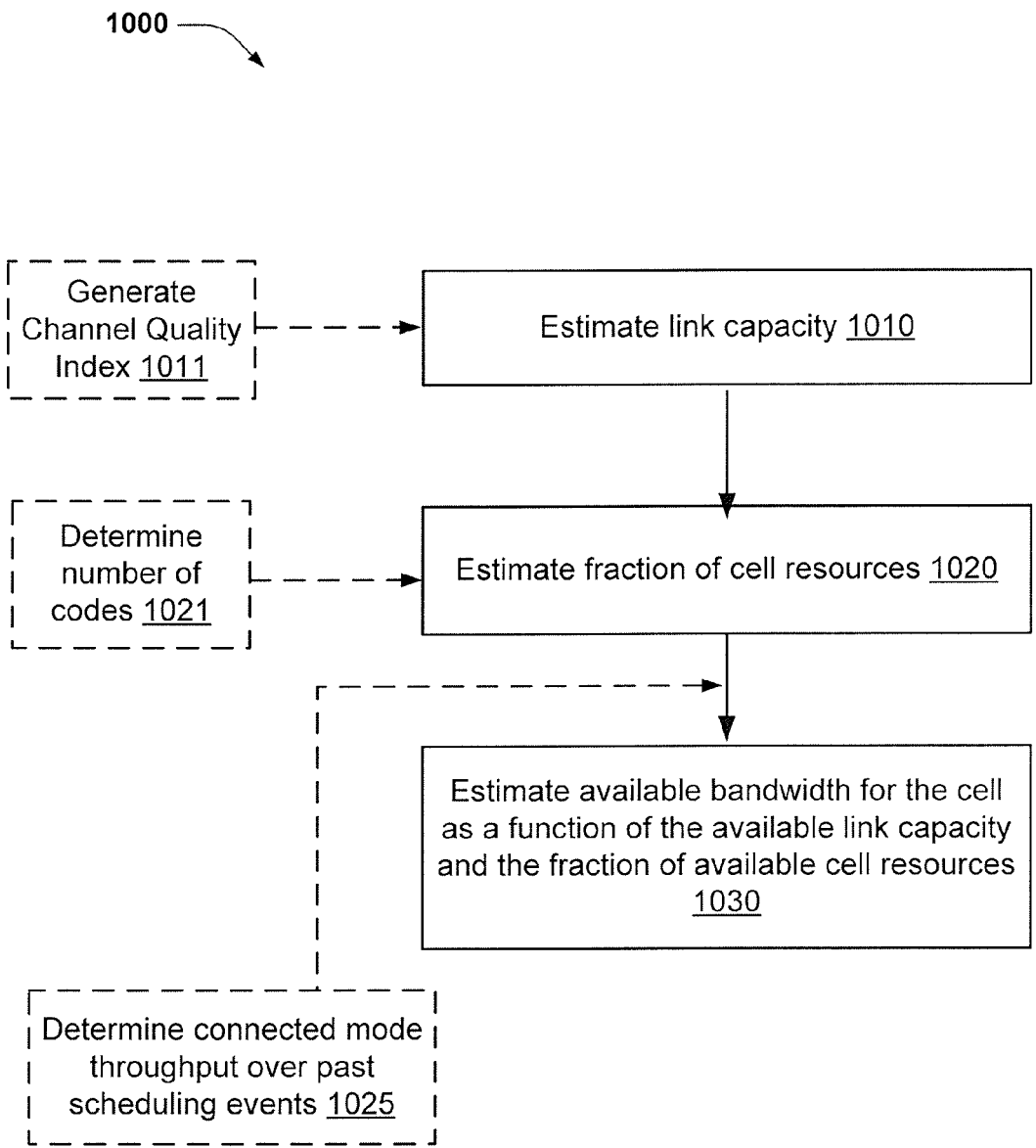
FIG. 10 is a flowchart showing a method for determining available downlink bandwidth of a cell operating according to UMTS by a UE in a connected mode.

Referring to FIG. 10, in an aspect, a method 1000 may be used for determining available downlink bandwidth while UE 11 is in a connected mode. Aspects of method 1000 may be performed by link capacity estimating component 13, cell resources estimating component 15, bandwidth estimating component 17, T2P determining component 19, MPO determining component 21, and/or connected mode throughput determining component 33, as shown in FIG. 9.

At 1010, the method 1000 includes estimating an available link capacity of a cell for a user equipment. UE 11 and/or link capacity estimating component 13 may be configured to estimate an available link capacity of a cell for UE 11. Optionally, at 1011, the method 1000 may include generating a channel quality index at UE 11. Channel quality index generating component 32 may be configured to generate a channel quality index. As such, and in an aspect, the method 1000 may include estimating an available link capacity of a cell for UE 11 based on the generated channel quality index. For example, link capacity estimating component 13 and/or channel quality index generating component 32, may be configured to estimate an available link capacity of a cell for UE 11 based on the generated channel quality index.

In an aspect (not shown), UE 11 and/or link capacity estimating component 13, in communication with cell resources estimating component 15, may be configured to estimate available link capacity by determining (by rate determining component 25) a supportable rate based on the channel quality index (determined by channel quality index generating component 32), determining (by partial bandwidth determining component 34) a partial bandwidth corresponding to a total number of codes used by the cell for the supportable rate, scaling (by scaling component 30), the partial bandwidth based on at least one of an average served number of codes, a TDM fraction (determined by TDM fraction determining component 29), and a ratio of T2Pavailable/MPO (determined by MPO determining component 21 and T2P determining component 19) to determine the partial available bandwidth. UE 11 and/or bandwidth estimating component 17, in communication with link capacity estimating component 13 and cell resources estimating component 15, also may be configured to add the partial bandwidth to an observed connected mode throughput over one or more past scheduling events (determined by connected mode throughput determining component 33) to determine the total available bandwidth.

At 1020, the method 1000 includes estimating an available fraction of cell resources for the user equipment. UE 11 and/or cell resources estimating component 15 may be configured to estimate an available fraction of cell resources for UE 11. Optionally, at 1021, the method 1000 may include determining an available number of codes for the cell. For example, code determining component 28 may be configured to determine an available number of codes for the cell as described herein. As such, and in an aspect, the method 1000, at 1020, may include estimating an available fraction of cell resources for UE 11 based on an available number of codes for the cell. For example, UE 11, cell resources estimating component 15, and/or code determining component 28 may be configured to estimate an available fraction of cell resources for UE 11 based on an available number of codes for the cell (as determined by code determining component 28).

Optionally, at 1025, the method 1000 may include determining a connected mode throughput observed over one or more past scheduling events. For example, connected mode throughput determining component 33 may be configured to observe connected mode throughput for UE 11 per scheduling event over one or more past scheduling events.

At 1030, the method 1000 includes estimating available bandwidth of the cell for the user equipment as a function of the estimated available link capacity and the estimated available fraction of cell resources. UE 11 and/or bandwidth estimating component 17, in communication with link capacity estimating component 13 and/or cell resources estimating component 15, may be configured to estimate available bandwidth of the cell for UE 11. In an aspect, the method 1000 may include estimating available bandwidth of the cell for the UE 11 as a function of the estimated available link capacity (determined by link capacity estimating component 13), the estimated available fraction of cell resources (determined by cell resources estimating component 15), and/or an observed connected mode throughput observed over one or more past scheduling events (determined by connected mode throughput determining component 33).

In an additional aspect (not shown), UE 11 and/or T2P determining component 19, may be configured to determine an available T2P ratio for the cell and UE 11 and/or MPO determining component 21 may be configured to determine an MPO, respectively, for the cell. In the aspect, cell resources estimating component 15 may be configured to estimate the available link capacity and/or the available fraction of cell resources based on the T2P ratio, the MPO, respectively, and/or the channel quality index.

Figure 11:
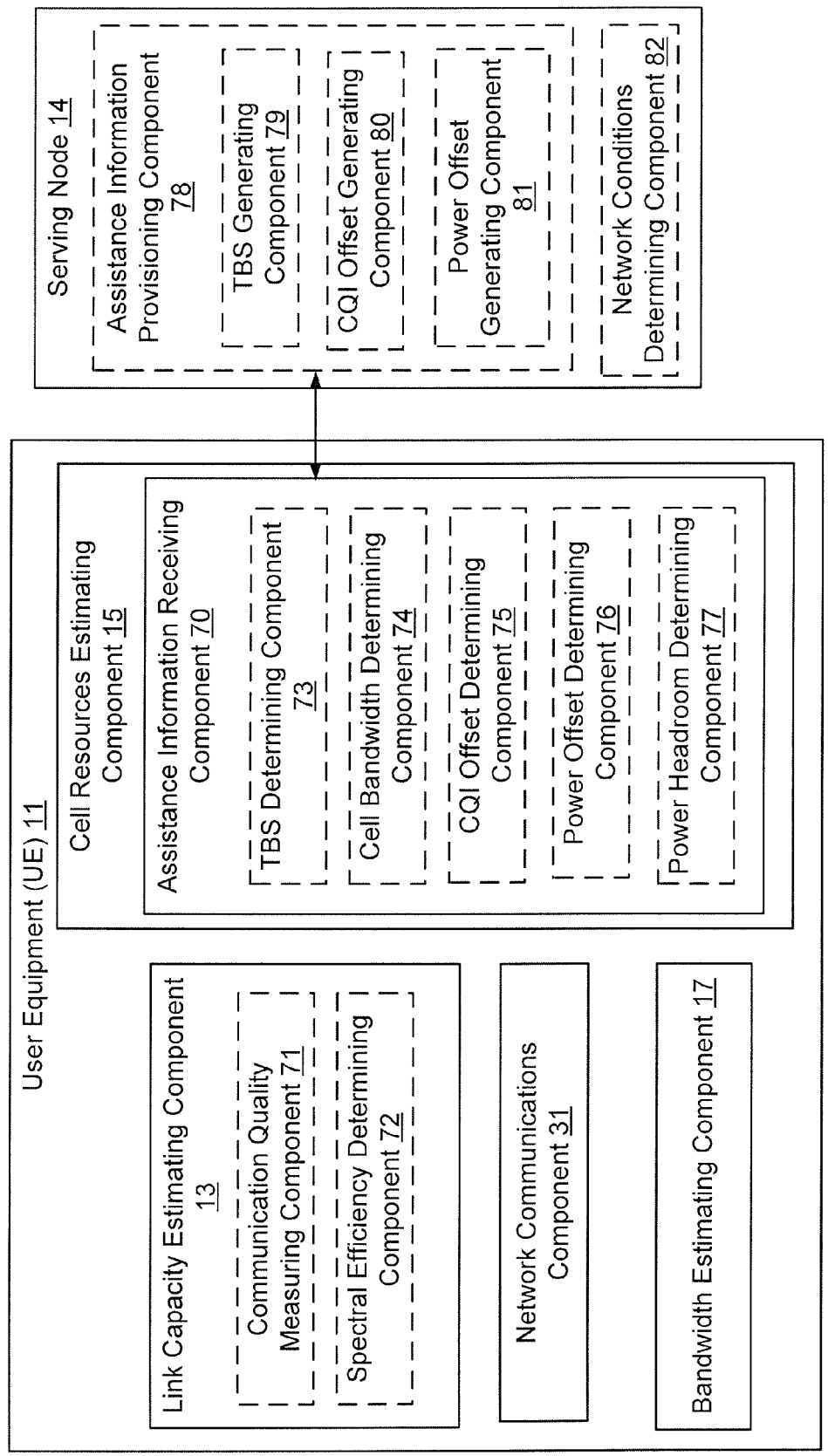
FIG. 11 is a block diagram of aspects of a UE for estimating available downlink bandwidth/achievable throughput at a cell.

Referring to FIG. 11, additional aspects of UE 11, which may be used for estimating a bandwidth/throughput of a link, are shown. As described previously, one use for estimating the bandwidth or throughput in this regard may be to allow controlling of idle/dormant UEs to offload radio connection establishment (e.g., radio resource control (RRC)/radio access bearer (RAB) (re)establishment) upon switching to an active mode to a capable network, which may or may not be the network on which the UE 11 is communicating in idle mode. This can avoid use of signaling resources associated with connecting the UE 11 to one network (e.g., a radio access network (RAN)) only to then handover the UE 11 to another network (e.g., a wireless local area network (WLAN)) due to poor radio conditions. In the following examples, the UE 11 can measure one or more parameters of a plurality of networks, some of which can be measured along with assistance information received from a network, to determine an estimated bandwidth or throughput achievable over the networks (which can be referred to herein as an available bandwidth, available bandwidth/achievable throughput, etc.). The UE 11 can select a network for receiving active communications of the UE 11 based at least in part on the determined achievable bandwidth or throughput. In this regard, in an example, UE 11 can communicate with serving node 14 to receive assistance information.

UE 11 may include link capacity estimating component 13, cell resources estimating component 15, and bandwidth estimating component 17, as described herein with respect to FIG. 1. UE 11 may also include a network communications component 31 for performing one or more network communications procedures based on the estimated available bandwidth for a cell, as determined by bandwidth estimating component 17, described herein with respect to FIG. 4. Cell resources estimating component 15 can include an assistance information receiving component 70 for obtaining assistance information from one or more information sources for estimating a bandwidth or throughput achievable for a link with one or more networks. The one or more information sources may include hardcoded information stored permanently or semi-permanently in UE 11, a removable or non-removable memory of UE 11, as described further herein, provisioning from an operator network (e.g., as part of an access network discovery and selection function (ANDSF) or other UE-based policy), receiving information from one or more serving nodes, such as serving node 14, etc.

Link capacity estimating component 13 can optionally include a communication quality measuring component 71 for measuring communication parameters with one or more network entities, and/or a spectral efficiency determining component 72 for computing an alternative parameter based on the communication parameter. Assistance information receiving component 70 can optionally include a transport block size (TBS) determining component 73 for obtaining a standard TBS for a network, a cell bandwidth determining component 74 for obtaining or otherwise determining an available bandwidth of a cell, CQI offset determining component 75 for obtaining a CQI offset value or collection of values for scaling a determined CQI for a cell, a power offset determining component 76 for obtaining a power offset for determining a power headroom at a cell by power headroom determining component 77, in determining an achievable bandwidth or throughput based additionally on one or more measured parameters.

Serving node 14 may include an assistance information provisioning component 78 for communicating assistance information, such as TBS related parameters, a CQI offset value or collection of values, a power offset, an available bandwidth at a cell, etc. to UE 11. Assistance information provisioning component 78 can optionally include a TBS generating component 79 for generating a standard TBS for a related network or TBS related information (e.g., a CQI-to-TBS mapping table as described further herein) for all UEs or one or more UEs based on UE or network capabilities, a CQI offset generating component 80 for generating a CQI offset for applying to a measured CQI based on current network conditions at the serving node 14 (e.g., offloading requirements, current load, backhaul throughput or capacity, etc.) at the serving node 14, etc. for all UEs or one or more UEs based on UE or network capabilities, and a power offset generating component 81 for generating a power headroom offset for generating a power headroom at a UE based on the network conditions at the serving node 14 for all UEs or one or more UEs based on UE or network capabilities. Serving node 14 also includes a network conditions determining component 82 for determining network conditions, such as offloading requirements (e.g., a number of UEs a serving node can communicate with before offloading the UEs), a current load, backhaul throughput or capacity, and/or the like.

In an aspect, link capacity estimating component 13 can estimate a link capacity for a current or potential communications link with a network (e.g., with serving node 14 or a serving node of another network) based on measuring one or more radio conditions related to the network. Cell resources estimating component 15 can estimate available cell resources of the network based at least in part on assistance information (e.g., TBS information, CQI offset, power offset, available bandwidth, etc.). For example, the assistance information can be obtained from hardcoded information in UE 11, obtained from memory of the UE 11, received from operator network provisioning (e.g., via ANDSF), received from serving node 14 (e.g., in SIB or other broadcast or information signal), etc., as described. It is to be appreciated, for example, that assistance information provisioning component 78 can signal actual values of the assistance information (e.g., CQI offset, CQI-to-TBS mapping table, downlink bandwidth, power offset, etc.) to the UE 11 and/or can signal a pointer to the values stored in UE 11 memory. For example, assistance information provisioning component 78 knows the UE 11 memory location where the network initially provisions the assistance information to the UE 11 and/or where the UE 11 obtains the assistance information from hardcoded information permanently or semi-permanently stored in UE 11. Bandwidth estimating component 17 can estimate an achievable bandwidth or throughput based at least in part on the estimated link capacity and the estimated cell resources determined from the assistance information for the current or potential link to the network. Network communications component 31 can determine whether to utilize the network (or a different network) to establish active mode communications for the UE 11 (e.g., to send an uplink packet) based at least in part on the estimated bandwidth or throughput.

For example, the current or potential link for which the achievable bandwidth or throughput is estimated can be an uplink or downlink with the network. Thus, for example, in estimating the achievable bandwidth or throughput for a downlink, communication quality measuring component 71 can measure a communication quality with a cell or a related node. For example, the communication quality measured in a cell or related node can correspond to one or more measurements of one or more received signals, such as a SNR, signal-to-interference-and-noise ratio (SINR), etc. of one or more signals received from a serving node of the network, such as serving node 14. It is to be appreciated that throughput can be estimated for a RAN, WLAN, or substantially any network, and thus the serving node 14 can correspond to the type of network for which the bandwidth or throughput is estimated (e.g., a base station in a RAN, a hotpot in a WLAN, etc.). In addition, in an example, spectral efficiency determining component 72 can determine a different parameter based on the measured SNR, SINR, etc., such as a spectral efficiency (e.g., CQI). It is to be appreciated that the measurement by communication quality measuring component 71 and the spectral efficiency determination by spectral efficiency determining component 72 can be similar to measurements performed in active mode to report CQI of a downlink with a serving node.

Assistance information receiving component 70 can then obtain assistance information to assist in estimating available cell resources based at least in part on the measurement or determined spectral efficiency. For example, TBS determining component 73 can obtain a standard TBS for the network, as described (e.g., from hardcoded information, a memory of UE 11, operator network provisioning, serving node 14, etc.). For example, the standard TBS can be based on a default network configuration (e.g., in HSDPA). In this regard, bandwidth estimating component 17 can compute an estimated available bandwidth as an achievable throughput for the link. For example, the achievable throughput can indicate an estimated available bandwidth. The achievable throughput can be computed based at least in part on mapping the spectral efficiency (e.g., CQI) to the standard TBS to determine a maximum downlink throughput at the network. In one example, TBS determining component 73 can obtain a CQI-to-TBS mapping table for mapping the CQI to a TBS for the network, and the bandwidth estimating component 17 maps the determined CQI to the TBS based on the table. For instance, the table can specify a TBS for a plurality of CQI values or ranges of CQI values such that the determined CQI is mapped to one of the TBS values in the table.

Moreover, for example, CQI offset determining component 75 can obtain a CQI offset, as described (e.g., from hardcoded information, a memory of UE 11, operator network provisioning, serving node 14, etc.). Bandwidth estimating component 17 can also utilize the spectral efficiency along with CQI offset to determine an achievable bandwidth or throughput for the corresponding current or potential downlink. In an example, the CQI offset can correspond to network conditions at the network or serving node 14. In this regard, for example, network conditions determining component 82 can determine the network conditions, and CQI offset generating component 80 may generate the CQI offset based on the network conditions. For instance, CQI offset can be higher for certain network conditions, such as low load and/or congestion. In any case, assistance information provisioning component 78 can transmit the CQI offset to UE 11. Bandwidth estimating component 17 can scale the spectral efficiency based on the CQI offset (e.g., by multiplying the CQI by the CQI offset, adding the CQI offset to the CQI, etc.), which can then be mapped to the TBS (e.g., based on the CQI-to-TBS mapping table or otherwise, as described) to estimate an achievable link capacity for the current or potential downlink. In one example, the CQI offset received in assistance information can include a CQI offset table that indicates different CQI offsets for different CQI values or ranges of values.

In one example, there can be one CQI-to-TBS mapping table and/or a CQI offset applicable to a plurality of UEs (and thus TBS determining component 73 obtains the one CQI-to-TBS mapping table and CQI offset determining component 75 obtains the CQI offset). In other examples, however, TBS generating component 79 can generate CQI-to-TBS mapping tables for UEs based on UE category/capability, different RAN capabilities (e.g., multicarrier, MIMO, etc.), and/or the like. For example, TBS generating component 79 can generate different CQI-to-TBS mapping tables for UEs capable of communicating using multicarrier or MIMO (e.g., tables with CQI mapping to higher TBS) than for those that are not so capable, as the achievable throughput for multicarrier/MIMO UEs is greater than for other UEs without multicarrier/MIMO capabilities.

In another example, cell bandwidth determining component 74 can determine a downlink bandwidth of a cell related to a serving node in the network (e.g., serving node 14), and bandwidth estimating component 17 can estimate the achievable bandwidth or throughput in the network based at least in part on the measured channel quality, or determined spectral efficiency, along with the determined downlink bandwidth of the cell. For example, cell bandwidth determining component 74 can determine the downlink cell bandwidth based at least in part on receiving a cell bandwidth broadcasted by assistance information provisioning component 78. In another example, cell bandwidth determining component 74 can estimate the downlink cell bandwidth based at least in part on measuring reference signal tones, shared channel resource elements (e.g., PDSCH resource elements in LTE), etc. In yet another example, cell bandwidth determining component 74 can determine the downlink cell bandwidth based at least in part on a default parameter broadcasted by the assistance information provisioning component 78 (e.g., in a master information block (MIB), system information block (SIB), etc.). In any case, bandwidth estimating component 17 can determine the achievable throughput for the downlink based at least in part on multiplying the spectral efficiency (e.g., CQI) by the determined downlink bandwidth at the cell. Furthermore, in an example, this value can be multiplied by (1−downlink overhead) as determined by the cell bandwidth determining component 74 in computing the estimated achievable bandwidth or throughput over the downlink.

Moreover, in an example, CQI offset determining component 75 can similarly determine a CQI offset for applying to the determined spectral efficiency, as described above. In one example, the CQI offset determining component 75 can determine a CQI offset table (e.g., from hardcoded information, network provisioning, receiving the table from serving node 14, etc.) that maps different CQI values or ranges of values to scaled values. In this regard, for example, CQI offset generating component 80 can generate the CQI offset table based at least in part on network conditions (e.g., such that CQI offsets can be higher where the network conditions, such as backhaul throughput and offload requirements, achieve or exceed one or more thresholds and/or where current load is less than one or more thresholds). Moreover, for example, the CQI offset table can have different values for combinations of measured CQI and estimated downlink bandwidth at the cell (e.g., the CQI offset table can be a lookup table). Thus, in this example, CQI offset determining component 75 obtains the table, and bandwidth estimating component 17 can determine a CQI offset in the table that maps to the determined CQI and estimated downlink bandwidth. In any case, bandwidth estimating component 17 can apply the CQI offset to the determined CQI (e.g., by multiplying the CQI by the CQI offset, adding the CQI offset to the CQI, etc.) in estimating the achievable throughput for the downlink.

As described above, it is to be appreciated that the CQI offset table can be generated for all UEs or differently for UEs of different categories/capabilities, etc., and/or for networks with different capabilities (e.g., multicarrier, MIMO, etc.), and thus, CQI offset generating component 80 can generate the CQI offset table for a specific UE 11 based on an indicated category/capability thereof, based on known capabilities of the associated network, etc. Thus, in one example, UE 11 can indicate its capabilities to serving node 14 and/or serving node 14 can determine the UE 11 capabilities from one or more network components (not shown). Moreover, in this regard, assistance information provisioning component 78 can also communicate one or more parameters on which the CQI offset table is based, such as a downlink transmission mode (TM) (e.g., in MIMO where a TM correlates to a level of throughput), to the UE 11. In this regard, CQI offset determining component 75 can obtain the one or more parameters and can determine whether to use the CQI offset (and/or determine which one of multiple CQI offsets or tables to use) based on the one or more parameters.

In another example, link capacity estimating component 13 can estimate link capacity of an uplink, cell resources estimating component 15 can estimate cell resources related to the uplink, and bandwidth estimating component 17 can estimate an achievable bandwidth or throughput for the uplink (in addition or alternatively to the throughput of the downlink) based on the link capacity and cell resources. For example, communication quality measuring component 71 can determine a path loss to serving node 14, and cell resources estimating component 15 can estimate a power headroom based at least in part on the path loss and assistance information (such as a power offset), from which bandwidth estimating component 17 can estimate an achievable bandwidth or throughput for the uplink.

In an example, power offset determining component 76 can obtain a power offset as assistance information (e.g., from hardcoded information, network provisioning, serving node 14, etc.), and power headroom determining component 77 can compute a power headroom based at least in part on the power offset and the path loss. In addition, in an example, power offset generating component 81 can determine the power offset (e.g., based on network conditions, as described), and assistance information provisioning component 78 can communicate the power offset to UE 11 to utilize in computing the power headroom. In any case, bandwidth estimating component 17 can estimate an achievable bandwidth or throughput on the uplink based at least in part on the computed power headroom. For example, bandwidth estimating component 17 can use one or more mapping tables that map headroom values to achievable throughputs, where the mapping tables can also be received as assistance information received from hardcoded information, assistance information provisioned by a network, assistance information received from serving node 14 (e.g., as generated by power offset generating component 81) and/or the like. Moreover, in an example, assistance information provisioning component 78 may communicate the power offset as an uplink grant (e.g., an uplink power headroom (UPH) offset in HSPA), which power offset determining component 76 receives for computing the power headroom.

In another example, power headroom determining component 77 can determine the power headroom as a SNR or SINR margin relative to a base modulation and coding scheme (MCS) remaining at UE 11 (via network communications component 31) after accounting for transmit power limitations. In this example (e.g., in LTE), communication quality measuring component 71 can measure a RSRP of one or more signals of serving node 14 (or another node of another network) and can estimate a path loss on the uplink based at least in part on a difference between RSRP and reference signal transmit power broadcasted by the serving node 14 (e.g., via assistance information provisioning component 78 and received by assistance information receiving component 70). Power headroom determining component 77 can then compute an uplink power headroom for transmission over a plurality of PRBs. For example, power headroom determining component 77 may compute the uplink power headroom over n PRBs, where n is a positive integer, based at least in part on a maximum transmit power of the UE 11 (UE_Max_Power_dBm), an estimated total UE transmit power (e.g., over n PRBs) for successful reception of a base MCS at a serving node (UE_Power_baseMCS_dBm(n)) (e.g., based on the computed path loss), and the received power offset.

For example, power headroom determining component 77 can determine the maximum transmit power of the UE 11 (e.g., in decibel-milliwatts (dBm), UE_Max_Power_dBm) as the UE's own maximum transmit power (e.g., 23 dBm), as a transmit power configured by a network component (e.g., as received from serving node 14), such as by open loop power control parameters (e.g., one or more parameters read from a SIB, such as PMAX, Po nominal and alpha, etc. from SIB2 for PUSCH in LTE), etc. In addition, for example, power headroom determining component 77 can compute the required power for successful reception of a reference (base) MCS (UE_Power_baseMCS_dBm(n)) based at least in part on a SINR value for decoding the base MCS, a thermal noise power, a total interference plus noise (e.g., interference over thermal (IoT)) at the network (e.g., at serving node 14 or other serving node of the network). In one example, assistance information provisioning component 78 can broadcast IoT as determined at the serving node 14 for receipt by assistance information receiving component 70 to facilitate determining UE_Power_baseMCS_dBm(n).

In any case, for example, bandwidth estimating component 17 can estimate the achievable throughput on the uplink based at least in part on subtracting the power offset and UE_Power_baseMCS_dBm(n) from UE_Max_Power_dBm. Bandwidth estimating component 17, for example, can continue computing the achievable uplink throughput for all of the PRBs (e.g., all values of n), and can determine a maximum achievable uplink throughput as the maximum of the computed achievable uplink throughputs. Network communications component 31 can use the maximum achievable uplink throughput in performing the one or more network procedures (e.g., determining whether to connect to the RAN of serving node 14 or a WLAN in (re)establishing a connection with the network, determining whether to associate with a WLAN, etc.).

Additionally, in an example, bandwidth estimating component 17 can estimate achievable throughput on a plurality of links (e.g., uplink and downlink with a given network or cell, as described above). In this example, network communications component 31 can perform the network procedure based at least in part on both throughput estimations (e.g. on comparing the estimations to one or more thresholds). It is to be appreciated that whether to use throughput for a downlink, uplink, or both can be determined by the UE 11 based on at least one of hardcoded information, configuration stored in memory, network provisioning, receiving an indication from serving node 14, and/or the like. Moreover, threshold(s) to which to compare the estimated throughput (s) in determining whether to perform the network procedure can be similarly determined (e.g., based on hardcoded information, configuration stored in memory, network provisioning, receiving an indication from serving node 14, and/or the like). Network communications component 31 can determine whether to perform the network procedure based at least in part on comparing the estimated throughput (s) to the threshold(s). For example, network communications component 31 can determine to perform establish an active mode connection with a WLAN where the estimated available bandwidth/achievable throughput on the uplink and/or downlink of the RAN is less than one or more threshold levels.

In addition, for example, while UE 11 is communicating in an idle or dormant mode, it may periodically estimate the available bandwidth/achievable throughput of one or more links with the network in determining whether to perform other network procedures. For example, where the available bandwidth/achievable throughput estimated by bandwidth estimating component 17 is less than a threshold level, network communications component 31 may attempt to associate with another network. In one example, where the network for which available bandwidth/achievable throughput is estimated is a RAN, network communications component 31 can associate with a WLAN, while maintaining idle mode communications with the RAN, where the estimated available bandwidth/achievable throughput with the RAN is less than a threshold. Associating with the WLAN can also be based at least in part on the bandwidth estimating component 17 determining that load conditions at the WLAN are at least at a threshold level. Moreover, associating with the WLAN can include connecting with the WLAN to communicate therewith. In any case, associating with the WLAN when RAN conditions are low can avoid the need to performing WLAN association procedures to connect with the WLAN when the UE 11 moves to active mode. Thus, if UE 11 initiates a call setup procedure, the UE 11 can already be associated with the WLAN such to initiate the call setup procedure where the RAN conditions are low (e.g., likely too low to initiate the call setup procedure on the RAN), which avoids delay in performing the call setup procedure.

Figure 12:
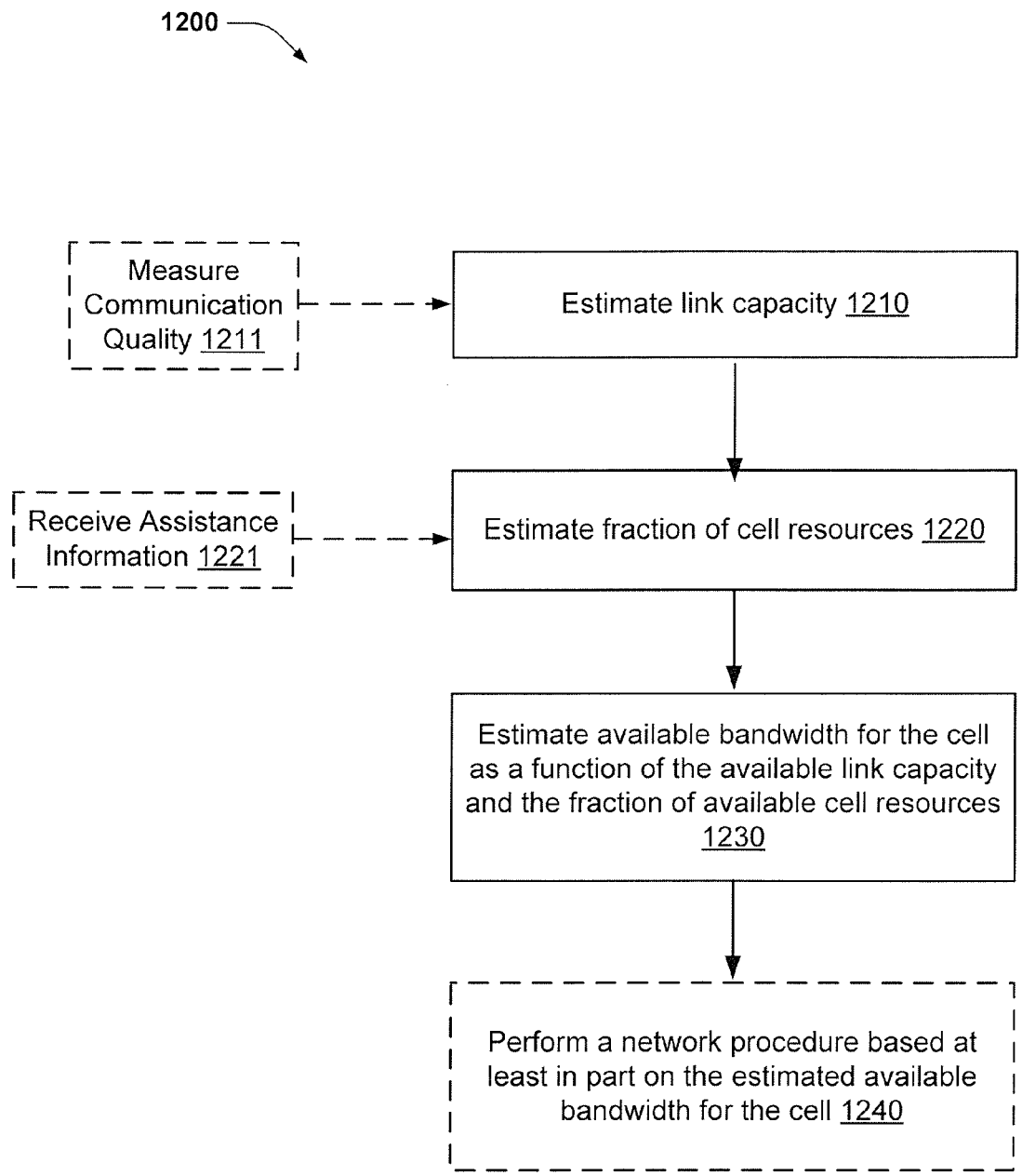
FIG. 12 is a flowchart showing a method for estimating available downlink bandwidth/achievable throughput for a UE at a cell.

Referring to FIG. 12, in an aspect, a method 1200 is depicted for determining an available bandwidth as an achievable throughput for a link based on a measured communication quality and/or received assistance information, as described with respect to UE 11 in FIG. 11. In this regard, aspects of method 1200 may be performed by link capacity estimating component 13, cell resources estimating component 15, bandwidth estimating component 17, and/or network communications component 31, or components thereof, as shown in FIG. 11.

At 1210, the method 1200 includes estimating a link capacity of a cell for a user equipment. UE 11 and/or link capacity estimating component 13 may be configured to estimate an available link capacity of a cell for UE 11. Optionally, at 1211, the method 1200 includes measuring communication quality with the cell. For example, as described, UE 11, link capacity estimating component 13, or one or more components thereof (e.g., communication quality measuring component 71 or spectral efficiency determining component 72) may be configured to measure communication quality with the cell based on a measured SNR, SINR, path loss, etc., and/or a spectral efficiency parameter determined based on the measured quality (e.g., CQI).

At 1220, the method 1200 includes estimating an available fraction of cell resources for the user equipment. UE 11 and/or cell resources estimating component 15 may be configured to estimate an available fraction of cell resources for UE 11. Optionally, at 1221, the method 1200 may include receiving assistance information, which can be indicative of a fraction of cell resources available at the cell, for determining an achievable throughput at the cell. For example, as described, UE 11, cell resources estimating component 15 or components thereof (e.g., TBS determining component 73, cell bandwidth determining component 74, CQI offset determining component 75, power offset determining component 76, and/or power headroom determining component 77) can be configured to receive the assistance information. The assistance information can be received from at least one of hardcoded information at a UE, information stored in memory at the UE, information provisioned to the UE at some point during communicating with an operator network, information received from a serving node of the network (e.g., the serving node providing the cell), and/or the like. In this regard, the assistance information may be consistent for one or more UEs and/or can be modified by the network based on network conditions at one or more nodes of the network, as described. In any case, the assistance information can indicate or can assist in determining an available fraction of resources at the cell.

At 1230, the method 1200 includes estimating available bandwidth of the cell for the user equipment as a function of the estimated available link capacity and the estimated available fraction of cell resources. UE 11 and/or bandwidth estimating component 17, in communication with link capacity estimating component 13 and/or cell resources estimating component 15, may be configured to estimate available bandwidth of the cell for UE 11. In an aspect, the method 1200 may include estimating available bandwidth of the cell for the UE 11 as a function of the estimated available link capacity (determined by link capacity estimating component 13) and the estimated available fraction of cell resources (determined by cell resources estimating component 15. Moreover, as described, bandwidth estimating component 17 can determine whether to perform method steps 1210, 1211, 1220, and/or 1221 again to estimate available bandwidth/achievable throughput of another link at 1230 (e.g., an uplink throughput where a downlink throughput was previous estimated, and/or vice versa).

At 1240, method 1200, for example, can optionally include performing a network procedure based at least in part on the estimated available bandwidth/achievable throughput for the cell. The network procedure, as described, may include determining whether to utilize a RAN based on the estimated achievable throughput and/or whether to instead use a WLAN when switching to active mode communications, determining whether to associate with the WLAN while communicating with the RAN in idle mode, etc. For example, UE 11 and/or network communications component 31 can be configured to perform the network procedure based on the estimated available bandwidth/achievable throughput by comparing the bandwidth/throughput to one or more thresholds. Moreover, as described, performing the network procedure can be based on estimated available bandwidth and/or achievable throughput for one or a number of links (e.g., an uplink and a downlink).

Figure 13:
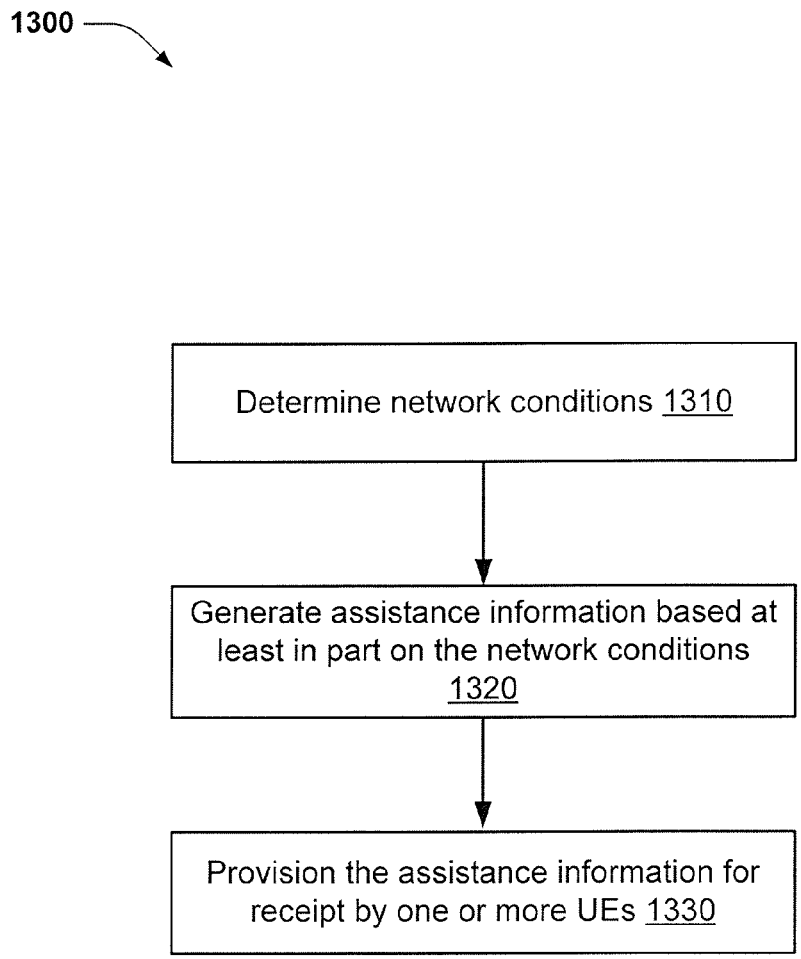
FIG. 13 is a flowchart showing a method for provisioning assistance information to be received by one or more UEs.

Referring to FIG. 13, in an aspect, a method 1300 is depicted for provisioning assistance information based on network conditions, as described with respect to serving node 14 in FIG. 11. In this regard, aspects of method 1300 may be performed by serving node 14, assistance information provisioning component 78, or components thereof, network conditions determining component 82, etc., as shown in FIG. 11.

At 1310, the method 1300 includes determining network conditions. For example, serving node 14 or network conditions determining component 82 can be configured to determine the network conditions based at least in part on analyzing one or more parameters or measuring the conditions, such as offloading requirements, a current load (e.g., as compared to the offloading requirements or otherwise), backhaul link throughput, and/or the like. As described, the network conditions can include one or more conditions that impact a UE's ability to communicate with the serving node to enable the UE to estimate an available bandwidth/achievable throughput in communicating with the serving node.

At 1320, the method 1300 includes generating assistance information based at least in part on the network conditions. Serving node 14, assistance information provisioning component 78, or one or more components thereof (e.g., TBS generating component 79, CQI offset generating component 80, or power offset generating component 81) can generate the assistance information based at least in part on the network conditions. For instance, the assistance information can include a standard TBS, CQI-to-TBS mapping table, CQI offset, power offset, or other information that can assist a UE in estimating available bandwidth/achievable throughput at the serving node, and the assistance information can be generated based on the network conditions to more accurately reflect the available bandwidth/achievable throughput. Thus, for example, where offloading requirements are high and a current load is low, the assistance information can include a CQI-to-TBS mapping table that maps CQIs to higher TBSs, the CQI offset can include a higher CQI offset, the power offset can include a higher power offset, etc., than where the offloading requirements are low and/or the current load is high.

At 1330, the method 1300 includes provisioning the assistance information for receipt by one or more UEs. Serving node 14 or assistance information provisioning component 78 can provision the assistance information for receipt by one or more UEs. For example, the assistance information can be signaled to the one or more UEs at least in part by transmitting a broadcast signal that indicates the assistance information (e.g., in a SIB or other overhead broadcast signal at a RRC or other layer), transmitting a dedicated signal to the one or more UEs, in which example the assistance information may be specific to the UE (e.g., specific to a category/capability of the UE), and/or the like.

Figure 14:
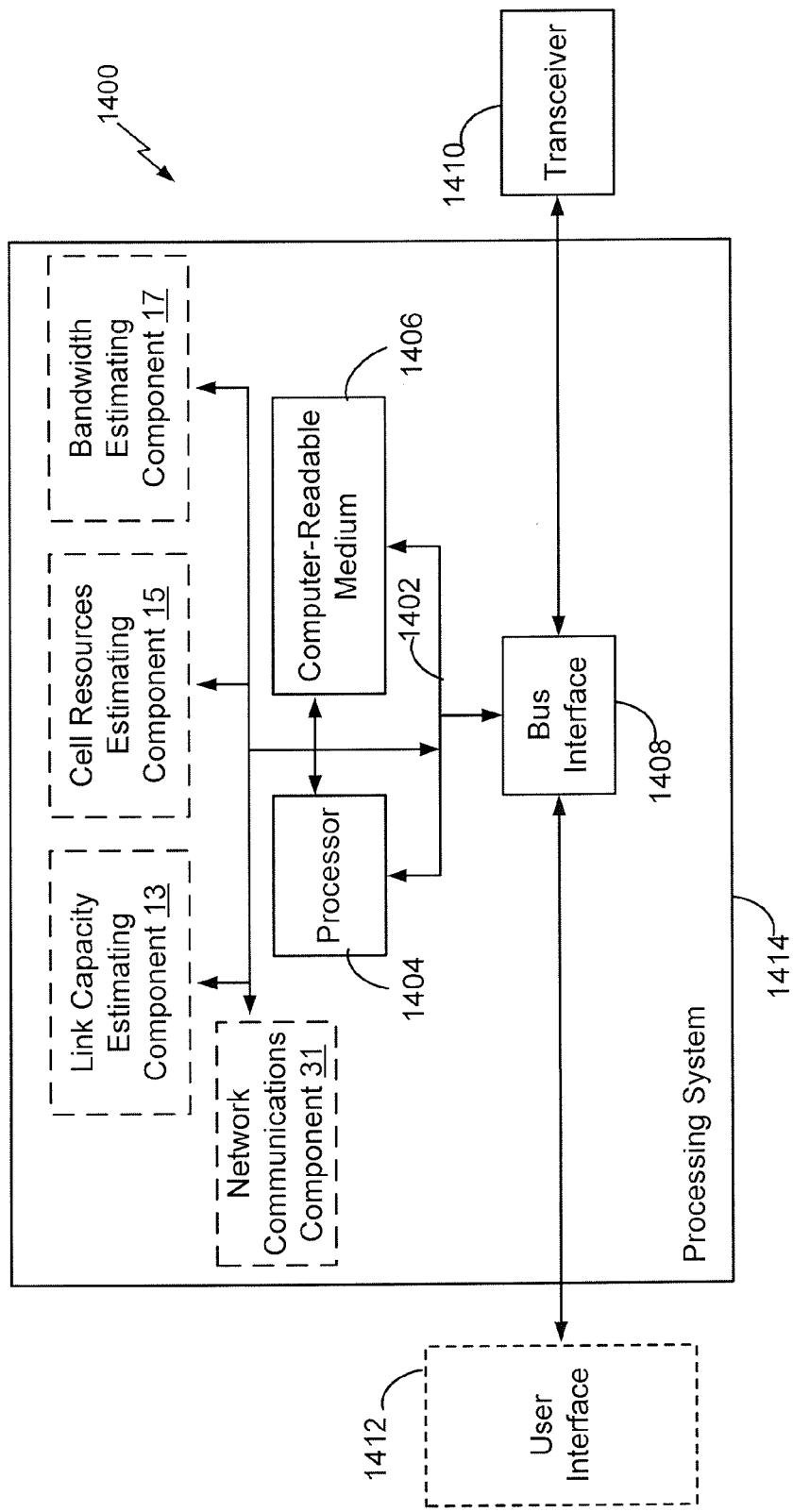
FIG. 14 is a block diagram illustrating an example of a hardware implementation for the UE employing a processing system associated with aspects of FIGS. 1-13.

FIG. 14 is a block diagram illustrating an example of a hardware implementation for an apparatus 1400 employing a processing system 1414, which may be configured to implement the functional components and/or aspects illustrated in any, or all, of FIGS. 1-13 and FIGS. 19-22 (as described below with respect to UE 11 operating in an LTE system in an idle and/or connected mode). For example, apparatus 1400 may be specially programmed or otherwise configured to operate as UE 11 to determine an estimated available bandwidth of a cell and/or to determine an estimated available T2P ratio, serving node 14, neighboring node 16, or the like, as described herein. In this regard, for example, processing system 1414 may include a link capacity estimating component 13 (and/or one or more components thereof, such as a communication quality measuring component 71, spectral efficiency determining component 72, etc., not shown), a cell resources estimating component 15 (and/or one or more components thereof, such as an assistance information receiving component 70, a TBS determining component 73, a cell bandwidth determining component 74, a CQI offset determining component 75, a power offset determining component 76, a power headroom determining component 77, etc., not shown), a bandwidth estimating component 17, and/or a network communications component 31, as described in detail above. Thus, aspects of these components may be hardware, software, firmware, or some combination thereof, which may be executed by the processor 1404 or processing system 1414.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 links together various circuits including one or more processors, represented generally by the processor 1404, and computer-readable media, represented generally by the computer-readable medium 1406. In this regard, for example, the link capacity estimating component 13, cell resources estimating component 15, bandwidth estimating component 17, network communications component 31, components thereof, etc., may be implemented by software defined in the computer-readable medium 1406 executing on processor 1404, or as one or more processor modules within processor 1404, or some combination of both. The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a means for communicating with various other apparatus over a transmission medium. Thus, in this regard for example, the link capacity estimating component 13, cell resources estimating component 15, bandwidth estimating component 17, network communications component 31, components thereof, etc., may also operate in conjunction with bus interface 1408 via bus 1402. Depending upon the nature of the apparatus, a user interface 1412 (e.g., keypad, display, speaker, microphone, joystick) may also be provided.

The processor 1404 is responsible for managing the bus 1402 and general processing, including the execution of software stored on the computer-readable medium 1406. The software, when executed by the processor 1404, causes the processing system 1414 to perform the various functions described infra for any particular apparatus. The computer-readable medium 1406 may also be used for storing data that is manipulated by the processor 1404 when executing software. In an aspect, for example, processor 1404 and/or computer-readable medium 1406 may be specially programmed or otherwise configured to operate as UE 11, serving node 14, neighboring node 16, or the like, as described herein.

The various concepts presented throughout this disclosure may be implemented across a broad variety of telecommunication systems, network architectures, and communication standards.

Figure 15:
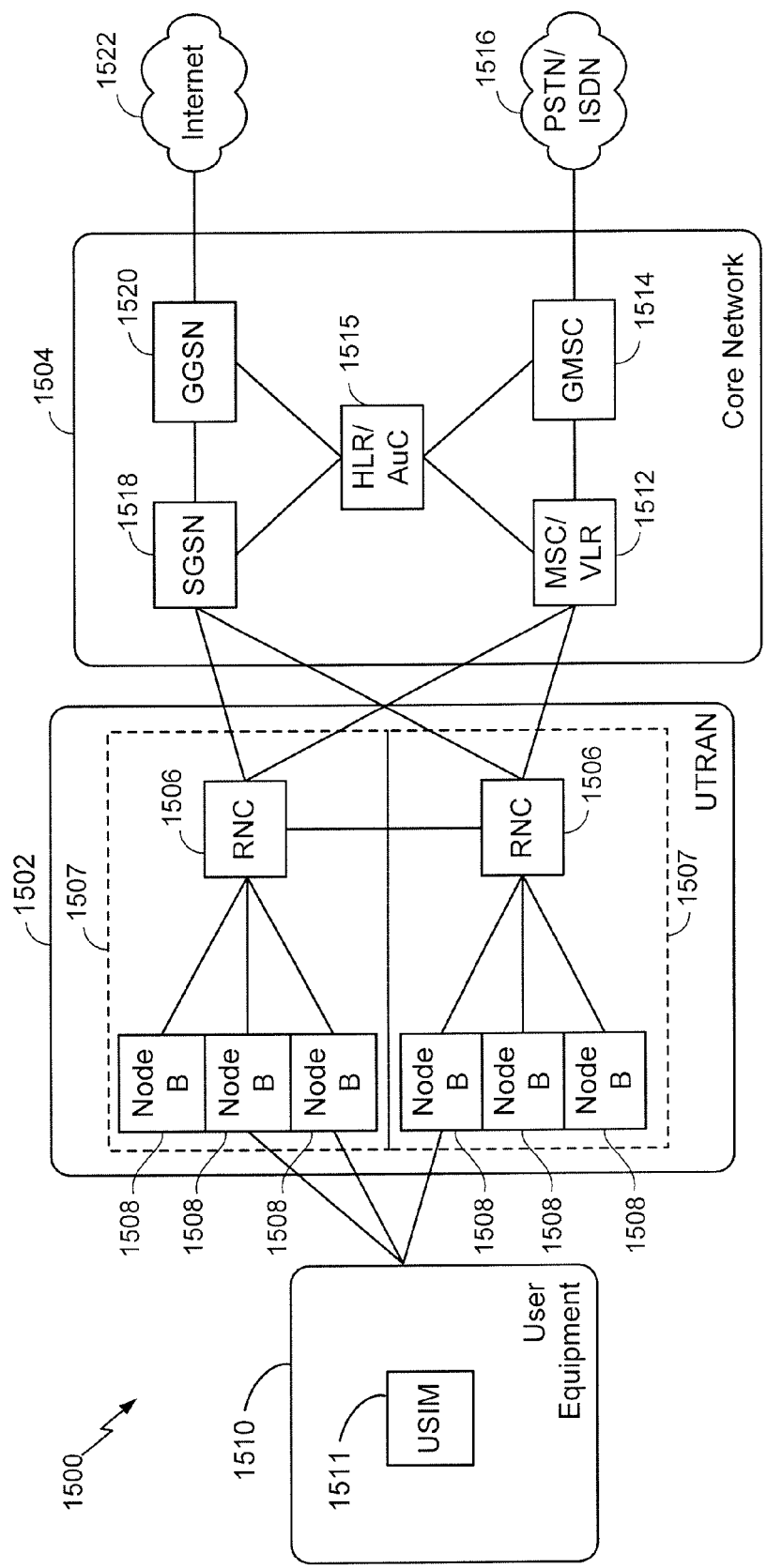
FIG. 15 is a block diagram illustrating an example of a telecommunications system associated with aspects of FIGS. 1-13.

By way of example and without limitation, the aspects of the present disclosure illustrated in FIG. 15 are presented with reference to a UMTS system 1500 employing a W-CDMA air interface. A UMTS network includes three interacting domains: a Core Network (CN) 1504, a UMTS Terrestrial Radio Access Network (UTRAN) 1502, and User Equipment (UE) 1510, which may be configured to operate as UE 11 to determine an estimated available bandwidth of a cell, or as UE 11 to determine an estimated available T2P ratio. In this example, the UTRAN 1502 provides various wireless services including telephony, video, data, messaging, broadcasts, and/or other services. The UTRAN 1502 may include a plurality of Radio Network Subsystems (RNSs) such as an RNS 1507, each controlled by a respective Radio Network Controller (RNC) such as an RNC 1506. Here, the UTRAN 1502 may include any number of RNCs 1506 and RNSs 1507 in addition to the RNCs 1506 and RNSs 1507 illustrated herein. The RNC 1506 is an apparatus responsible for, among other things, assigning, reconfiguring and releasing radio resources within the RNS 1507. The RNC 1506 may be interconnected to other RNCs (not shown) in the UTRAN 1502 through various types of interfaces such as a direct physical connection, a virtual network, or the like, using any suitable transport network.

Communication between a UE 1510 and a Node B 1508 may be considered as including a physical (PHY) layer and a medium access control (MAC) layer. Further, communication between a UE 1510 and an RNC 1506 by way of a respective Node B 1508 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification of some 3GPP technologies. Further, for example, UE 1510 may be specially programmed or otherwise configured to operate as UE 11, and/or Node B 1508 as serving node 14, neighboring node 16, or the like, as described herein.

The geographic region covered by the RNS 1507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 1508 are shown in each RNS 1507; however, the RNSs 1507 may include any number of wireless Node Bs. The Node Bs 1508 provide wireless access points to a CN 1504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In addition, with the Internet of Things/Everything becoming more prevalent in the future, it would be beneficial to include other types of devices as a mobile apparatus or UE and not just the traditional mobile device, such as a watch, a personal digital assistant, a personal monitoring device, a machine monitoring device, a machine to machine communication device, etc. In a UMTS system, the UE 1510 may further include a universal subscriber identity module (USIM) 1511, which contains a user's subscription information to a network. For illustrative purposes, one UE 1510 is shown in communication with a number of the Node Bs 1508. The DL, also called the forward link, refers to the communication link from a Node B 1508 to a UE 1510, and the UL, also called the reverse link, refers to the communication link from a UE 1510 to a Node B 1508.

The CN 1504 interfaces with one or more access networks, such as the UTRAN 1502. As shown, the CN 1504 is a GSM core network. However, as those skilled in the art will recognize, the various concepts presented throughout this disclosure may be implemented in a RAN, or other suitable access network, to provide UEs with access to types of CNs other than GSM networks.

The CN 1504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 1504 supports circuit-switched services with a MSC 1512 and a GMSC 1514. In some applications, the GMSC 1514 may be referred to as a media gateway (MGW). One or more RNCs, such as the RNC 1506, may be connected to the MSC 1512. The MSC 1512 is an apparatus that controls call setup, call routing, and UE mobility functions. The MSC 1512 also includes a VLR that contains subscriber-related information for the duration that a UE is in the coverage area of the MSC 1512. The GMSC 1514 provides a gateway through the MSC 1512 for the UE to access a circuit-switched network 1516. The GMSC 1514 includes a home location register (HLR) 1515 containing subscriber data, such as the data reflecting the details of the services to which a particular user has subscribed. The HLR is also associated with an authentication center (AuC) that contains subscriber-specific authentication data. When a call is received for a particular UE, the GMSC 1514 queries the HLR 1515 to determine the UE's location and forwards the call to the particular MSC serving that location.

The CN 1504 also supports packet-data services with a serving GPRS support node (SGSN) 1518 and a gateway GPRS support node (GGSN) 1520. GPRS, which stands for General Packet Radio Service, is designed to provide packet-data services at speeds higher than those available with standard circuit-switched data services. The GGSN 1520 provides a connection for the UTRAN 1502 to a packet-based network 1522. The packet-based network 1522 may be the Internet, a private data network, or some other suitable packet-based network. The primary function of the GGSN 1520 is to provide the UEs 1510 with packet-based network connectivity. Data packets may be transferred between the GGSN 1520 and the UEs 1510 through the SGSN 1518, which performs primarily the same functions in the packet-based domain as the MSC 1512 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 1508 and a UE 1510. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 1510 provides feedback to the node B 1508 over the HS-DPCCH to indicate whether it correctly decoded a packet on the downlink.

HS-DPCCH further includes feedback signaling from the UE 1510 to assist the node B 1508 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 1508 and/or the UE 1510 may have multiple antennas supporting MIMO technology. The use of MIMO technology enables the node B 1508 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel)

and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 1510 to increase the data rate or to multiple UEs 1510 to increase the overall system capacity. This is achieved by spatially precoding each data stream and then transmitting each spatially precoded stream through a different transmit antenna on the downlink. The spatially precoded data streams arrive at the UE(s) 1510 with different spatial signatures, which enables each of the UE(s) 1510 to recover the one or more the data streams destined for that UE 1510. On the uplink, each UE 1510 may transmit one or more spatially precoded data streams, which enables the node B 1508 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 16:
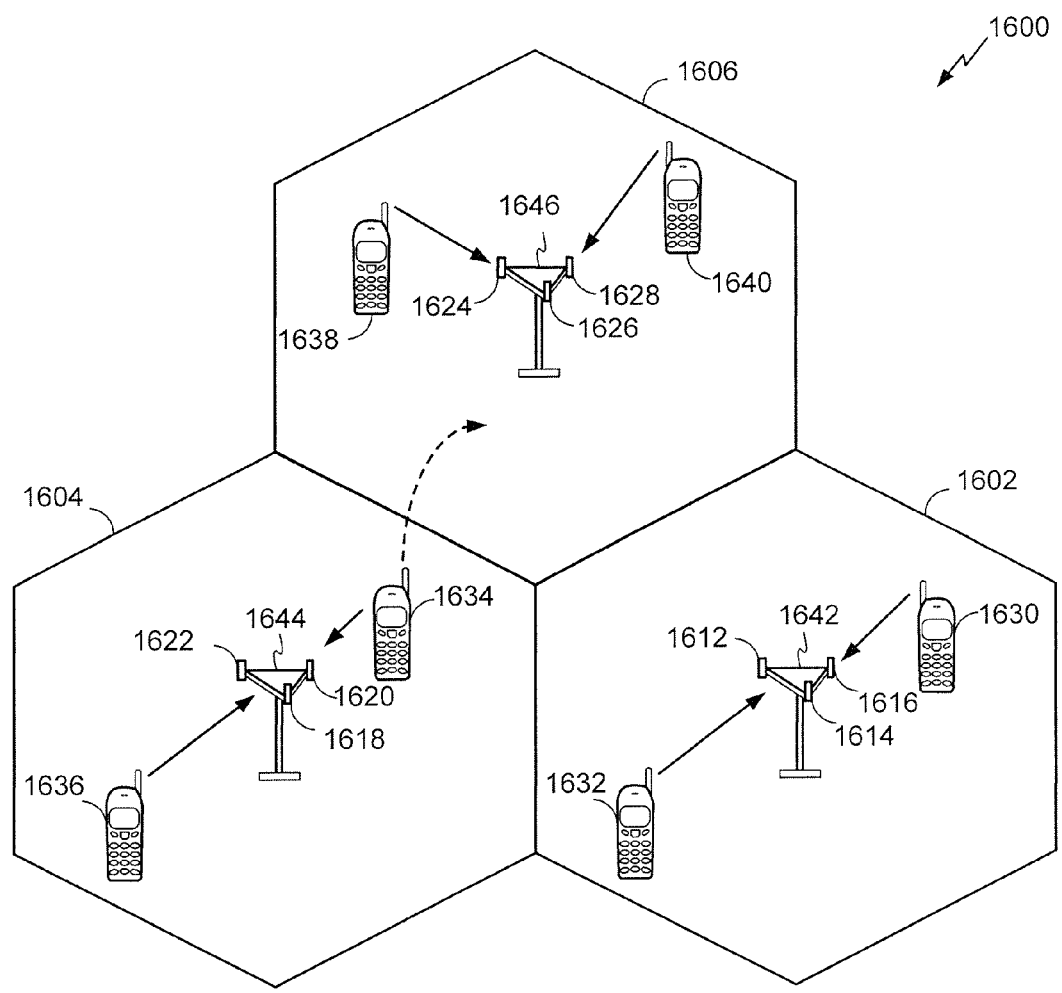
FIG. 16 is a block diagram illustrating an example of an access network associated with aspects of FIGS. 1-13.

Referring to FIG. 16, an access network 1600 in a UTRAN architecture is illustrated, which may include one or more UEs to operate as UE 11 to determine an estimated available bandwidth of a cell, or to operate as UE 11 to determine an estimated available T2P ratio. The multiple access wireless communication system includes multiple cellular regions (cells), including cells 1602, 1604, and 1606, each of which may include one or more sectors. The multiple sectors can be formed by groups of antennas with each antenna responsible for communication with UEs in a portion of the cell. For example, in cell 1602, antenna groups 1612, 1614, and 1616 may each correspond to a different sector. In cell 1604, antenna groups 1618, 1620, and 1622 each correspond to a different sector. In cell 1606, antenna groups 1624, 1626, and 1628 each correspond to a different sector. The cells 1602, 1604 and 1606 may include several wireless communication devices, e.g., User Equipment or UEs, which may be in communication with one or more sectors of each cell 1602, 1604 or 1606. For example, UEs 1630 and 1632 may be in communication with Node B 1642, UEs 1634 and 1636 may be in communication with Node B 1644, and UEs 1638 and 1640 can be in communication with Node B 1646. Here, each Node B 1642, 1644, 1646 is configured to provide an access point to a CN 1504 (FIG. 15) for all the UEs 1630, 1632, 1634, 1636, 1638, 1640 in the respective cells 1602, 1604, and 1606. For example, in an aspect, the UEs may be specially programmed or otherwise configured to operate as UE 11, and/or Node Bs as serving node 14, neighboring node 16, or the like, as described herein.

As the UE 1634 moves from the illustrated location in cell 1604 into cell 1606, a serving cell change (SCC) or handover may occur in which communication with the UE 1634 transitions from the cell 1604, which may be referred to as the source cell, to cell 1606, which may be referred to as the target cell. Management of the handover procedure may take place at the UE 1634, at the Node Bs corresponding to the respective cells, at a radio network controller 1506 (FIG. 15), or at another suitable node in the wireless network. For example, during a call with the source cell 1604, or at any other time, the UE 1634 may monitor various parameters of the source cell 1604 as well as various parameters of neighboring cells such as cells 1606 and 1602. Further, depending on the quality of these parameters, the UE 1634 may maintain communication with one or more of the neighboring cells. During this time, the UE 1634 may maintain an Active Set, that is, a list of cells that the UE 1634 is simultaneously connected to (e.g., the UTRA cells that are currently assigning a downlink dedicated physical channel DPCH or fractional downlink dedicated physical channel F-DPCH to the UE 1634 may constitute the Active Set).

The modulation and multiple access scheme employed by the access network 1600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 17:
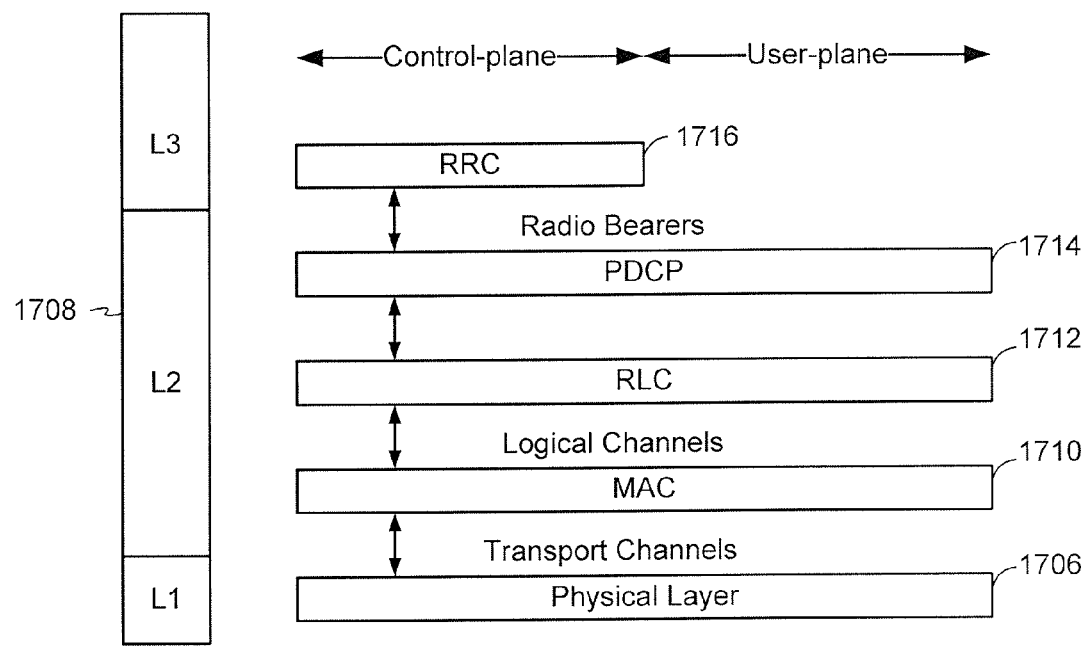
FIG. 17 is a block diagram illustrating an example of a radio protocol architecture for the user and control plane implemented by components of the systems associated with aspects of FIGS. 1-13.

The radio protocol architecture may take on various forms depending on the particular application. An example for an HSPA system will now be presented with reference to FIG. 17. FIG. 17 is a conceptual diagram illustrating an example of the radio protocol architecture for the user and control planes.

Referring to FIG. 17, the radio protocol architecture for a UE, such as a UE configured to operate as UE 11 to determine an estimated available bandwidth of a cell, or as UE 11 to determine an estimated available T2P ratio, and Node B is shown with three layers: Layer 1, Layer 2, and Layer 3. Layer 1 is the lowest lower and implements various physical layer signal processing functions. Layer 1 will be referred to herein as the physical layer 1706. Layer 2 (L2 layer) 1708 is above the physical layer 1706 and is responsible for the link between the UE and Node B over the physical layer 1706. For example, the UE utilizing the radio protocol architecture described here may be specially programmed or otherwise configured to operate as UE 11, UE 11, serving node 14, neighboring node 16, or the like, as described herein.

In the user plane, the L2 layer 1708 includes a media access control (MAC) sublayer 1710, a radio link control (RLC) sublayer 1712, and a packet data convergence protocol (PDCP) 1714 sublayer, which are terminated at the node B on the network side. Although not shown, the UE may have several upper layers above the L2 layer 1708 including a network layer (e.g., IP layer) that is terminated at a PDN gateway on the network side, and an application layer that is terminated at the other end of the connection (e.g., far end UE, server, or the like).

The PDCP sublayer 1714 provides multiplexing between different radio bearers and logical channels. The PDCP sublayer 1714 also provides header compression for upper layer data packets to reduce radio transmission overhead, security by ciphering the data packets, and handover support for UEs between node Bs. The RLC sublayer 1712 provides segmentation and reassembly of upper layer data packets, retransmission of lost data packets, and reordering of data packets to compensate for out-of-order reception due to hybrid automatic repeat request (HARQ). The MAC sublayer 1710 provides multiplexing between logical and transport channels. The MAC sublayer 1710 is also responsible for allocating the various radio resources (e.g., resource blocks) in one cell among the UEs. The MAC sublayer 1710 is also responsible for HARQ operations.

Figure 18:
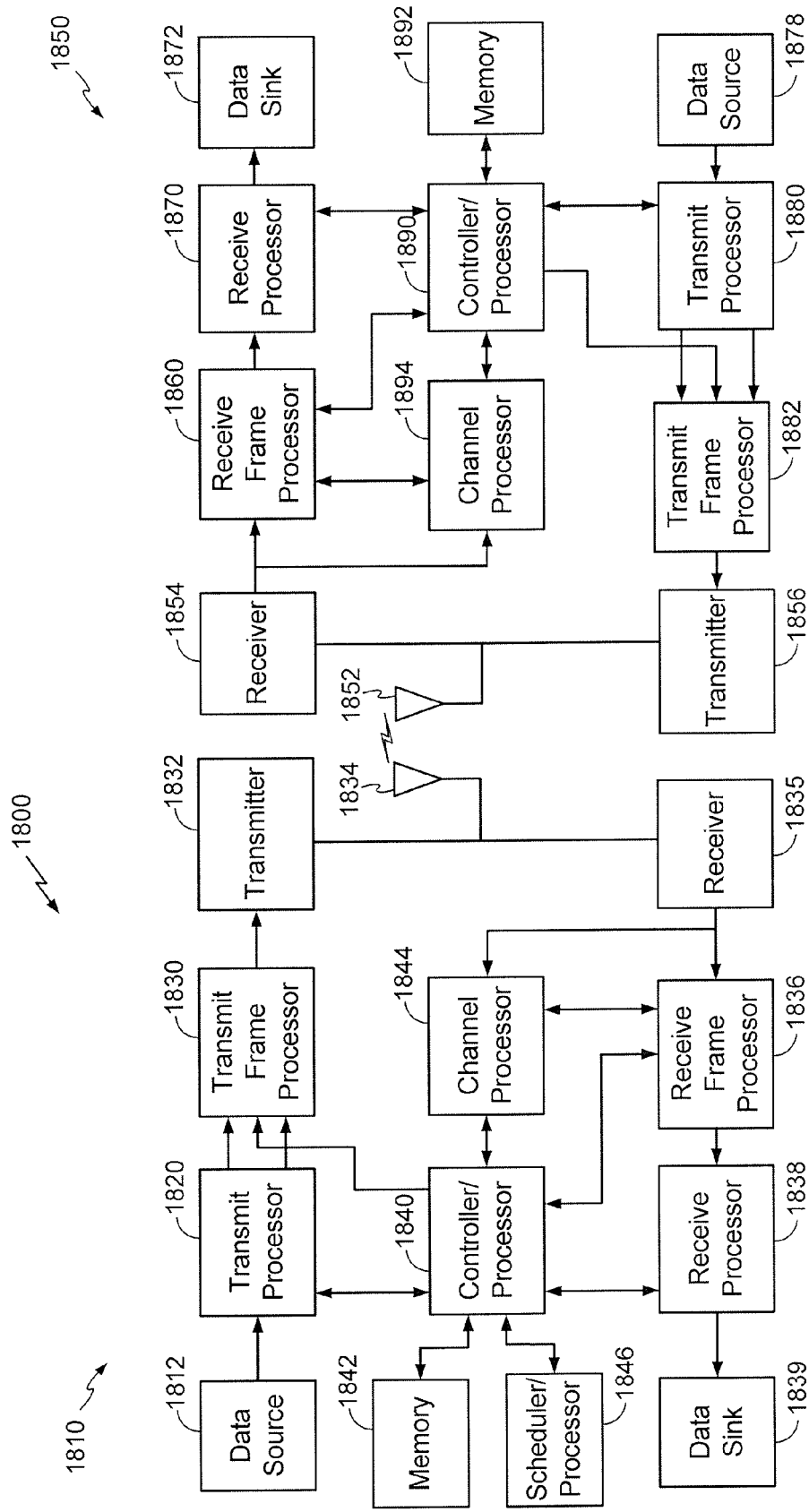
FIG. 18 is a block diagram illustrating an example of a Node B in communication with a UE in a telecommunications system, including aspects associated with aspects of FIGS. 1-13.

FIG. 18 is a block diagram of a system 1800 including a Node B 1810 in communication with a UE 1850. For example, UE 1850 may be specially programmed or otherwise configured to operate as UE 11 to determine an estimated available bandwidth of a cell, or as UE 11 to determine an estimated available T2P ratio. Similarly, Node B 1810 may be configured to operate as serving node 14, neighboring node 16, or the like, as described herein. Further, for example, the Node B 1810 may be the same as or similar to Node B 1808, and the UE 1850 may be the same as or similar to UE 11. In the downlink communication, a transmit processor 1820 may receive data from a data source 1812 and control signals from a controller/processor 1840. The transmit processor 1820 provides various signal processing functions for the data and control signals, as well as reference signals (e.g., pilot signals). For example, the transmit processor 1820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1844 may be used by a controller/processor 1840 to determine the coding, modulation, spreading, and/or scrambling schemes for the transmit processor 1820. These channel estimates may be derived from a reference signal transmitted by the UE 1850 or from feedback from the UE 1850. The symbols generated by the transmit processor 1820 are provided to a transmit frame processor 1830 to create a frame structure. The transmit frame processor 1830 creates this frame structure by multiplexing the symbols with information from the controller/processor 1840, resulting in a series of frames. The frames are then provided to a transmitter 1832, which provides various signal conditioning functions including amplifying, filtering, and modulating the frames onto a carrier for downlink transmission over the wireless medium through antenna 1834. The antenna 1834 may include one or more antennas, for example, including beam steering bidirectional adaptive antenna arrays or other similar beam technologies.

At the UE 1850, a receiver 1854 receives the downlink transmission through an antenna 1852 and processes the transmission to recover the information modulated onto the carrier. The information recovered by the receiver 1854 is provided to a receive frame processor 1860, which parses each frame, and provides information from the frames to a channel processor 1894 and the data, control, and reference signals to a receive processor 1870. The receive processor 1870 then performs the inverse of the processing performed by the transmit processor 1820 in the Node B 1810. More specifically, the receive processor 1870 descrambles and despreads the symbols, and then determines the most likely signal constellation points transmitted by the Node B 1810 based on the modulation scheme. These soft decisions may be based on channel estimates computed by the channel processor 1894. The soft decisions are then decoded and deinterleaved to recover the data, control, and reference signals. The CRC codes are then checked to determine whether the frames were successfully decoded. The data carried by the successfully decoded frames will then be provided to a data sink 1872, which represents applications running in the UE 1850 and/or various user interfaces (e.g., display). Control signals carried by successfully decoded frames will be provided to a controller/processor 1890. When frames are unsuccessfully decoded by the receiver processor 1870, the controller/processor 1890 may also use an acknowledgement (ACK) and/or negative acknowledgement (NACK) protocol to support retransmission requests for those frames.

In the uplink, data from a data source 1878 and control signals from the controller/processor 1890 are provided to a transmit processor 1880. The data source 1878 may represent applications running in the UE 1850 and various user interfaces (e.g., keyboard). Similar to the functionality described in connection with the downlink transmission by the Node B 1810, the transmit processor 1880 provides various signal processing functions including CRC codes, coding and interleaving to facilitate FEC, mapping to signal constellations, spreading with OVSFs, and scrambling to produce a series of symbols. Channel estimates, derived by the channel processor 1894 from a reference signal transmitted by the Node B 1810 or from feedback contained in the midamble transmitted by the Node B 1810, may be used to select the appropriate coding, modulation, spreading, and/or scrambling schemes. The symbols produced by the transmit processor 1880 will be provided to a transmit frame processor 1882 to create a frame structure. The transmit frame processor 1882 creates this frame structure by multiplexing the symbols with information from the controller/processor 1890, resulting in a series of frames. The frames are then provided to a transmitter 1856, which provides various signal conditioning functions including amplification, filtering, and modulating the frames onto a carrier for uplink transmission over the wireless medium through the antenna 1852.

The uplink transmission is processed at the Node B 1810 in a manner similar to that described in connection with the receiver function at the UE 1850. A receiver 1835 receives the uplink transmission through the antenna 1834 and processes the transmission to recover the information modulated onto the carrier. The information recovered by the receiver 1835 is provided to a receive frame processor 1836, which parses each frame, and provides information from the frames to the channel processor 1844 and the data, control, and reference signals to a receive processor 1838. The receive processor 1838 performs the inverse of the processing performed by the transmit processor 1880 in the UE 1850. The data and control signals carried by the successfully decoded frames may then be provided to a data sink 1839 and the controller/processor, respectively. If some of the frames were unsuccessfully decoded by the receive processor, the controller/processor 1840 may also use an acknowledgement (ACK) and/or negative acknowledgement (NACK) protocol to support retransmission requests for those frames.

The controller/processors 1840 and 1890 may be used to direct the operation at the Node B 1810 and the UE 1850, respectively. For example, the controller/processors 1840 and 1890 may provide various functions including timing, peripheral interfaces, voltage regulation, power management, and other control functions. The computer readable media of memories 1842 and 1892 may store data and software for the Node B 1810 and the UE 1850, respectively. A scheduler/processor 1846 at the Node B 1810 may be used to allocate resources to the UEs and schedule downlink and/or uplink transmissions for the UEs.

In an aspect, serving node 14 and neighboring node 16 may be operating according to a Long Term Evolution (LTE) communication standard. Such aspect may now be described with respect to FIGS. 19-28, though aspects of operating in LTE are additionally described above (e.g., at least in FIGS. 11-13). UE 11 may be in an idle mode or a connected mode at any given time.

Figure 19:
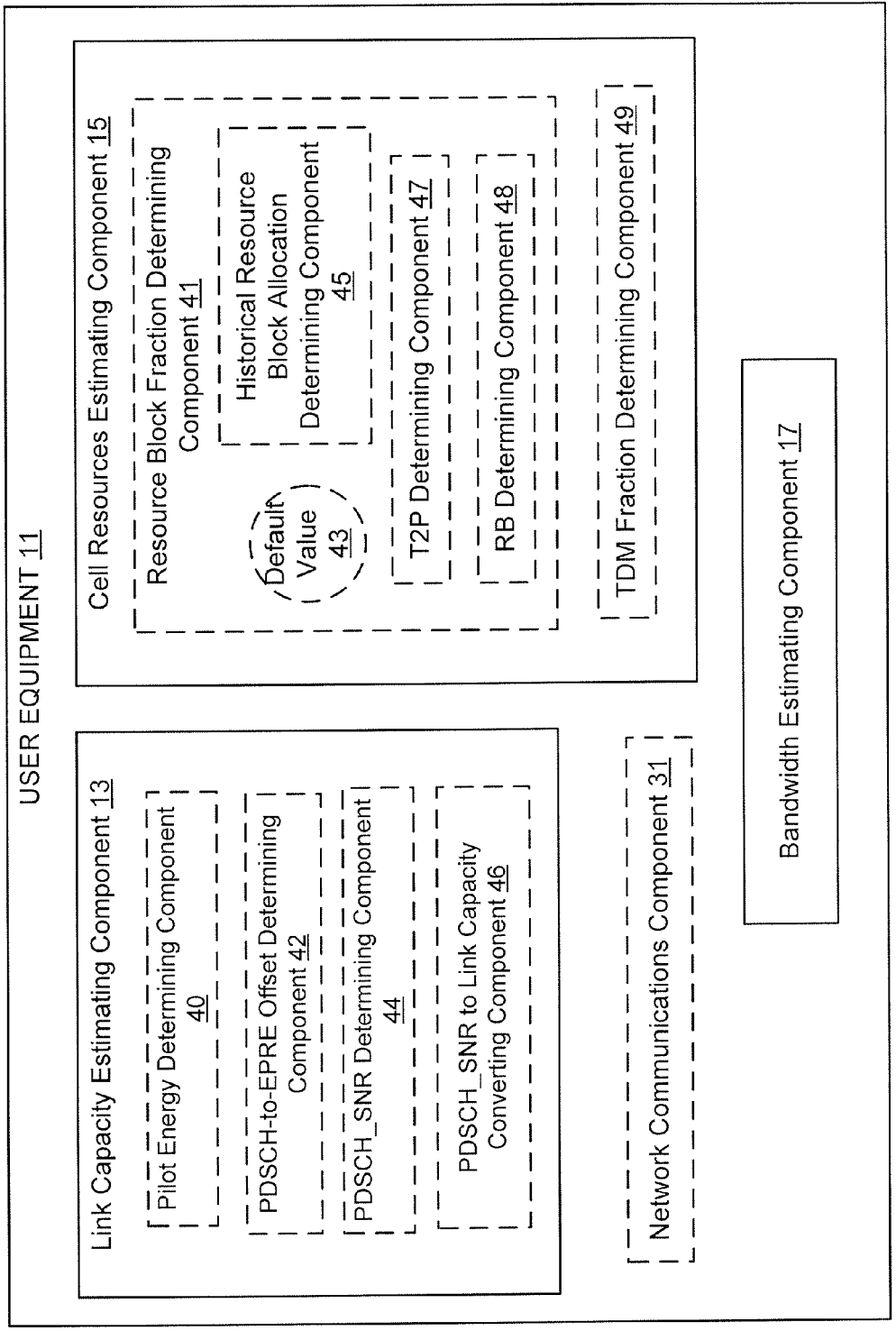
FIG. 19 is a block diagram of aspects of a UE in an idle mode in communication with a cell operating according to LTE.

Referring to FIG. 19, additional aspects of UE 11, which may be used when UE 11 is in an idle mode and operating according to LTE, are shown. The functional components of UE 11, as shown in FIG. 19, may be implemented by a hardware implementation for an apparatus 1400 employing a processing system 1414, as described herein with respect to FIG. 14. For example, apparatus 1400 may be specially programmed or otherwise configured to operate as UE 11 (having the components shown in, for example, FIG. 19) as described herein.

As such, and in an aspect, an available bandwidth of a cell may be estimated for UE 11 based on an estimated available link capacity and an estimated available fraction of cell resources. The additional, optional, components shown within UE 11, link capacity estimating component 13, and cell resources estimating component 15, which are not shown as part of UE 11 in FIG. 1, may optionally be used by UE 11 when operating in an idle mode and according to LTE.

In an aspect, UE 11 and/or link capacity estimating component 13 may include a pilot energy determining component 40 for determining a pilot energy (Ep/Nt) for a cell (e.g., serving node 14) in the dB domain. UE 11 and/or link capacity estimating component 13 may include a PDSCH-to-EPRE offset determining component 42 for determining a nominal Physical Downlink Shared Channel (PDSCH)-to-Energy Per Resource Element (EPRE) offset in the dB domain for a cell. UE 11 and/or link capacity estimating component 13 may include a PDSCH_SNR determining component 24 for determining a pilot tone signal-to-noise ratio (PDSCH_SNR) by combining the determined pilot energy (Ep/Nt) and the nominal PDSCH-to-EPRE offset. UE 11 and/or link capacity estimating component 13 may include PDSCH_SNR to link capacity converting component 46 for converting the PDSCH_SNR to a link capacity (link_capacity) value. The PDSCH_SNR may be converted to link capacity (e.g., a rate), in an aspect, using a CQI index-to-rate lookup table. In another aspect, the PDSCH_SNR may be converted to link capacity based on the Shannon capacity equation. In yet another aspect, a UE may be configured to map PDSCH_SNR with CQI indices while in the connected mode, which mapping could then be used by the UE in idle mode to convert the measured Reference Signal (RS) SNR to a CQI index in the idle mode. The UE may then use a CQI index-to-rate lookup table to determine a rate based on the CQI index.

In an aspect, UE 11 and/or cell resources estimating component 15 may include a resource block (RB) fraction (alpha_RB) determining component 21 and a Time-Domain Multiplexing (TDM) fraction (alpha_TDM) determining component 49. The resource block fraction determining component 41 may include historical resource block allocation determining component 45 for determining a resource block fraction (alpha_RB) based on historical data. In an aspect, historical resource block allocation determining component 45 may determine a number of resource blocks that were allocated to the UE in the connected mode in the recent past (e.g., over a configurable time window of T seconds) when the traffic volume was above a configurable threshold (e.g., traffic volume was at least X bits during time window T).

The resource block fraction determining component 41 may include a default value 43. In an aspect, and in the absence of enough history to determine the number of resource blocks, a default value may be used. For example, if the selected amount of time (e.g., the window of time T seconds) has not yet elapsed and/or if the traffic volume was not above a configurable threshold (e.g., was not at least X bits) during the window of time, the UE 11 may determine that there is not enough historical data to determine a number of resource blocks. As such, a default value may be used for the number of resource blocks. The resource block fraction determining component 41 may include T2P determining component 27 for determining a traffic-to-pilot (T2P) power transmitted from a cell during a configurable window of time when traffic volume was above a configurable threshold. Resource block fraction determining component 41 may be configured to determine a resource block fraction (alpha_RB) based on a number of resource blocks divided by a total number of resource blocks (assuming no traffic from other users). In an aspect, the number of resource blocks may be based on the determination by historical resource block allocation determining component 45. In another aspect, the number of resource blocks may be based on default value 43. In yet another aspect, the number of resource blocks may be based on the determination by T2P determining component 27.

The TDM fraction (alpha_TDM) determining component 49 may determine information related to resource blocks provided to the UE 11 from the cell for every one out of a configurable number N of time transmission intervals (TTI). TDM fraction determining component 49 may base its determination on historical data by determining a number of resource blocks provided for every 1/N TTIs over a configurable time window when traffic volume was above a configurable threshold. TDM fraction determining component 49 may be configured to determine the TDM fraction (alpha_TDM) by determining an average of the historical data.

As such, and in an aspect, cell resources estimating component 15 may be configured to determine the estimated fraction of available cell resources (a) based on the output of the resource block fraction determining component 41 and the output of the TDM fraction determining component 49. In other words, cell resources estimating component 15 may be configured to determine the estimated fraction of available cell resources (α) based on the product of alpha_RB*alpha_TDM.

In another aspect, a fraction of available cell resources may be provided to the UE, and then provided by the UE to the cell resources estimating component 15, by at least one network entity. For example, the fraction of available cell resources may be provided to cell resources estimating component 15 by a serving eNodeB, a network node, a server, one or more other UEs (e.g., the value may be crowd-sourced), or any combination thereof. In such an aspect, the UE may not have to perform an estimation, but, rather, may use the provided value. In yet another aspect, the at least one network entity may provide alpha_RB and alpha_TDM to the UE, such that cell resources estimating component 15 may estimate a fraction of available cell resources (a) by alpha_RB*alpha_TDM as described herein.

Additionally, in a further optional aspect, UE 11 may additionally include a network communications component 31 for performing one or more network communications procedures based on the estimated available bandwidth for a cell, as determined by bandwidth estimating component 17. For example, the network communication procedures performed by network communications component 31 may include, but are not limited to, a cell reselection procedure and a handover procedure.

Figure 20:
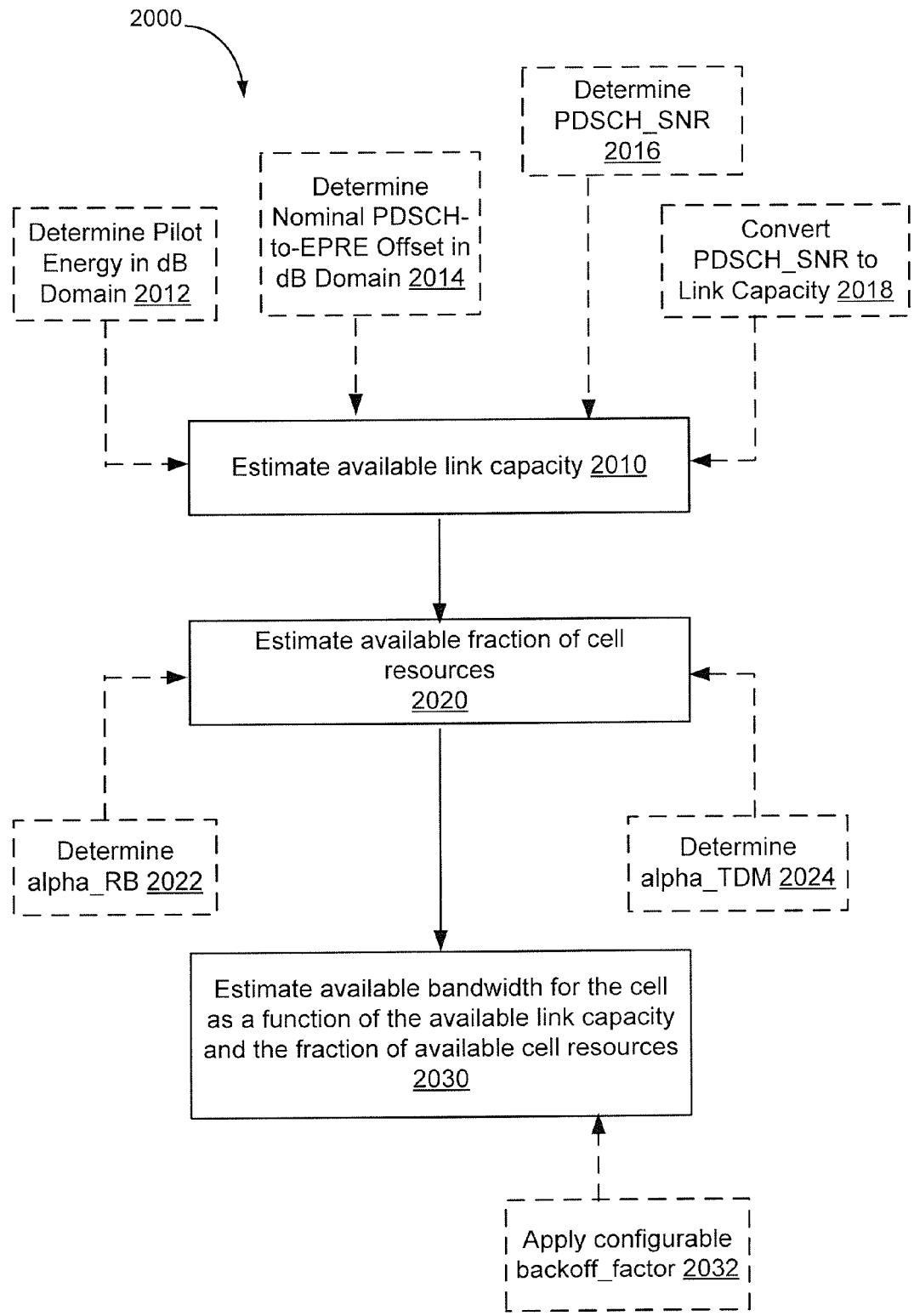
FIG. 20 is a flow chart of a method for determining available downlink bandwidth of a cell operating according to LTE when a UE is in an idle mode.

Referring to FIG. 20, a method 2000 may be used to estimate an available bandwidth of a cell (e.g., serving node 14) for UE 11 while in the idle mode. For example, UE 11 and/or bandwidth estimating component 17, in communication with link capacity estimating component 13 and cell resources estimating component 15, and the additional, optional components, included therein, all of FIG. 19, may be configured to estimate an available bandwidth of a cell for UE 11 while in the idle mode.

At 2010, the method 2000 includes estimating an available link capacity of a cell for a user equipment based on channel quality measurements generated at the user equipment. For example, link capacity estimating component 13 may be configured to estimate an available link capacity of a cell for UE 11. In an aspect, at 2012, the method 2000 may include determining a pilot energy (Ep/Nt) in the dB domain. For example, pilot energy determining component 40 may be configured to determine a pilot energy (Ep/Nt) in the dB domain. In an aspect, at 2014, the method 2000 may include determining a nominal Physical Downlink Shared Channel (PDSCH)-to-Energy Per Resource Element (EPRE) offset in the dB domain. For example, PDSCH-to-EPRE offset determining component 22 may be configured to determine a nominal Physical Downlink Shared Channel (PDSCH)-to-Energy Per Resource Element (EPRE) offset in the dB domain. In an aspect, at 2016, the method 2000 may include determining a pilot tone signal-to-noise ratio (PDSCH_SNR) by summing the pilot energy (Ep/Nt) and nominal PDSCH-to-EPRE offset. For example, PDSCH_SNR determining component 24 may be configured to determine a pilot tone signal-to-noise ratio (PDSCH_SNR) by summing the pilot energy (Ep/Nt) and nominal PDSCH-to-EPRE offset.

In an aspect, at 2018, the method 2000 may include converting the PDSCH_SNR to link capacity. For example, PDSCH_SNR to link capacity converting component 46 may be configured to convert the PDSCH_SNR to link capacity. The PDSCH_SNR may be converted to link capacity (e.g., a rate), in an aspect, using a CQI index-to-rate lookup table. In another aspect, the PDSCH_SNR may be converted to link capacity based on the Shannon capacity equation. In yet another aspect, a UE may be configured to map PDSCH_SNR with CQI indices while in the connected mode, which mapping could then be used by the UE in idle mode to convert the measured Reference Signal (RS) SNR to a CQI index in the idle mode. The UE may then use a CQI index-to-rate lookup table to determine a rate based on the CQI index.

At 2020, the method 2000 includes estimating an available fraction of cell resources for the user equipment. For example, cell resources estimating component 15 may be configured to estimate an available fraction of cell resources for UE 11. In an aspect, the available fraction of cell resources may be determined based on a resource block fraction (alpha_RB) and a TDM fraction (alpha_TDM).

In an aspect, at 2022, the method 2000 includes determining a resource block fraction (alpha_RB). For example, resource block fraction determining component 41 may be configured to determine alpha_RB. In an aspect, historical resource block allocation determining component 45 may determine a number of resource blocks that were allocated to the UE in the connected mode in the recent past (e.g., over a configurable time window of T seconds) when the traffic volume was above a configurable threshold (e.g., traffic volume was at least X bits during time window T).

The resource block fraction determining component 41 may include a default value 43. In an aspect, and in the absence of enough history to determine the number of resource blocks, a default value may be used. For example, if the selected amount of time (e.g., the window of time T seconds) has not yet elapsed and/or if the traffic volume was not above a configurable threshold (e.g., was not at least X bits) during the window of time, the UE 11 may determine that there is not enough historical data to determine a number of resource blocks. As such, a default value may be used for the number of resource blocks. The resource block fraction determining component 41 may include T2P determining component 27 for determining a traffic-to-pilot (T2P) power transmitted from a cell during a configurable window of time when traffic volume was above a configurable threshold. Resource block fraction determining component 41 may be configured to determine a resource block fraction (alpha_RB) based on a number of resource blocks divided by a total number of resource blocks (assuming no traffic from other users). In an aspect, the number of resource blocks may be based on the determination by historical resource block allocation determining component 45. In another aspect, the number of resource blocks may be based on default value 43. In yet another aspect, the number of resource blocks may be based on the determination by T2P determining component 27.

In an aspect, at 2024, the method 2000 includes determining a Time-Domain Multiplexing (TDM) fraction (alpha_TDM). For example, TDM fraction determining component 49 may be configured to determine alpha_TDM. The TDM fraction (alpha_TDM) determining component 49 may determine information related to resource blocks provided to the UE 11 from the cell for every one out of a configurable number N of time transmission intervals (TTI). TDM fraction determining component 49 may base its determination on historical data by determining a number of resource blocks provided for every 1/N TTIs over a configurable time window when traffic volume was above a configurable threshold. TDM fraction determining component 49 may be configured to determine the TDM fraction (alpha_TDM) by determining an average of the historical data.

As such, UE 11 may estimate an available fraction of cell resources based on the product of alpha_RB and alpha_TDM.

In another aspect (not shown), a fraction of available cell resources may be provided to the UE, and then provided by the UE to the cell resources estimating component 15, by at least one network entity. For example, the fraction of available cell resources may be provided to cell resources estimating component 15 by a serving eNodeB, a network node, a server, one or more other UEs (e.g., the value may be crowd-sourced), or any combination thereof. In such an aspect, the UE may not have to perform an estimation, but, rather, may use the provided value. In yet another aspect, the at least one network entity may provide alpha_RB and alpha_TDM to the UE, such that cell resources estimating component 15 may estimate a fraction of available cell resources (a) by alpha_RB*alpha_TDM as described herein.

At 2030, the method 2000 includes estimating available bandwidth of the cell for the user equipment as a function of the estimated available link capacity and the estimated available fraction of cell resources. For example, bandwidth estimating component 17 may be configured to estimate available bandwidth of the cell for UE 11 based on the estimated available link capacity and the estimated available fraction of cell resources ($\alpha$).

In an aspect, at 2032, the method 2000 may include applying a configurable backoff_factor to the product of the estimated link capacity and the estimated available fraction of cell resources. For example, bandwidth estimating component 17 may be configured to apply a configurable backoff_factor to the product of the estimated link capacity and the estimated available fraction of cell resources (a). To ensure the estimate of available downlink (DL) bandwidth is conservative (e.g., the estimate may be a lower bound), a configurable backoff_factor, or offset, may be applied to the function link_capacity (or rate)*$\alpha$.

Figure 21:
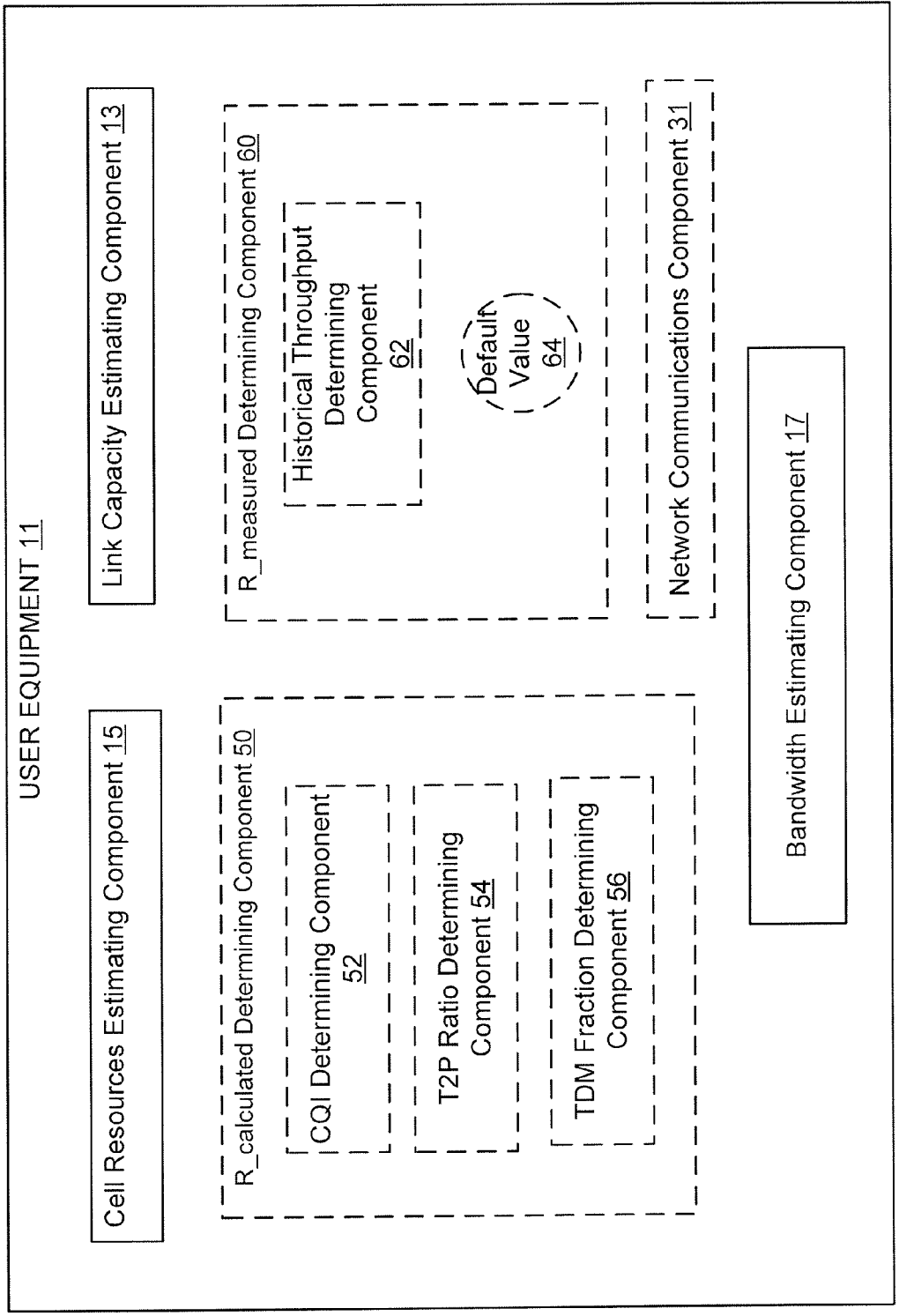
FIG. 21 is a block diagram of aspects of a UE in a connected mode in communication with a cell operating according to LTE.

Referring to FIG. 21, additional aspects of UE 11, which may be used when UE 11 is in a connected mode and operating according to LTE, are shown. The functional components of UE 11, as shown in FIG. 21, may be implemented by a hardware implementation for an apparatus 1400 employing a processing system 1414, as described herein with respect to FIG. 14. For example, apparatus 1400 may be specially programmed or otherwise configured to operate as UE 11 (having the components shown in, for example, FIG. 21) as described herein.

As such, and in an aspect, UE 11 may be configured to determine an available bandwidth at a cell for UE 11 based on an estimated available link capacity and an estimated available fraction of cell resources. More particularly, the estimated available bandwidth may be determined based on a rate (or link capacity) estimate in connected mode (R_calculated) and a measured throughput in connected mode (R_measured). The additional, optional, components shown within UE 11, which are not shown as part of UE 11 in FIG. 1, may optionally be used by UE 11 when operating in a connected mode and according to LTE.

UE 11 may include link capacity estimating component 13, cell resources estimating component 15, R_calculated determining component 50, R_measured determining component 60, and bandwidth estimating component 17 (not shown) in communication with one another.

UE 11 may include R_calculated determining component 50 for determining R_calculated based on the product of a rate, or link capacity (link_capacity), and an available fraction of cell resources ($\alpha$). R_calculated determining component 50 may include Channel Quality Information (CQI) determining component 52 for measuring CQI at UE 11. R_calculated may include T2P ratio determining component 54 for determining an available traffic-to-pilot ratio (T2P) at the cell. R_calculated may include TDM fraction determining component 56 for determining a TDM fraction.

An estimated fraction of available cell resources (a) may be determined by cell resources estimating component 15, in an aspect, in a manner similar to that described herein for a UE in idle mode; however, CQI, as determined by CQI determining component 52, may be used instead of a derived ratio of pilot energy-to noise-plus-interference (Ep/Nt) and the rate may be adjusted based on available traffic-to-pilot (T2P) ratio, as determined by T2P ratio determining component 54, and the TDM fraction, as determined by TDM fraction determining component 56.

UE 11 may include an R_measured determining component 60 for measuring throughput when UE 11 is in the connected mode. R_measured determining component 60 may include historical throughput determining component 62 for determining historical throughput data. Historical throughput determining component 62 may be configured to determine throughput measured at the UE in connected mode during a configurable time window.

In an aspect, and for example, when an offered load for the UE 11 is small, the connected mode estimate of available DL bandwidth may be based more heavily on R_calculated. When an offered load is large, the connected mode estimate of available DL bandwidth may be based more heavily on R_measured.

Additionally, in a further aspect, UE 11 may include a network communications component 31 for performing one or more network communications procedures based on the estimated available bandwidth for a cell, as determined by bandwidth estimating component 17. For example, the network communication procedures performed by network communications component 31 may include, but are not limited to, a cell reselection procedure and a handover procedure.

Figure 22:
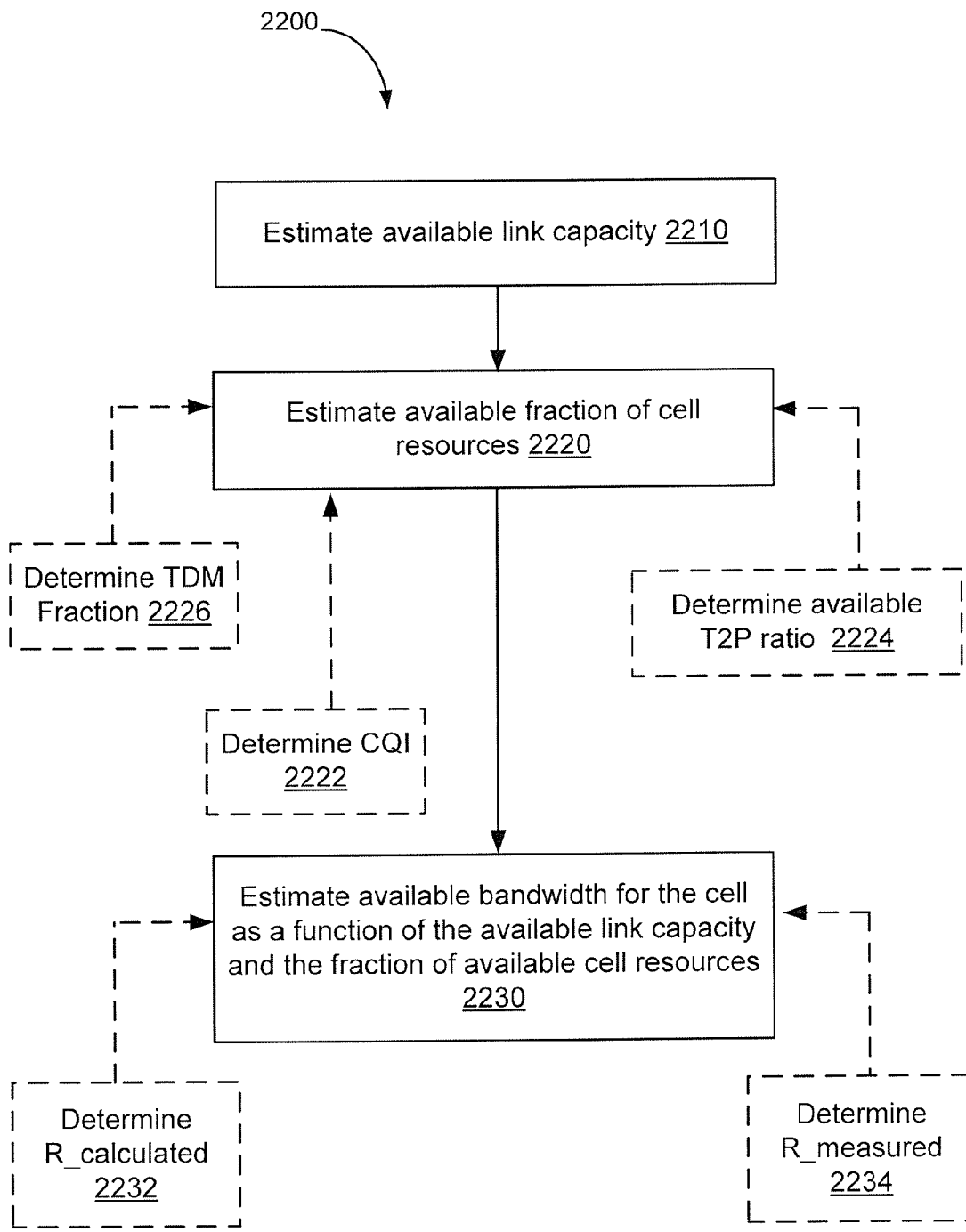
FIG. 22 is a flow chart of a method for determining available downlink bandwidth of a cell operating according to LTE when a UE is in a connected mode.

Referring to FIG. 22, a method 2200 may be used to estimate an available bandwidth of a cell (e.g., serving node 14) for UE 11 while in the connected mode. For example, UE 11 and/or bandwidth estimating component 17, in communication with link capacity estimating component 13, cell resources estimating component 15, R_calculated determining component 50, and R_measured determining component 60, all of FIG. 21, may be configured to estimate an available bandwidth of a cell for UE 11 while in the connected mode.

At 2210, the method 2200 includes estimating an available link capacity of a cell for a user equipment based on channel quality measurements generated at the user equipment. For example, link capacity estimating component 13 may be configured to estimate an available link capacity for UE 11 using any combination of the techniques described herein.

At 2220, the method 2200 includes estimating an available fraction of cell resources for the user equipment. For example, cell resources estimating component 15 may be configured to estimate an available fraction of cell resources for UE 11 using, for example, and in an aspect, the techniques described herein with respect to actions 2222, 2224, and 2226.

In an aspect, at 2222, the method 2200 may include determining a channel quality information (CQI) at the user equipment. For example, cell resources estimating component 15 may be configured to communicate with CQI determining component 52, within R_calculated determining component 50, to determine CQI at UE 11.

In an aspect, at 2224, the method 2200 may include determining an available traffic-to-pilot (T2P) ratio at the cell. For example, cell resources estimating component 15 may be configured to communicate with T2P ratio determining component 44, within R_calculated determining component 50, to determining an available T2P ratio.

In an aspect, at 2226, the method 2200 may include determining a TDM fraction. For example, cell resources estimating component 15 may be configured to communicate with TDM fraction determining component 46, within R_calculated determining component 50, to determine a TDM fraction. As such, the method 2200, at 2220, may include estimating the available fraction of cell resources based on the CQI, T2P ratio, and TDM fraction.

In another aspect (not shown), a fraction of available cell resources may be provided to the UE, and then provided by the UE to the cell resources estimating component 15, by at least one network entity. For example, the fraction of available cell resources may be provided to cell resources estimating component 15 by a serving eNodeB, a network node, a server, one or more other UEs (e.g., the value may be crowd-sourced), or any combination thereof. In such an aspect, the UE may not have to perform an estimation, but, rather, may use the provided value. In yet another aspect, the at least one network entity may provide alpha_RB and alpha_TDM to the UE, such that cell resources estimating component 15 may estimate a fraction of available cell resources (α) by alpha_RB*alpha_TDM as described herein.

At 2230, the method 2200 includes estimating available bandwidth of the cell for the user equipment as a function of the estimated available link capacity and the estimated available fraction of cell resources. For example, bandwidth estimating component 17 may be configured to estimate available bandwidth of the cell for UE 11 using, for example, and in an aspect, the techniques described herein with respect to actions 2232 and 2234.

In an aspect, and at 2232, the method 2200 may include determining a calculated value (R_calculated) based the product of the estimated link capacity of the cell for the user equipment and the estimated available fraction of cell resources. For example, R_calculated determining component 50 may be configured to determine R_calculated based on the product of the estimated link capacity of the cell, as determined by link capacity estimating component 13 and the estimated available fraction of cell resources, as determined by cell resources estimating component 15.

In an aspect, and at 2234, the method 2200 may include determining a measured value (R_measured) based on a measured throughput. For example, R_measured determining component 60 may be configured to measure throughput during a configurable window of time. In an aspect, and if there has not yet been enough historical data to support a determination of R_measured, R_measured determining component 60 may be configured to use a default value. As such, the available bandwidth may be estimated based on a function of R_calculated and R_measured.

Figure 23:
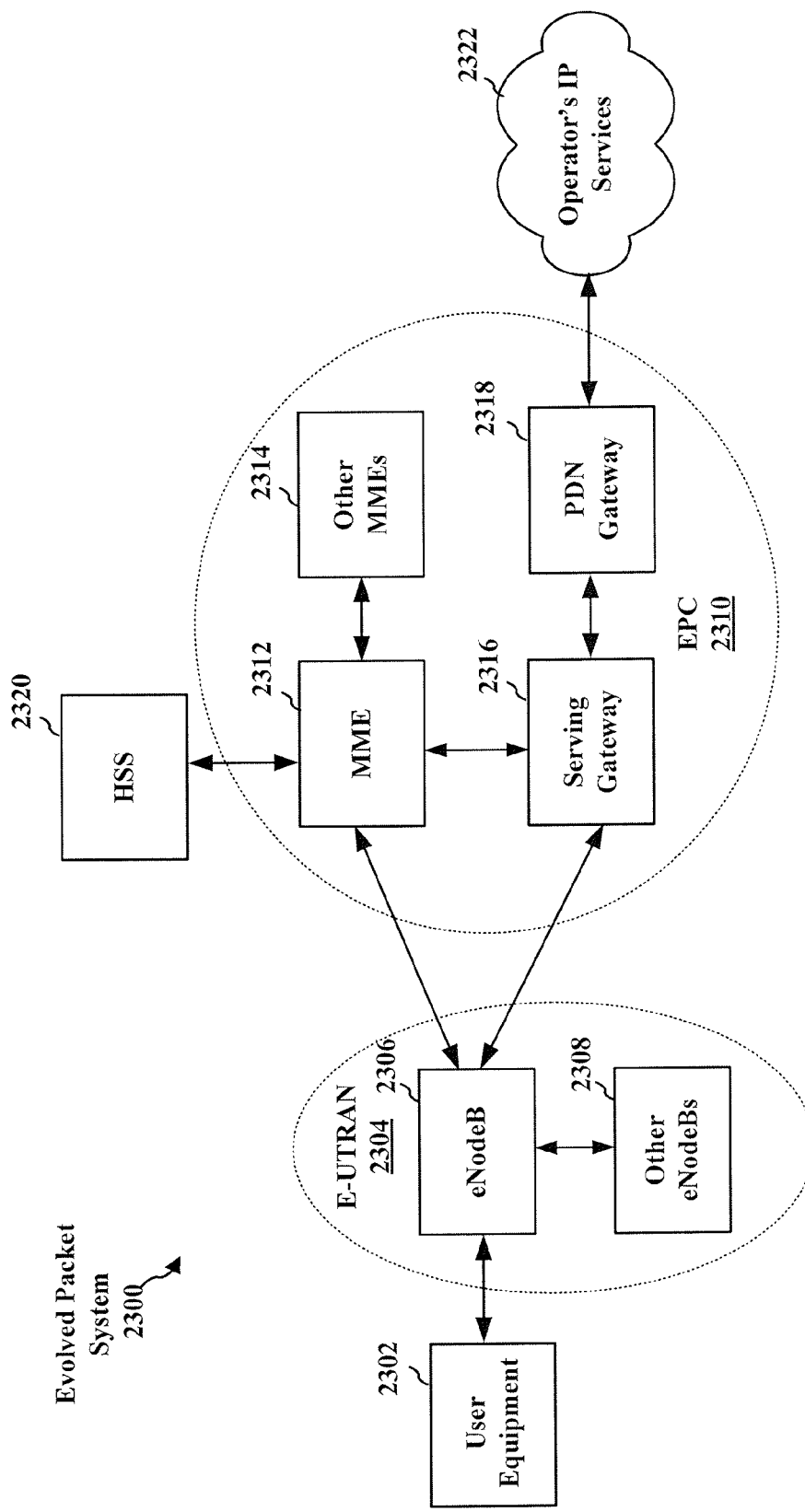
FIG. 23 is a block diagram illustrating an example of a network architecture associated with aspects of FIGS. 19-22.

In an aspect, and as described herein, FIG. 14 is a block diagram illustrating an example of a hardware implementation for an apparatus 1400 employing a processing system 1414, which may be configured to implement the functional components and/or aspects illustrated in any, or all, of FIGS. 19-22. FIG. 23 is a diagram illustrating an LTE network architecture 2300 in which UE 11 (discussed above) may operate. The LTE network architecture 2300 may be referred to as an Evolved Packet System (EPS) 2300. The EPS 2300 may include one or more user equipment (UE) 2302, an Evolved UMTS Terrestrial Radio Access Network (E-UTRAN) 2304, an Evolved Packet Core (EPC) 2310, a Home Subscriber Server (HSS) 2320, and an Operator's IP Services 2322. UE 2302 may be, for example UE 11.

The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 2306 and other eNBs 2308. eNB 2306 and/or eNB 2308 may be, for example, serving node 14 and/or neighboring node 16. The eNB 2306 provides user and control planes protocol terminations toward the UE 2302. The eNB 2306 may be connected to the other eNBs 2308 via a backhaul (e.g., an X2 interface). The eNB 2306 may also be referred to as a base station, a base transceiver station, a radio base station, a radio transceiver, a transceiver function, a basic service set (BSS), an extended service set (ESS), or some other suitable terminology. The eNB 2306 provides an access point to the EPC 2310 for a UE 2302. Examples of UEs 2302 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device. The UE 2302 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 2306 is connected by an S1 interface to the EPC 2310. The EPC 2310 includes a Mobility Management Entity (MME) 2312, other MMEs 2314, a Serving Gateway 2316, and a Packet Data Network (PDN) Gateway 2318. The MME 2312 is the control node that processes the signaling between the UE 2302 and the EPC 2310. Generally, the MME 2312 provides bearer and connection management. All user IP packets are transferred through the Serving Gateway 2316, which itself is connected to the PDN Gateway 2318. The PDN Gateway 2318 provides UE IP address allocation as well as other functions. The PDN Gateway 2318 is connected to the Operator's IP Services 2322. The Operator's IP Services 2322 may include the Internet, the Intranet, an IP Multimedia Subsystem (IMS), and a PS Streaming Service (PSS).

Figure 24:
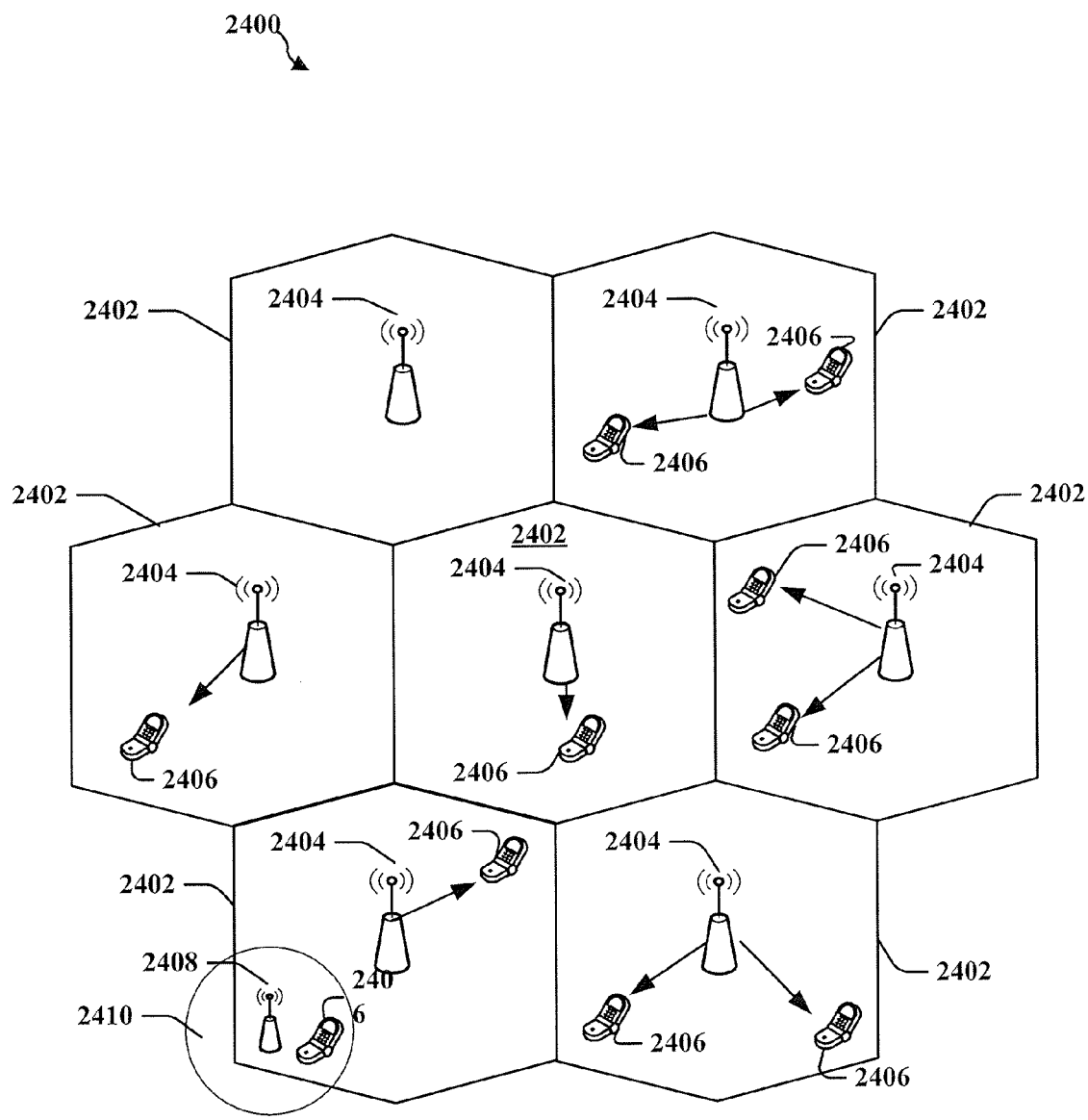
FIG. 24 is a block diagram illustrating an example of an access network associated with aspects of FIGS. 19-22.

FIG. 24 is a diagram illustrating an example of an access network 2400 in an LTE network architecture in which UE 11 (discussed above) may operate. In this example, the access network 2400 is divided into a number of cellular regions (cells) 2402 in which a UE 2406, which may be the same as or similar to UE 11 discussed above, may operate. One or more lower power class eNBs 2408 may have cellular regions 2410 that overlap with one or more of the cells 2402. The lower power class eNB 2408 may be a femto cell (e.g., home eNB (HeNB)), pico cell, micro cell, or remote radio head (RRH). The macro eNBs 2404 are each assigned to a respective cell 2402 and are configured to provide an access point to the EPC 110 for all the UEs 2406 in the cells 2402. There is no centralized controller in this example of an access network 2400, but a centralized controller may be used in alternative configurations. The eNBs 2404 are responsible for all radio related functions including radio bearer control, admission control, mobility control, scheduling, security, and connectivity to the serving gateway 2416.

The modulation and multiple access scheme employed by the access network 2400 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 2404 may have multiple antennas supporting MIMO technology. The use of MIMO technology enables the eNBs 2404 to exploit the spatial domain to support spatial multiplexing, beamforming, and transmit diversity. Spatial multiplexing may be used to transmit different streams of data simultaneously on the same frequency. The data steams may be transmitted to a single UE 2406 to increase the data rate or to multiple UEs 2406 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 2406 with different spatial signatures, which enables each of the UE(s) 2406 to recover the one or more data streams destined for that UE 2406. On the UL, each UE 2406 transmits a spatially precoded data stream, which enables the eNB 2404 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 25:
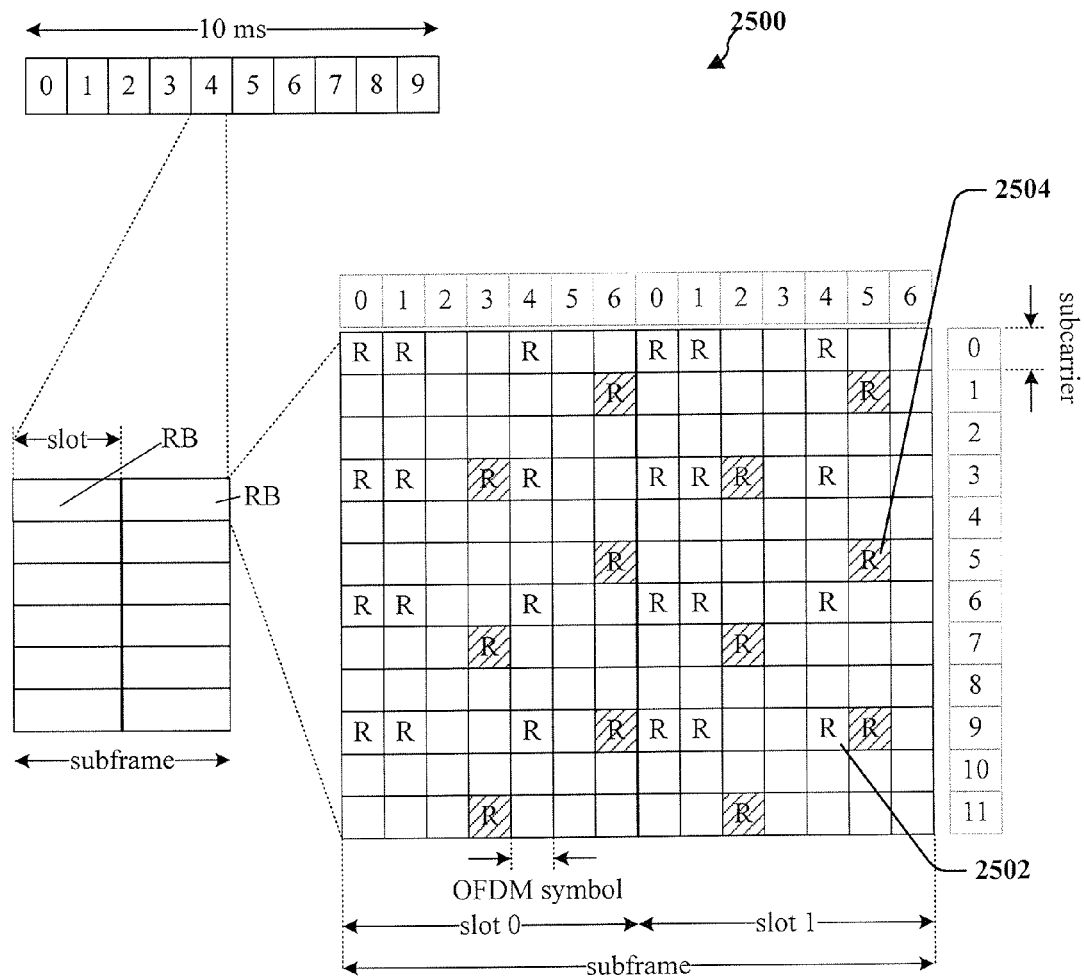
FIG. 25 is a block diagram illustrating an example of a DL frame structure in LTE.

FIG. 25 is a diagram 2500 illustrating an example of a DL frame structure in LTE, which may be received by UE 11 (discussed above). A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 2502, 2504, include DL reference signals (DL-RS). The DL-RS include Cell-specific RS (CRS) (also sometimes called common RS) 2502 and UE-specific RS (UE-RS) 2504. UE-RS 2504 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 26:
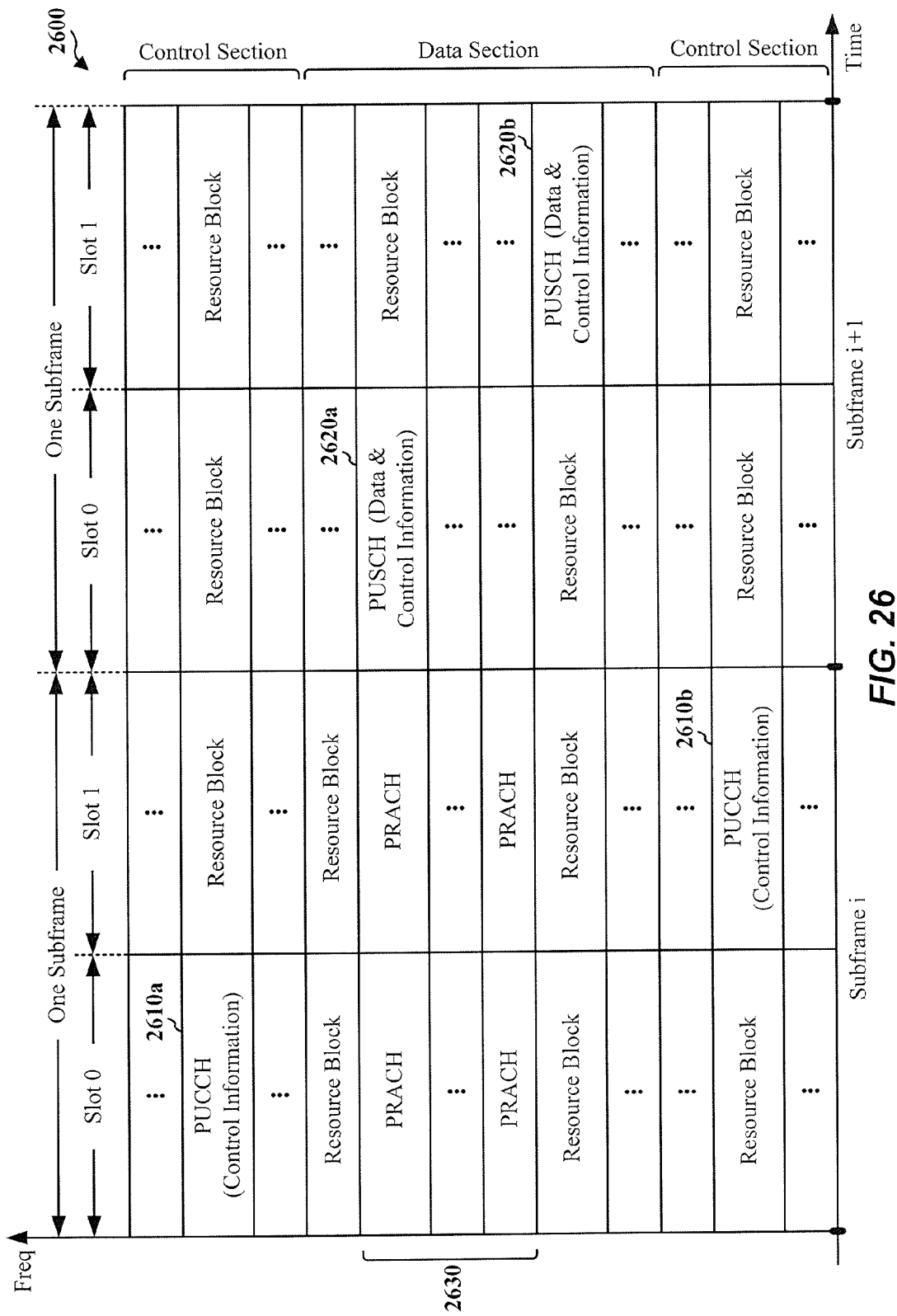
FIG. 26 is a block diagram illustrating an example of a UL frame structure in LTE.

FIG. 26 is a diagram 2600 illustrating an example of an UL frame structure in LTE, which may be transmitted by UE 11 (discussed above). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 2610a, 2610b in the control section to transmit control information to an eNB. The UE may also be assigned resource blocks 2620a, 2620b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 2630. The PRACH 2630 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 27:
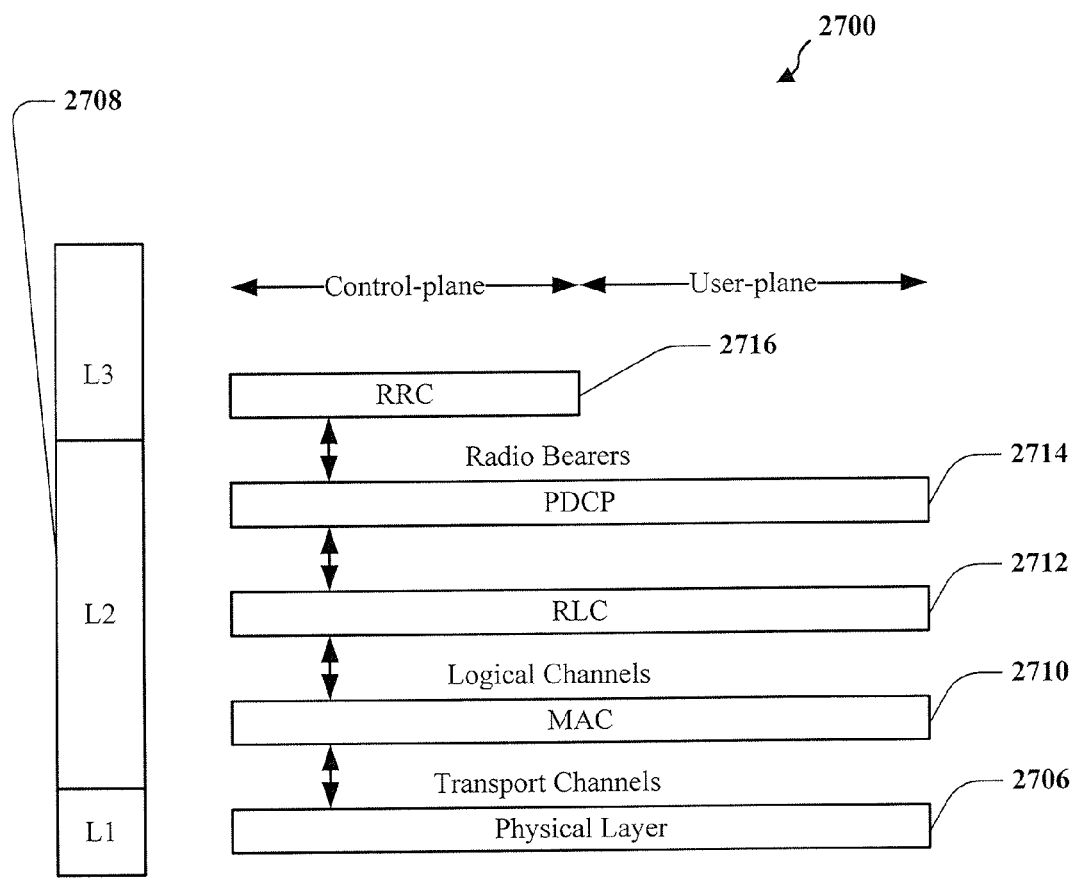
FIG. 27 is a block diagram illustrating an example of a radio protocol architecture for the user and control planes.

FIG. 27 is a diagram 2700 illustrating an example of a radio protocol architecture for the user and control planes in LTE, which may be implemented by UE 11 (discussed above). The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 2706. Layer 2 (L2 layer) 2708 is above the physical layer 2706 and is responsible for the link between the UE and eNB over the physical layer 2706.

In the user plane, the L2 layer 2708 includes a media access control (MAC) sublayer 2710, a radio link control (RLC) sublayer 2712, and a packet data convergence protocol (PDCP) 2714 sublayer, which are terminated at the eNB on the network side. Although not shown, the UE may have several upper layers above the L2 layer 2708 including a network layer (e.g., IP layer) that is terminated at the PDN gateway on the network side, and an application layer that is terminated at the other end of the connection (e.g., far end UE, server, or the like).

The PDCP sublayer 2714 provides multiplexing between different radio bearers and logical channels. The PDCP sublayer 2714 also provides header compression for upper layer data packets to reduce radio transmission overhead, security by ciphering the data packets, and handover support for UEs between eNBs. The RLC sublayer 2712 provides segmentation and reassembly of upper layer data packets, retransmission of lost data packets, and reordering of data packets to compensate for out-of-order reception due to hybrid automatic repeat request (HARQ). The MAC sublayer 2710 provides multiplexing between logical and transport channels. The MAC sublayer 2710 is also responsible for allocating the various radio resources (e.g., resource blocks) in one cell among the UEs. The MAC sublayer 2710 is also responsible for HARQ operations.

In the control plane, the radio protocol architecture for the UE and eNB is substantially the same for the physical layer 2706 and the L2 layer 2708 with the exception that there is no header compression function for the control plane. The control plane also includes a radio resource control (RRC) sublayer 2716 in Layer 3 (L3 layer). The RRC sublayer 2716 is responsible for obtaining radio resources (i.e., radio bearers) and for configuring the lower layers using RRC signaling between the eNB and the UE.

Figure 28:
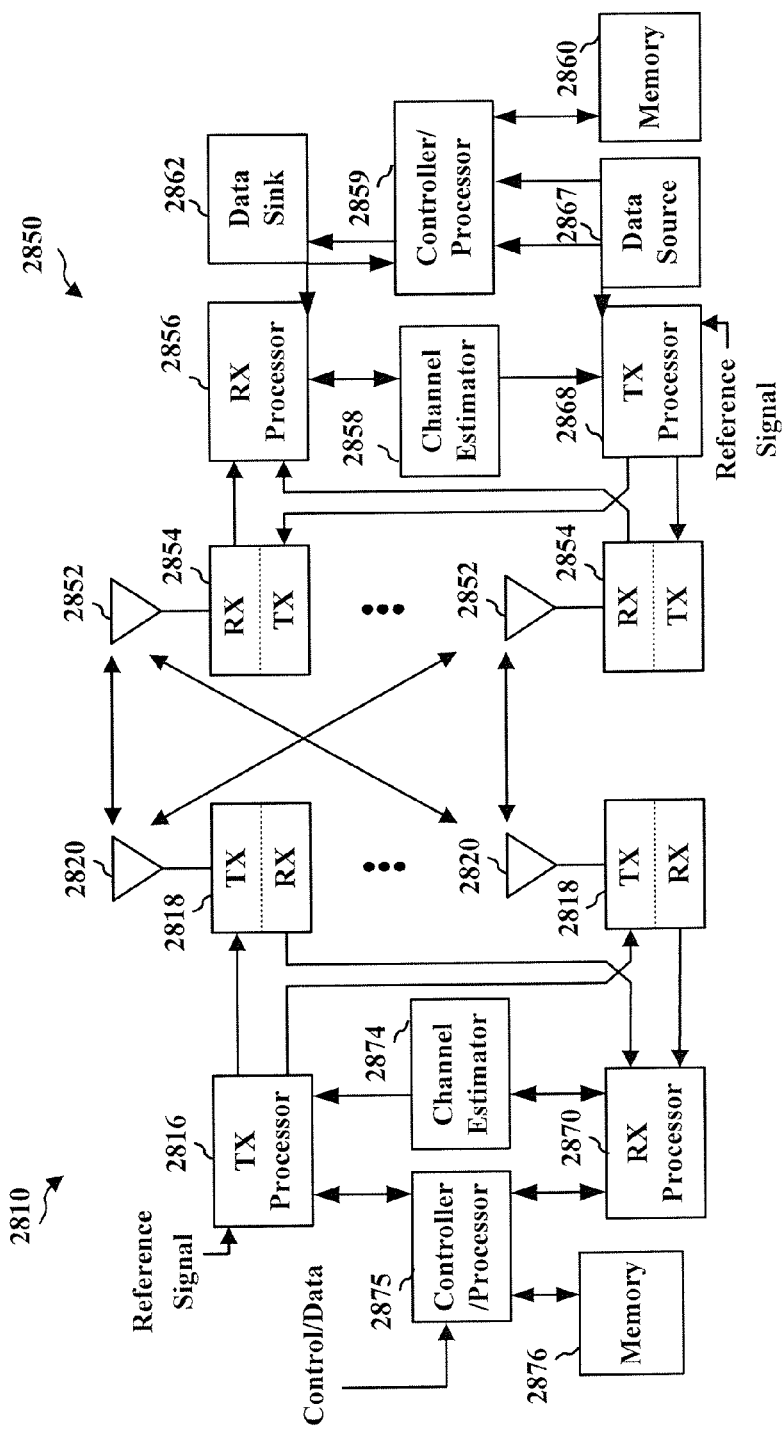
FIG. 28 is a block diagram illustrating an example of an evolved Node B and UE, associated with aspects of FIGS. 19-22, in an access network.

FIG. 28 is a block diagram of an eNB 2810 in communication with a UE 2850 in an access network, where UE 2850 may be the same as or similar to UE 11 (discussed above). In the DL, upper layer packets from the core network are provided to a controller/processor 2875. The controller/processor 2875 implements the functionality of the L2 layer. In the DL, the controller/processor 2875 provides header compression, ciphering, packet segmentation and reordering, multiplexing between logical and transport channels, and radio resource allocations to the UE 2850 based on various priority metrics. The controller/processor 2875 is also responsible for HARQ operations, retransmission of lost packets, and signaling to the UE 2850.

The transmit (TX) processor 2816 implements various signal processing functions for the L1 layer (i.e., physical layer). The signal processing functions includes coding and interleaving to facilitate forward error correction (FEC) at the UE 2850 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 2874 may be used to determine the coding and modulation scheme, as well as for spatial processing. The channel estimate may be derived from a reference signal and/or channel condition feedback transmitted by the UE 2850. Each spatial stream is then provided to a different antenna 2820 via a separate transmitter 2818TX. Each transmitter 2818TX modulates an RF carrier with a respective spatial stream for transmission.

At the UE 2850, each receiver 2854RX receives a signal through its respective antenna 2852. Each receiver 2854RX recovers information modulated onto an RF carrier and provides the information to the receive (RX) processor 2856. The RX processor 2856 implements various signal processing functions of the L1 layer. The RX processor 2856 performs spatial processing on the information to recover any spatial streams destined for the UE 2850. If multiple spatial streams are destined for the UE 2850, they may be combined by the RX processor 2856 into a single OFDM symbol stream. The RX processor 2856 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 2810. These soft decisions may be based on channel estimates computed by the channel estimator 2858. The soft decisions are then decoded and deinterleaved to recover the data and control signals that were originally transmitted by the eNB 2810 on the physical channel. The data and control signals are then provided to the controller/processor 2859.

The controller/processor 2859 implements the L2 layer. The controller/processor can be associated with a memory 2860 that stores program codes and data. The memory 2860 may be referred to as a computer-readable medium. In the UL, the controller/processor 2859 provides demultiplexing between transport and logical channels, packet reassembly, deciphering, header decompression, control signal processing to recover upper layer packets from the core network. The upper layer packets are then provided to a data sink 2862, which represents all the protocol layers above the L2 layer. Various control signals may also be provided to the data sink 2862 for L3 processing. The controller/processor 2859 is also responsible for error detection using an acknowledgement (ACK) and/or negative acknowledgement (NACK) protocol to support HARQ operations.

In the UL, a data source 2867 is used to provide upper layer packets to the controller/processor 2859. The data source 2867 represents all protocol layers above the L2 layer. Similar to the functionality described in connection with the DL transmission by the eNB 2810, the controller/processor 2859 implements the L2 layer for the user plane and the control plane by providing header compression, ciphering, packet segmentation and reordering, and multiplexing between logical and transport channels based on radio resource allocations by the eNB 2810. The controller/processor 2859 is also responsible for HARQ operations, retransmission of lost packets, and signaling to the eNB 2810.

Channel estimates derived by a channel estimator 2858 from a reference signal or feedback transmitted by the eNB 2810 may be used by the TX processor 2868 to select the appropriate coding and modulation schemes, and to facilitate spatial processing. The spatial streams generated by the TX processor 2868 are provided to different antenna 2852 via separate transmitters 2854TX. Each transmitter 2854TX modulates an RF carrier with a respective spatial stream for transmission.

The UL transmission is processed at the eNB 2810 in a manner similar to that described in connection with the receiver function at the UE 2850. Each receiver 2818RX receives a signal through its respective antenna 2820. Each receiver 2818RX recovers information modulated onto an RF carrier and provides the information to a RX processor 2870. The RX processor 2870 may implement the L1 layer.

The controller/processor 2875 implements the L2 layer. The controller/processor 2875 can be associated with a memory 2876 that stores program codes and data. The memory 2876 may be referred to as a computer-readable medium. In the UL, the control/processor 2875 provides demultiplexing between transport and logical channels, packet reassembly, deciphering, header decompression, control signal processing to recover upper layer packets from the UE 2850. Upper layer packets from the controller/processor 2875 may be provided to the core network. The controller/processor 2875 is also responsible for error detection using an ACK and/or NACK protocol to support HARQ operations.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, or the like. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM II, or the like UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, or the like and/or may not include all of the devices, components, modules or the like discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for determining available bandwidth of a cell, comprising:
    estimating an available link capacity of a downlink with a cell for a user equipment based on a communication quality measured in the cell;
    estimating an available fraction of cell resources for the user equipment over the downlink based at least in part on received assistance information, wherein the received assistance information comprises at least one of a transport block size (TBS), one or more channel quality indicator (CQI) offsets or a CQI-to-TBS mapping table;
    estimating available bandwidth of the cell as an achievable throughput for the user equipment over the downlink as a function of the estimated available link capacity and the estimated available fraction of cell resources; and
    communicating with a wireless local area network to associate with the wireless local area network while remaining in idle mode communications with the cell based at least in part on comparing the achievable throughput to one or more thresholds.

2. The method of claim 1, wherein estimating the available link capacity of the downlink is based at least in part on determining a CQI as a spectral efficiency measurement of a signal-to-noise ratio (SNR) determined for a signal received from the cell.

3. The method of claim 2, wherein the received assistance information comprises the one or more CQI offsets, and estimating the available fraction of cell resources comprises scaling the CQI by at least one of the one or more CQI offsets.

4. The method of claim 2, wherein the received assistance information comprises the CQI-to-TBS mapping table, and estimating the available bandwidth is based at least in part on determining a TBS from the CQI-to-TBS mapping table based on the CQI.

5. The method of claim 2, wherein estimating the available fraction of cell resources further comprises determining a downlink bandwidth at the cell, and wherein estimating the available bandwidth is based at least in part on the downlink bandwidth at the cell and the CQI.

6. The method of claim 2, wherein estimating the available fraction of cell resources further comprises determining a downlink bandwidth at the cell, and wherein estimating the available bandwidth is based at least in part on a product of the downlink bandwidth at the cell and the CQI.

7. The method of claim 2, wherein estimating the available fraction of cell resources further comprises determining a downlink bandwidth at the cell, and wherein the received assistance information includes a CQI offset table that maps CQI values and associated downlink bandwidth values to the one or more CQI offsets, and estimating the available bandwidth is based at least in part on determining at least one of the one or more CQI offsets that maps to the downlink bandwidth at the cell and the CQI.

8. The method of claim 2, wherein estimating the available fraction of cell resources further comprises determining a downlink bandwidth at the cell, wherein estimating the available bandwidth is based at least in part on the downlink bandwidth at the cell and the CQI, and wherein the downlink bandwidth at the cell is at least one of received in a signal from the cell, estimated based at least in part on measuring reference signal tones or downlink channel resource elements, or determined based on a default parameter.

9. A method for determining available bandwidth of a cell, comprising:
  estimating an available link capacity of an uplink with a cell for a user equipment based on a communication quality measured in the cell;
  estimating a power headroom for the user equipment over the uplink based at least in part on received assistance information, wherein the received assistance information comprises a power headroom offset;
  estimating available bandwidth of the cell as an achievable throughput for the user equipment over the uplink as a function of the estimated available link capacity and the power headroom; and
  communicating with a wireless local area network to associate with the wireless local area network while remaining in idle mode communications with the cell based at least in part on comparing the achievable throughput to one or more thresholds.

10. The method of claim 9, wherein estimating the available link capacity is based at least in part on computing an uplink path loss to the cell related to a reference signal received power measured for a reference signal and a transmit power broadcasted by the cell for the reference signal, and wherein estimating the power headroom is further based at least in part on determining a power for reception of a base modulation and coding scheme at the cell based at least in part on the uplink path loss.

11. The method of claim 9, wherein estimating the power headroom is further based at least in part on a maximum transmit power.

12. The method of claim 9, further comprising receiving the power headroom offset as an uplink grant from the cell, wherein determining the power headroom is based at least in part on the power headroom offset.

13. An apparatus for determining available bandwidth of a cell, comprising:
  a link capacity estimating component operable for estimating an available link capacity of a downlink with a cell for a user equipment based on a communication quality measured in the cell;
  a cell resources estimating component operable for estimating an available fraction of cell resources for the user equipment over the downlink based at least in part on received assistance information, wherein the received assistance information comprises at least one of a transport block size (TBS), one or more channel quality indicator (CQI) offsets or a CQI-to-TBS mapping table;
  a bandwidth estimating component operable for estimating available bandwidth of the cell as an achievable throughput for the user equipment over the downlink as a function of the estimated available link capacity and the estimated available fraction of cell resources; and
  a network communications component operable for communicating with a wireless local area network to associate with the wireless local area network while remaining in idle mode communications with the cell based at least in part on comparing the achievable throughput to one or more thresholds.

14. The apparatus of claim 13, wherein the link capacity estimating component further comprises a spectral efficiency determining component operable for determining a CQI as a spectral efficiency measurement of a signal-to-noise ratio (SNR) determined for a signal received from the cell, and wherein the link capacity estimating component is further operable for estimating the available link capacity of the downlink as the CQI.

15. The apparatus of claim 14, wherein the cell resources estimating component comprises a CQI offset determining component operable to obtain one or more CQI offsets as the received assistance information, and wherein the cell resources estimating component is operable for estimating the available fraction of cell resources by scaling the CQI by at least one of the one or more CQI offsets.

16. The apparatus of claim 14, wherein the cell resources estimating component comprises a TBS determining component operable for receiving the CQI-to-TBS mapping table as the received assistance information, and wherein the bandwidth estimating component is further operable for estimating the available bandwidth based at least in part on determining a TBS from the CQI-to-TBS mapping table based on the CQI.

17. The apparatus of claim 14, wherein the cell resources estimating component comprises a cell bandwidth determining component operable for determining a downlink bandwidth at the cell as the received assistance information, and wherein the bandwidth estimating component is further operable for estimating the available bandwidth based at least in part on the downlink bandwidth at the cell and the CQI.

18. The apparatus of claim 14, wherein the cell resources estimating component comprises a cell bandwidth determining component operable for determining a downlink bandwidth at the cell as the received assistance information, and wherein the bandwidth estimating component is further operable for estimating the available bandwidth based at least in part on the downlink bandwidth at the cell multiplied by the CQI.

19. The apparatus of claim 14, wherein the cell resources estimating component comprises a cell bandwidth determining component operable for determining a downlink bandwidth at the cell as the received assistance information, wherein the cell resources estimating component comprises a CQI offset determining component operable for receiving a CQI offset table that maps CQI values and associated downlink bandwidth values to the one or more CQI offsets as the received assistance information, and wherein the bandwidth estimating component is further operable for estimating the available bandwidth based at least in part on determining the at least one of the one or more CQI offsets that maps to the downlink bandwidth at the cell and the CQI scaled by the CQI offset.

20. The apparatus of claim 14, wherein the cell resources estimating component comprises a cell bandwidth determining component operable for determining a downlink bandwidth at the cell as the received assistance information, and wherein the cell bandwidth determining component determines the downlink bandwidth at the cell as at least one of received in a signal from the cell, estimated based at least in part on measuring reference signal tones or downlink channel resource elements, or determined based on a default parameter.

21. An apparatus for determining available bandwidth of a cell, comprising:
a link capacity estimating component operable for estimating an available link capacity of an uplink with a cell for a user equipment based on a communication quality measured in the cell;
a cell resources estimating component operable for estimating a power headroom for the user equipment over the uplink based at least in part on received assistance information, wherein the received assistance information comprises a power headroom offset;
a bandwidth estimating component operable for estimating available bandwidth of the cell as an achievable throughput for the user equipment over the uplink as a function of the estimated available link capacity and the power headroom; and
a network communications component operable for communicating with a wireless local area network to associate with the wireless local area network while remaining in idle mode communications with the cell based at least in part on comparing the achievable throughput to one or more thresholds.

22. The apparatus of claim 21, wherein the link capacity estimating component is operable for estimating the available link capacity based at least in part on computing an uplink path loss to the cell related to a reference signal received power measured for a reference signal and a transmit power broadcasted by the cell for the reference signal, and wherein the cell resources estimating component is further operable for estimating the power headroom further based at least in part on determining a power for reception of a base modulation and coding scheme at the cell based at least in part on the uplink path loss.

23. The apparatus of claim 21, wherein the cell resources estimating component is further operable for estimating the power headroom further based at least in part on a maximum transmit power.

24. An apparatus for determining available bandwidth of a cell, comprising:
means for estimating an available link capacity of a downlink with a cell for a user equipment based on a communication quality measured in the cell;
means for estimating an available fraction of cell resources for the user equipment over the downlink based at least in part on received assistance information, wherein the received assistance information comprises at least one of a transport block size (TBS), one or more channel quality indicator (CQI) offsets or a CQI-to-TBS mapping table;
means for estimating available bandwidth of the cell as an achievable throughput for the user equipment over the downlink as a function of the estimated available link capacity and the estimated available fraction of cell resources; and
means for communicating with a wireless local area network to associate with the wireless local area network while remaining in idle mode communications with the cell based at least in part on comparing the achievable throughput to one or more thresholds.

25. The apparatus of claim 24, wherein the means for estimating the available link capacity further comprises means for determining a CQI as a spectral efficiency measurement of a signal-to-noise ratio (SNR) determined for a signal received from the cell, and wherein the means for estimating the available link capacity is further operable for estimating the available link capacity of the downlink as the CQI.

26. A non-transitory computer readable medium, for estimating available bandwidth of a cell, comprising:
code for causing at least one computer to estimate an available link capacity of a downlink with a cell for a user equipment based on a communication quality measured in the cell;
code for causing at least one computer to estimate an available fraction of cell resources for the user equipment over the downlink based at least in part on received assistance information, wherein the received assistance information comprises at least one of a transport block size (TBS), one or more channel quality indicator (CQI) offsets or a CQI-to-TBS mapping table;
code for causing at least one computer to estimate available bandwidth of the cell as an achievable throughput for the user equipment over the downlink as a function of the estimated available link capacity and the estimated available fraction of cell resources; and
code for causing at least one computer to communicate with a wireless local area network to associate with the wireless local area network while remaining in idle mode communications with the cell based at least in part on comparing the achievable throughput to one or more thresholds.

27. An apparatus for determining available bandwidth of a cell, comprising:
means for estimating an available link capacity of an uplink with a cell for a user equipment based on a communication quality measured in the cell;
means for estimating a power headroom for the user equipment over the uplink based at least in part on received assistance information, wherein the received assistance information comprises a power headroom offset;
means estimating available bandwidth of the cell as an achievable throughput for the user equipment over the uplink as a function of the estimated available link capacity and the power headroom; and
means for communicating with a wireless local area network to associate with the wireless local area network while remaining in idle mode communications with the cell based at least in part on comparing the achievable throughput to one or more thresholds.

28. A non-transitory computer readable medium, for estimating available bandwidth of a cell, comprising:
code for causing at least one computer to estimate an available link capacity of an uplink with a cell for a user equipment based on a communication quality measured in the cell;
code for causing at least one computer to estimate a power headroom for the user equipment over the uplink based at least in part on received assistance information, wherein the received assistance information comprises a power headroom offset;
code for causing at least one computer to estimate available bandwidth of the cell as an achievable throughput for the user equipment over the uplink as a function of the estimated available link capacity and the power headroom; and
code for causing at least one computer to communicate with a wireless local area network to associate with the wireless local area network while remaining in idle mode communications with the cell based at least in part on comparing the achievable throughput to one or more thresholds.

* * * * *